US012595869B2

(12) United States Patent
Wells et al.

(10) Patent No.: US 12,595,869 B2
(45) Date of Patent: Apr. 7, 2026

(54) PIPE JOINT INSERT DEVICE, PIPE JOINT ASSEMBLY, AND METHODS OF FORMING SAME

(71) Applicant: North American Pipe Corporation, Houston, TX (US)

(72) Inventors: Andrew Wells, Wayne, PA (US); Joshua E. Clapper, Downingtown, PA (US)

(73) Assignee: WESTLAKE PIPE & FITTINGS CORPORATION, Houston, TX (US)

( * ) Notice: Subject to any disclaimer, the term of this patent is extended or adjusted under 35 U.S.C. 154(b) by 190 days.

(21) Appl. No.: 17/534,449

(22) Filed: Nov. 23, 2021

(65) Prior Publication Data

US 2022/0163156 A1     May 26, 2022

Related U.S. Application Data

(60) Provisional application No. 63/220,893, filed on Jul. 12, 2021, provisional application No. 63/117,169, filed on Nov. 23, 2020.

(51) Int. Cl.
*F16L 47/08*          (2006.01)
(52) U.S. Cl.
CPC .................................... *F16L 47/08* (2013.01)
(58) Field of Classification Search
CPC . F16L 47/08; F16L 47/10; F16L 47/12; F16L 21/03; F16L 17/032; F16L 37/0845; F16L 37/0985
See application file for complete search history.

(56) References Cited

U.S. PATENT DOCUMENTS

| | | | |
|---|---|---|---|
| 4,061,459 A | 12/1977 | Parmann | |
| 4,120,521 A | 10/1978 | Parmann | |
| 4,818,209 A * | 4/1989 | Petersson | B29C 57/025 |
| | | | 277/924 |
| 4,826,028 A | 5/1989 | Vassallo et al. | |
| 7,207,606 B2 * | 4/2007 | Owen | F16L 47/12 |
| | | | 285/104 |

(Continued)

FOREIGN PATENT DOCUMENTS

GB          2034841 A  *  6/1980  .......... F16L 37/0845

OTHER PUBLICATIONS

International Search Report and Written Opinion cited in corresponding PCT app No. PCT/US2021/060668; Feb. 14, 2022; 12 pp.

(Continued)

*Primary Examiner* — Matthew Troutman
*Assistant Examiner* — Alexander T Rufrano
(74) *Attorney, Agent, or Firm* — Lempia Summerfield Katz LLC

(57) ABSTRACT

A polymer pipe includes a length between a first end and a second end, the length and the first end having a first diameter. The second end is a belled or female end having a second diameter larger than the first diameter. An insert device is received within the second end and has an annular body formed of a body material and has a spline portion formed as a part of the insert device. The spline portion includes a spline carried by the insert device and resiliently movable in a radial direction relative to an axis of the annular body.

26 Claims, 38 Drawing Sheets

(56)  References Cited

U.S. PATENT DOCUMENTS

| | | | |
|---|---|---|---|
| 7,284,310 B2 * | 10/2007 | Jones .................. | F16L 37/0925<br>29/447 |
| 9,829,137 B2 * | 11/2017 | Kennedy, Jr. ........... | F16L 37/52 |
| 10,107,425 B2 * | 10/2018 | Corbett, Jr. ........... | B29B 13/025 |
| 10,844,981 B2 * | 11/2020 | Ruissen ................ | F16L 13/142 |
| 11,098,832 B2 * | 8/2021 | Clapper ............. | F16L 37/0845 |
| 2009/0152863 A1 | 6/2009 | Steinbruck | |
| 2010/0289256 A1 * | 11/2010 | Shumard ................ | F16L 21/03<br>285/331 |
| 2017/0198847 A1 * | 7/2017 | Clapper ............... | F16L 37/148 |
| 2018/0224041 A1 * | 8/2018 | Clapper ................ | F16J 15/064 |
| 2020/0292109 A1 | 9/2020 | Quesada | |
| 2021/0215287 A1 | 7/2021 | Wells et al. | |

OTHER PUBLICATIONS

European Search Report cited in European patent application No. 21895842.9; Oct. 15, 2024; 8 pp.

* cited by examiner

PIPE JOINT INSERT DEVICE, PIPE JOINT ASSEMBLY, AND METHODS OF FORMING SAME

RELATED APPLICATION DATA

This patent is entitled to the benefit of and claims priority to co-pending U.S. Provisional Application Ser. No. 63/220, 893 filed Jul. 12, 2021 and 63/117,148 filed Nov. 23, 2020, and each entitled "Pipe Joint Insert Device, Pipe Joint Assembly, and Methods of Forming Same." The entire contents of these prior filed provisional applications are hereby incorporated herein by reference.

BACKGROUND

1. Field of the Disclosure

The present disclosure is generally directed to pipe joints, and more particularly to pipe joint insert devices and pipe joint assemblies using such insert devices, and to methods utilizing and incorporating such insert devices in pipe joints.

2. Description of Related Art

Pipe sections are joined to one another at joints to form extended lengths of pipe. Non-metallic pipe, such as polyvinyl chloride (PVC) pipe often uses mechanical locking structures, such as splines, to form the joints. Conventional spline-type, restrained pipe joint systems typically have spline grooves, separate splines, and separate seals that are axially spaced-apart from the splines in a pipe joint. The spline grooves and seal grooves are typically machined into the inner surface of a pipe end and the seals and spline are typically installed separately within a pipe end and joint as well.

Manufacturing costs are relatively high since the spline grooves, splines, and seal parts must also be separately manufactured. Additional manpower and/or time and effort are also required, both to manufacture the separate parts and to install the separate parts in a pipe joint. Examples of such designs are disclosed and described in U.S. Pat. Nos. 5,662, 360, 7,284,310, and 7,537,248. Some users would benefit from improvements in restrained pipe joints, spline arrangements, pipe joint assemblies, and corresponding methods. Thus, improvements in restrained pipe joints, insert devices, and joint locking components continue to be of interest.

SUMMARY

In one example, according to the teachings of the present disclosure, a polymer pipe includes a length between a first end and a second end, the length and the first end having a first diameter. The second end is a belled end having a second diameter larger than the first diameter. An insert device is received within the second end and has an annular body formed of a body material and has a spline portion formed as a part of the insert device. The spline portion includes a spline carried by the insert device and resiliently movable in a radial direction relative to an axis of the annular body.

In one example, the annular body can also have a seal portion that includes a seal material coupled thereto that is less rigid than the body material.

In one example, the insert device can include a seal material carried by the annular body and defining an inner seal facing in a radially inward direction.

In one example, the seal material can define an outer seal facing in a radially outward direction and contacting an inside diameter surface of the polymer pipe.

In one example, the seal material can penetrate through the annular body integrally forming both the inner and outer seals.

In one example, the annular body can be a molded element and the seal material can be co-molded, insert molded or over-molded with the annular body as a part of the insert device. The body material of the annular body can be substantially rigid and have a first durometer and the seal material can have a second durometer lower than that of the substantially rigid material of the annular body.

In one example, the body material of the annular body can be formed of a polymer material. The seal material can be formed of an elastomer material that is less rigid than the polymer material.

In one example, the seal material can be an elastomer material, such as at least one of isoprene rubber (IR), styrene butadiene rubber (SBR), IR/SBR blend, nitrile, ethylene propylene diene monomer (EPDM) rubber, synthetic rubber, and fluoropolymer elastomer.

In one example, the polymer pipe can further include one or more insert recesses disposed circumferentially on an inside diameter (ID) surface of the second end. The insert device can be seated in the one or more insert recesses.

In one example, the insert device can have an ID in a range of about 3 inches to about 48 inches and an axial length of about 0.125 inches to about 3 inches.

In one example, the spline can be an integral part of the annular body and be formed of the body material. The spline can be connected to the spline part of the annular body by one or more frangible connections configured to break and permit the spline to move radially relative to the annular body.

In one example according to the teachings of the present disclosure, a method of forming a polymer pipe having a length between a first end and a second end includes installing an insert device on an outside diameter of a mandrel. The insert device has a substantially annular body formed of a body material and having a spline portion formed as a part of the insert device. The mandrel is forcibly positioned in the second end, when heated, of the polymer pipe to expand the diameter such that the length and the first end have a first diameter and the second end is belled to have a second diameter larger than the first diameter. The second end of the polymer pipe is cooled around the insert device thereby forming an insert recess in the inside diameter of the second end retaining the insert device therein. The spline portion includes a spline carried by the insert device and resiliently movable in a radial direction relative to an axis of the annular body In one example, the step of cooling can be at least partially done before the mandrel is removed from the second end of the polymer pipe. A vacuum can be applied to draw the second end of the polymer pipe radially toward the mandrel.

In one example, the step of cooling can continue after the mandrel is removed from the second end.

In one example according to the teachings of the present disclosure, an insert device for a belled end of a polymer pipe includes an annular body formed of a body material and having a spline portion and a spline connected to the insert device and movable in a radial direction relative to an axis of the annular body.

In one example, the insert device can include a seal portion of the annular body and a seal material bonded, adhered, or otherwise joined to the seal portion and that is less rigid than the body material.

In one example, the spline can be coupled to a portion of the seal material configured to bend in a pivotal manner when the spline is moved in the radial direction.

In one example, the spline can be configured to expand radially in order to move in the radial direction.

In one example according to the teachings of the present disclosure, a pipe joint assembly includes a polymer pipe having a length between a first end and a second end. The length and the first end have a first diameter and the second end is a female or a belled end having a second diameter larger than the first diameter. An insert device is received within the second end and has an annular body with a spline portion and a spline integrally and resiliently carried by the spline portion and formed of the body material. A pipe has a spigot end installed in the second end of the polymer pipe. The spigot end has a spline groove on an outside diameter surface and the spline is seated in the spline groove and axially retains the pipe connected to the polymer pipe.

In one example, the insert device can include a seal portion of the annular body and a seal material carried by the seal portion. The seal material can be less rigid than the body material.

In one example, the seal material can form an inner seal that contacts the outside diameter surface of the spigot end.

In one example, the spline can be configured to be moved radially outward by the spigot end to permit installation of the spigot end into the second end of the polymer pipe. The spline can be configured to move radially inward and seat in the spline groove when aligned therewith.

In one example, the polymer pipe, the spigot end, and the insert device can each be entirely non-metallic.

In one example according to the teachings of the present disclosure, a method of assembling a pipe joint includes providing or obtaining a first pipe having a spigot end and a spline groove on an outside diameter surface of the spigot end and providing or obtaining a second pipe having a belled end. The spigot end of the first pipe is sized to fit within the belled end of the second pipe. An insert device is retained within the belled end and includes an annular body with a spline portion and a spline movable and resiliently carried by the spline portion. The spigot end of the first pipe is inserted into the belled end of the second pipe such that the spline of the insert device is axially aligned with the spline groove in the spigot end. The spline resides at least in part within the spline groove to retain the first and second pipes joined to one another.

In one example, the method can include yielding a seal material carried by a seal portion of the annular body whereby an inner seal of the seal material contacts the outside diameter surface of the spigot end at a position axially spaced from the spline groove.

In one example according to the teachings of the present disclosure, a pipe system includes a polymer pipe having a length between a first end and a second end. The length and the first end have a first diameter and the second end is a female or a belled end having a second diameter larger than the first diameter. One or more insert recesses is formed in an inside diameter surface of the belled end of the polymer pipe. An insert device is received within the spigot end and has an annular body with a seal portion and a spline portion. A seal material is coupled to the seal portion and a spline is integrated as a part of the spline portion. The spline is movably and resiliently carried by the annular body and is movable in a radial direction relative to an axis of the insert device.

In one example, the pipe system can include a pipe having a spigot end installed in the belled end of the polymer pipe. The spigot end can have a spline groove on an outside diameter surface that axially aligns with and receives the spline of the insert device, axially joining the polymer pipe and the spigot end.

In one example according to the teachings of the present disclosure, a polymer pipe includes a length between a first end and a second end, the length and the first end having a first diameter, and the second end being a belled end having a second diameter larger than the first diameter. An insert device is received within the second end. The insert device includes a substantially annular body formed of a body material and having a seal portion and a seal material that is softer or less rigid than the body material. The seal material is mechanically connected to the seal portion of the annular body by cooperation between a connecting structure of the annular body and the seal material.

In one example, the annular body can include a spline portion formed of the body material. The spline portion can include a spline that is resiliently movable in a radial direction relative to the annular body.

In one example, the insert device can include a spline groove formed as a part of the annular body.

In one example, the seal material can have an inner seal portion facing radially inward and an outer seal portion facing radially outward. The seal material can penetrate one or more radial openings through the body material of the seal portion and integrally form both the inner and outer seal portions. The connecting structure can include the one or more radial openings.

In one example, the polymer pipe can include one or more insert recesses formed in an inside diameter (ID) surface of the second end and the annular body can be seated in the one or more insert recesses.

In one example, the one or more insert recesses can be formed as a result of a belling process at the second end of the pipe.

In one example, the seal material can be a co-molded, insert molded, or over-molded element relative to the annular body as a part of the insert device. The body material can be substantially rigid and have a first durometer and the seal material can have a second durometer lower than that of the substantially rigid material of the annular body.

In one example, the body material of the annular body can be formed of a polymer material. The seal material can be formed of an elastomer material that is less rigid than the polymer material.

In one example, the seal material can be an elastomer material such as at least one of isoprene rubber (IR), styrene butadiene rubber (SBR), IR/SBR blend, nitrile, ethylene propylene diene monomer (EPDM) rubber, synthetic rubber, and fluoropolymer elastomer.

In one example, the insert device can have an inside diameter in a range of about 3 inches to about 48 inches and an axial length of about 0.125 inches to about 3 inches.

In one example, the connecting structure can include a plurality of holes formed radially through the seal portion of the annular body. The seal material can penetrate through the plurality of holes.

In one example, the connecting structure can include a plurality of circumferentially spaced-apart and axially extending bridges of the annular body. The seal material can penetrate through the annular body via gaps or slots between the spaced-apart bridges.

In one example, the polymer pipe can be formed according to the above-described method whereby the seal material and the annular body of the insert device are retained mechanically connected to one another by cooperation between a connecting structure of the annular body and the seal material.

In one example according to the teachings of the present disclosure, an insert device for a female or belled end of a polymer pipe includes an annular body formed of a body material and having a seal portion and a seal material retained mechanically to the seal portion by a connecting structure of the annular body. The seal material is softer or less rigid than the body material. The connecting structure interferes with the seal material in an axial direction and a radial direction to facilitate the mechanical connection.

In one example, the mechanical structure can include an outer radial surface and an inner radial surface on the seal portion. The seal material can be disposed against both the outer and inner radial surfaces. The mechanical structure can also include one or more axial facing surfaces. The seal material can be disposed against the one or more axial facing surfaces.

In one example, the one or more axial facing surfaces of the mechanical structure can be provided on an axial projection on the seal portion of the annular body.

In one example, the seal material can define a radial inner seal and a radial outer seal integrally connected to one another radially through the annular body.

In one example, a pipe joint assembly includes a polymer pipe having a length between a first end and a second end, the length and the first end having a first diameter, and the second end being a belled end having a second diameter larger than the first diameter. An insert device is received within the second end and has an annular body with a seal portion and has a seal material carried by the seal portion. The seal material is less rigid than the body material and is mechanically connected to the annular body by a connecting structure. A pipe having a spigot end is installed in the second end of the polymer pipe.

In one example, the pipe joint assembly can include a spline integrally and resiliently carried by a spline portion of the annular body and formed of the body material and a spline groove on an outside diameter of the spigot end of the pipe. The spline can be seated in the spline groove and axially retain the pipe connected to the polymer pipe.

In one example, the spline can be configured to be moved radially outward by the spigot end to permit installation of the spigot end into the second end of the polymer pipe. The spline can be configured to move radially inward and seat in the spline groove when aligned therewith.

In one example, the polymer pipe, the pipe, and the insert device can each be entirely non-metallic.

In one example, the seal material can form an outer seal that contacts an inside surface of the polymer pipe and forms an inner seal that contacts an outside surface of the spigot end of the pipe.

In one example, the outer seal can be disposed on a radial outer surface of the seal portion, the inner seal can be disposed on a radial inner surface of the seal, and an end seal can encompass an end of the seal portion. The inner, outer, and end seals can define at least part of the mechanical structure.

In one example, the seal material can penetrate the annular body through a plurality of through holes, gaps, and/or slots through the annular body.

In one example, the through holes, gaps, and/or slots can be formed in a portion of the annular body axially between a main body portion and a seal portion.

In one example, the pipe joint assembly can include a first spline groove formed by the annular body of the insert device and a second spline groove on an outside diameter of the spigot end of the pipe. A spline can be seated in the first and second spline grooves when axially aligned and axially retains the pipe connected to the polymer pipe.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The disclosure describes and shows various embodiments and examples of pipe joint insert devices, pipe joint assemblies, and methods of making and assembling such insert devices and pipe joint assemblies. The disclosed embodiments solve or improve upon the above-mentioned and/or other problems and disadvantages with prior known pipe joint components and solutions. Objects, features, and advantages of the disclosed embodiments and examples will become apparent to those having ordinary skill in the art upon reading this disclosure.

Figure 1:
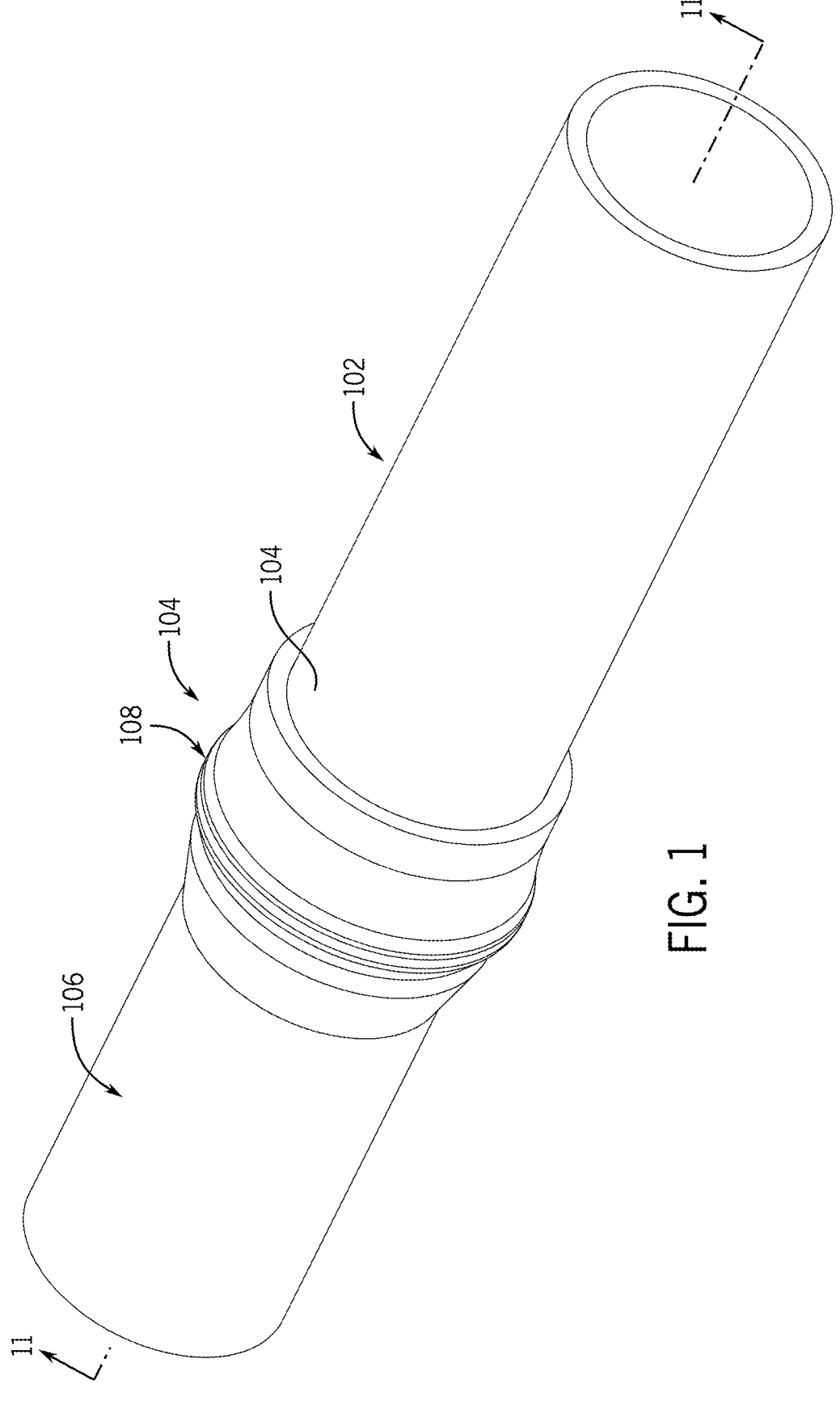
FIG. 1 shows a perspective view of one example of a pipe joint assembly constructed in accordance with the teachings of the present disclosure.
Figure 2:
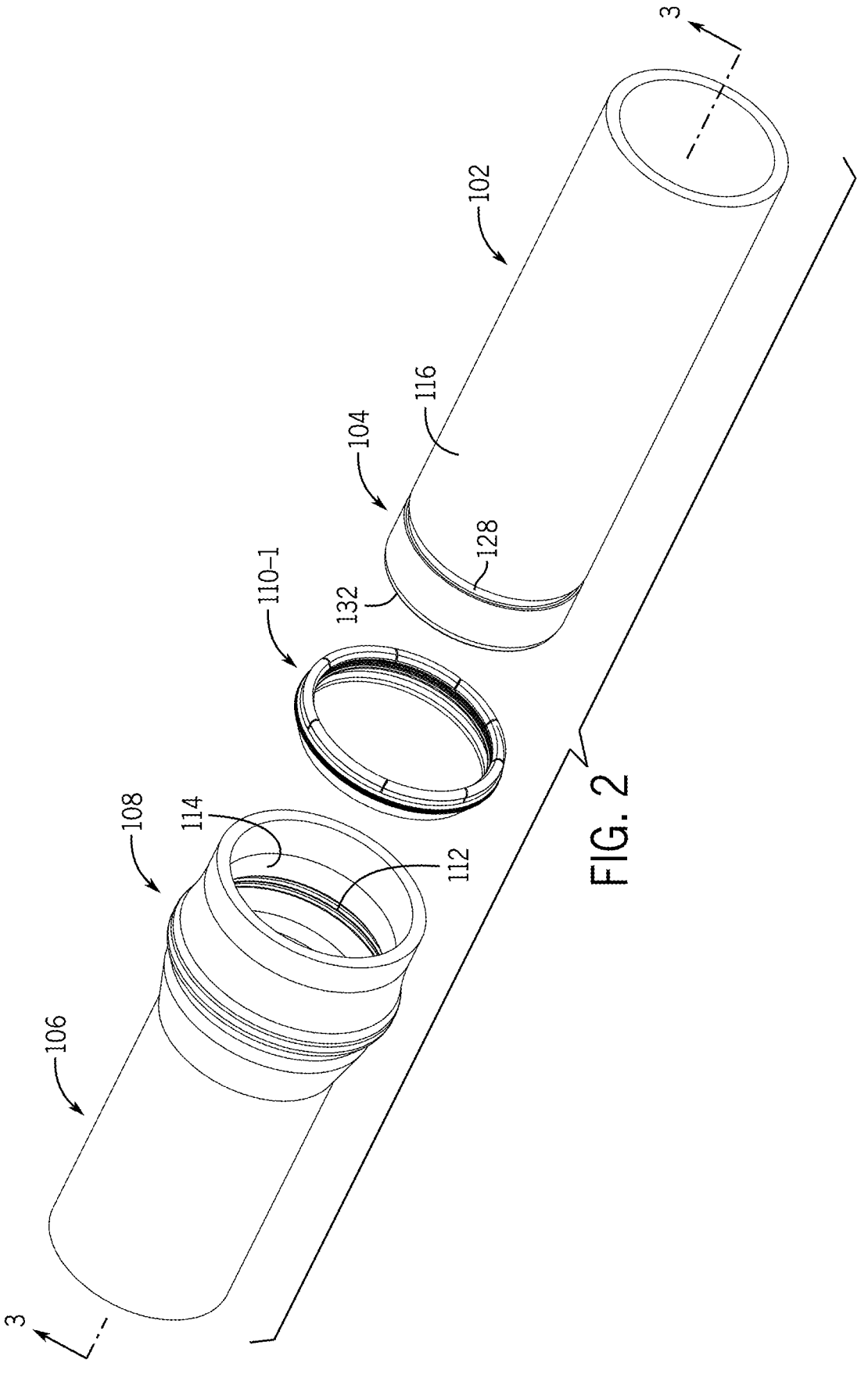
FIG. 2 shows an exploded view of the pipe joint assembly of FIG. 1 including an insert device constructed in accordance with the teachings of the present disclosure.
Figure 3:
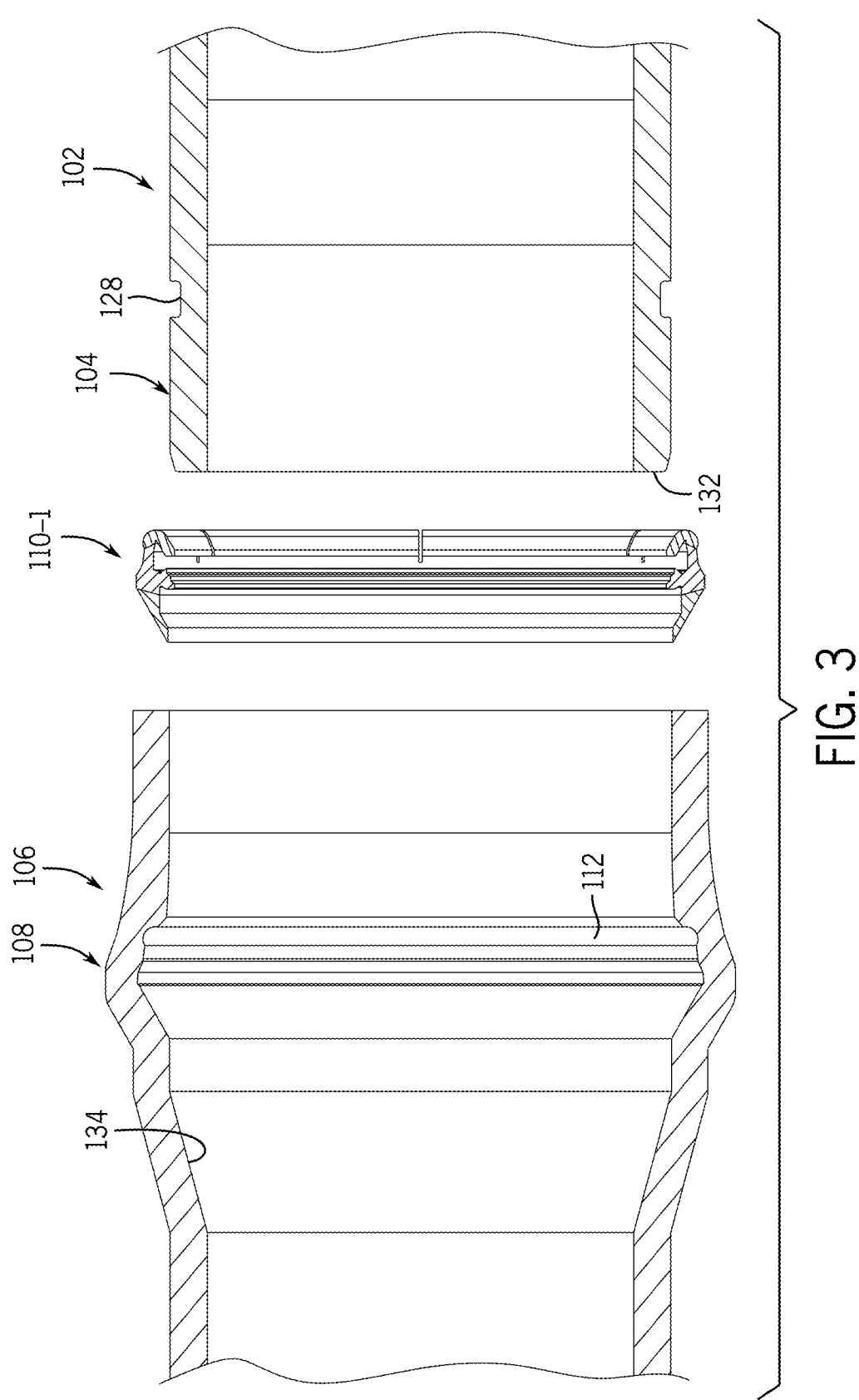
FIG. 3 shows a cross-section view taken along line 3-3 of the pipe joint assembly of FIG. 2.
Figure 5:
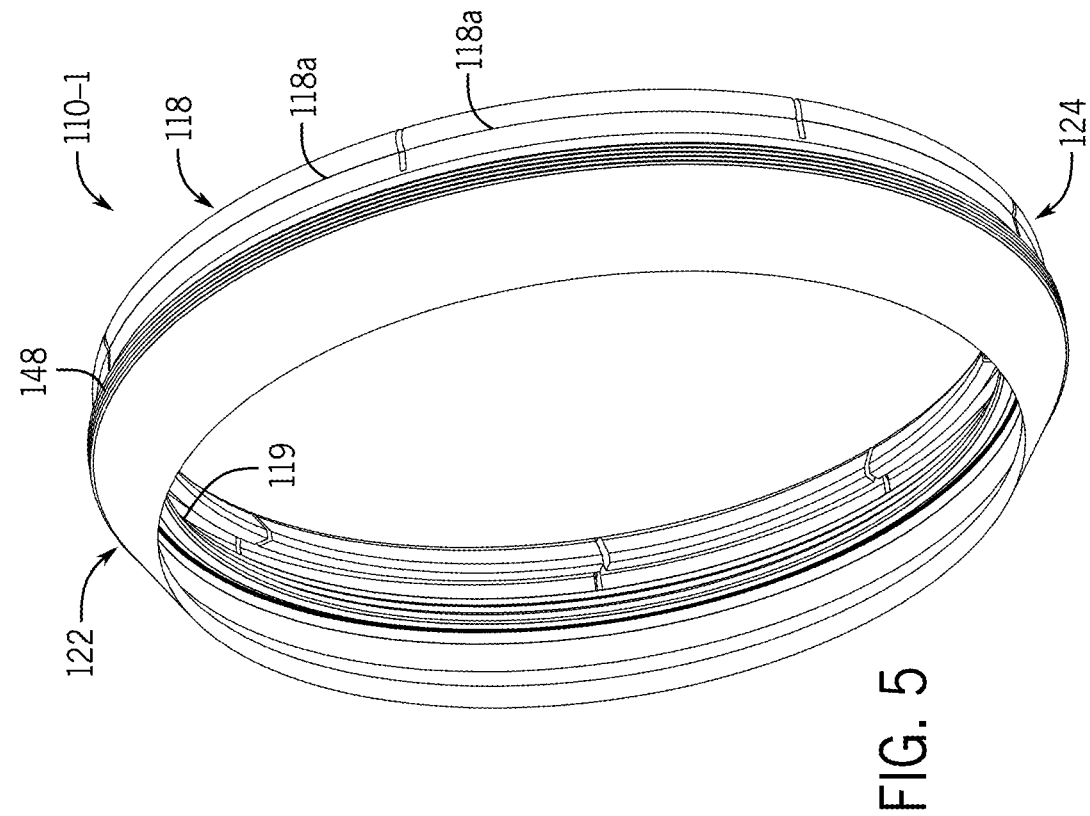
FIGS. 4 and 5 show opposite perspective views of the insert device of the pipe joint assembly of FIG. 2.
Figure 4:
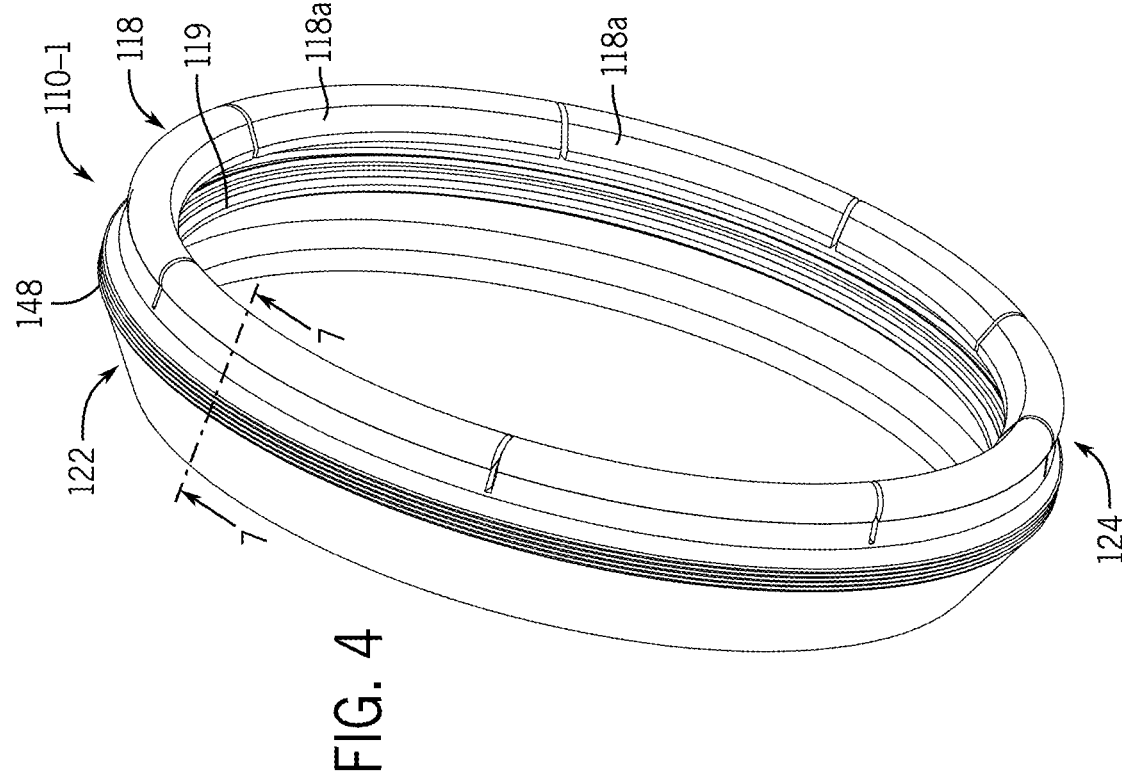
Figure 6:
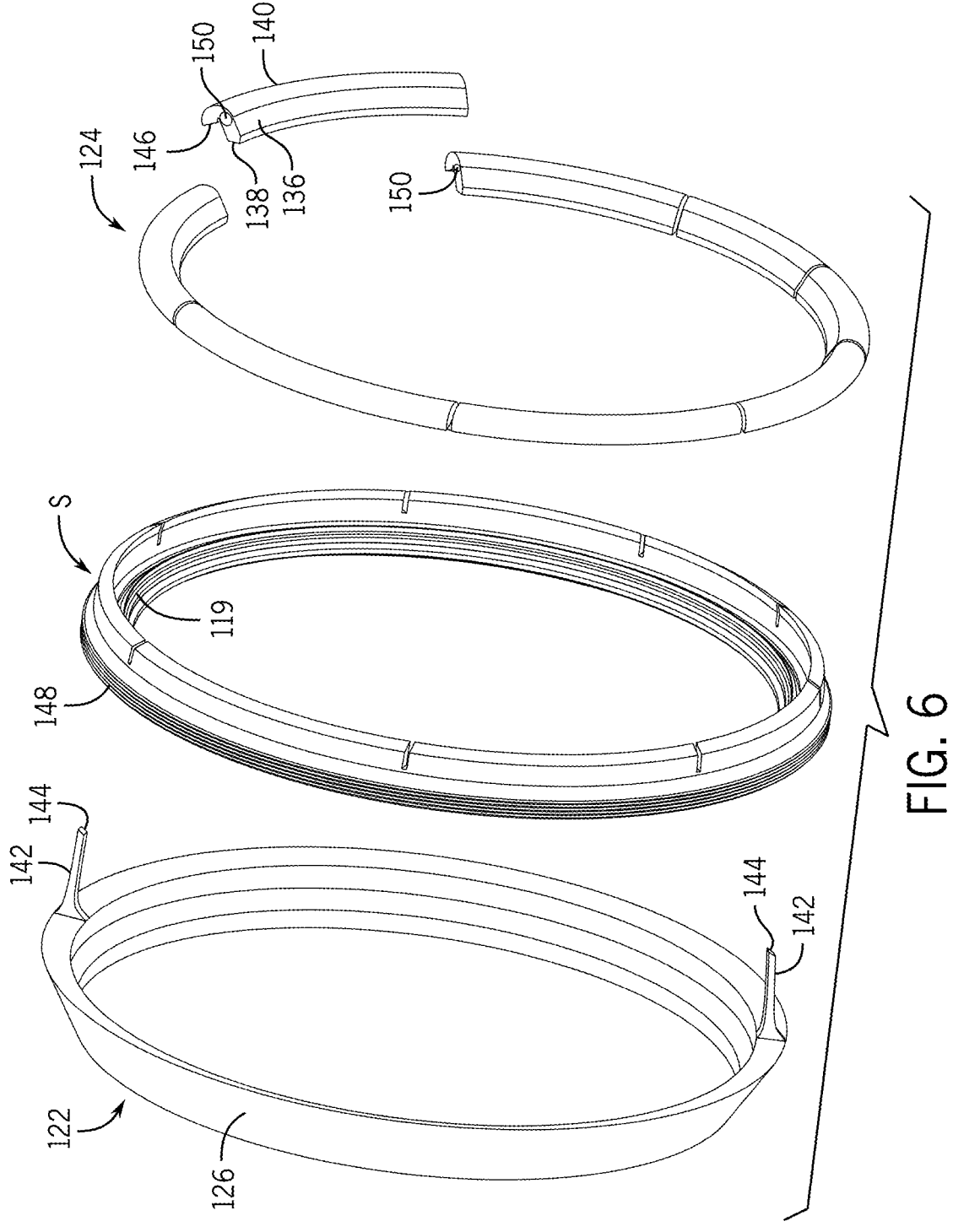
FIG. 6 shows an exploded view of the insert device of FIGS. 4 and 5.

Turning now to the drawings, FIGS. 1-3 illustrate one example of a pipe joint assembly 100 constructed in accordance with the teachings of the present disclosure. In this example, the pipe joint assembly 100 has two pipes joined to one another at the pipe joint assembly. A first pipe 102 of the two pipes has a male end or spigot 104 that may have an inside diameter (ID), a wall thickness, and an outside diameter (OD) that essentially match those of the majority of a length of the first pipe. A second pipe 106 of the two pipes has a belled end 108 or a female end or socket into which the male end or spigot 104 of the first pipe 102 is received. The female end or belled end 108 of the second pipe 106 may be formed or belled to have a larger ID and OD compared to those of the majority of the length of the second pipe and compared to those of the male end or spigot end 104 of the first pipe 102.

As discussed further below in more detail, the female end or belled end 108 of the second pipe 106 is also formed to include an insert device 110-1 constructed in accordance with the teachings of the present disclosure. The insert device 110-1 in this example is installed between the first pipe 102 and the second pipe 106 in the pipe joint assembly 100. The insert device 110-1 can be called a cartridge, an insert cartridge, a spline former (in many examples), a groove former (in some examples), a seal cartridge (in many examples), a spline insert (in many examples), a seal insert (in many examples), or some other suitable term. Referring to FIGS. 2 and 3, in one example, one or more grooves 112 may be formed on an inside surface 114 of the female or belled end 108 of the second pipe 106. The one or more grooves or recesses 112 on the pipe inside surface 114 may be formed during a belling process while forming the female or belled end 108 of the second pipe 106, as described further below. Instead, the one or more grooves or recesses 112 may be cut or otherwise formed as races into the inside surface 114 of the ID of the second pipe 106. In any case, the insert device 110-1 is disposed between an outside surface 116 on the OD of the first pipe 102 and the inside surface 114 on the ID of the second pipe 106 in the pipe joint assembly 100.

In the embodiments disclosed and described herein, the insert device 110-1 creates or is implemented to create a spline 118 as an integral part of the insert device and which interlocks the two pipes together at the pipe joint assembly 100. The insert device 110-1 in this and many other embodiments disclosed and described herein is also configured to provide and create a seal 119 between the two pipes 102, 106 at the pipe joint assembly 100. The insert device 110-1 in this example and in other embodiments disclosed and described herein creates both a seal between the two pipes 102, 106 and forms the spline for locking the two pipes together. In the disclosed examples or embodiments of the pipe joint assembly 100, aspects of the insert device 110-1 can be modified and the device substituted according to alternative embodiments of the insert devices disclosed and described below.

FIGS. 4-7 show various views of the insert device 110-1 constructed in accordance with the teachings of the present disclosure. In this example, the insert device 110-1 includes an annular body 120 with a seal portion 122 and a spline portion 124. In this example, the seal portion 122 is mostly a space between a leading end portion 126 of the annular body 120 and the spline portion 124. The annular body 120 generally has an annular or circular shape with a circumference and an axis defined at the center of the ring or annulus. In this example, the spline portion 124 of the annular body 120 forms the spline 118 as an integrated part of a monolithic insert device structure. The spline 118 is configured to resiliently move in a radial direction relative to the axis of the insert device. A seal material S is co-molded, insert molded, dual molded, or otherwise molded to the annular body 120 to form the insert device 110-1. The seal material is configured to form the seal 119 also as an integrated part of the monolithic insert device structure in this example. Details of this example of the insert device 110-1 and other alternate examples of insert devices are further described below.

The insert device 110-1 may be pre-disposed or pre-installed within the female end or belled end 108 of the pipe 106. In other examples, an insert device may be inserted into a groove, race, recess, or the like in the female end or belled end 108 of the pipe 106. Such installation methods are further described below. The spigot 104 of the first pipe 102 is formed having a spline groove 128 in the OD surface 116. In many of the disclosed examples, including the insert device 110-1, the insert device is configured to provide a monolithic or one piece component that create both the spline 118 and the seal 119, eliminating the need for separate seal and spline parts in the pipe joint assembly 100. This reduces the cost and complexity of the components required for a pipe joint assembly and simplifies the assembly process required for forming a pipe joint assembly.

Figure 8:
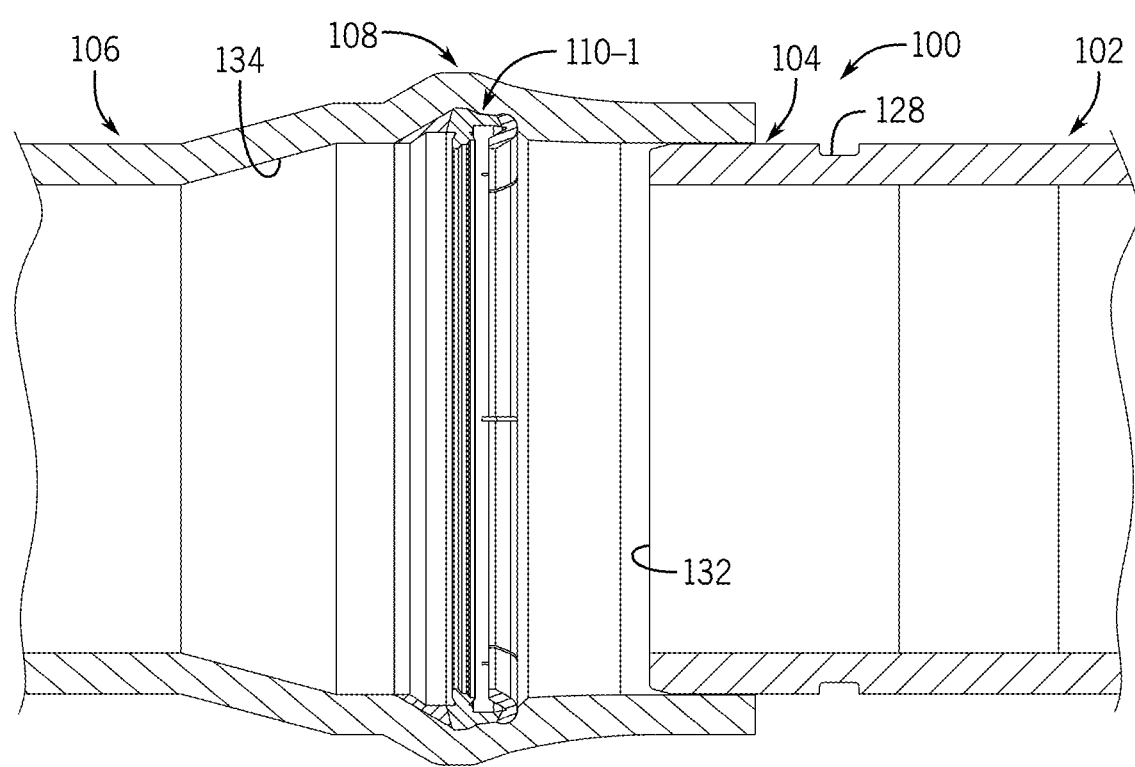
FIGS. 8-11 show views of the pipe joint assembly of FIG. 3 in progressive stages of being assembled.
Figure 9:
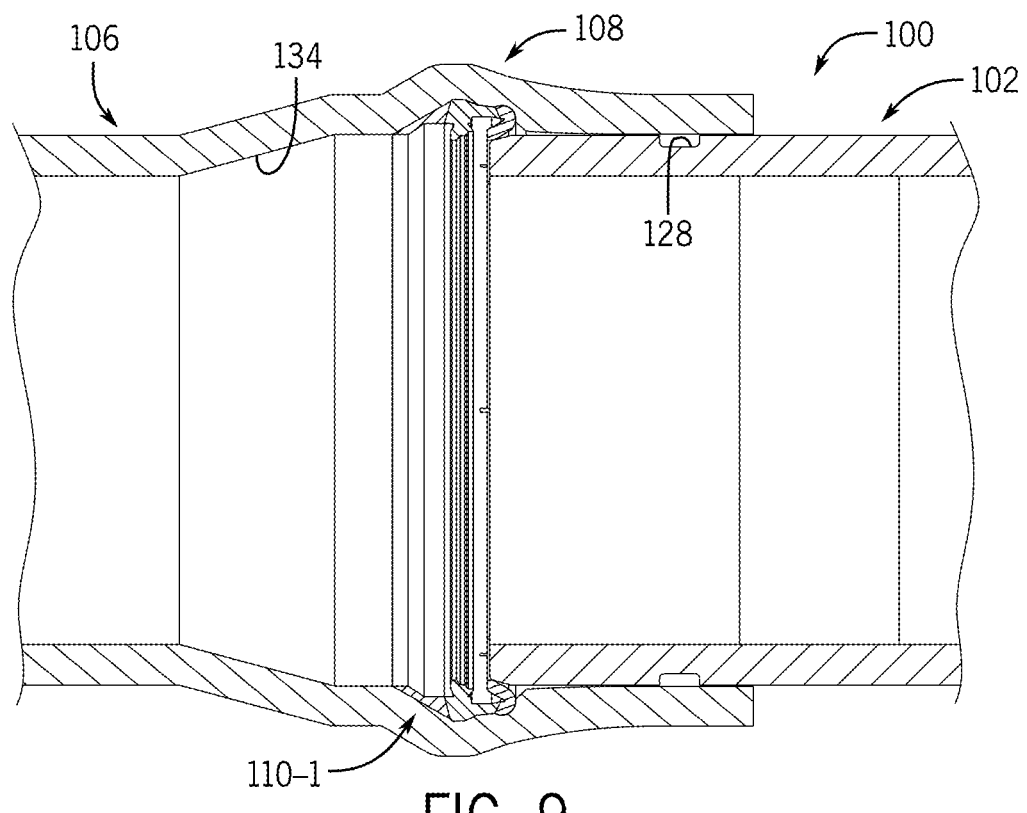
Figure 10:
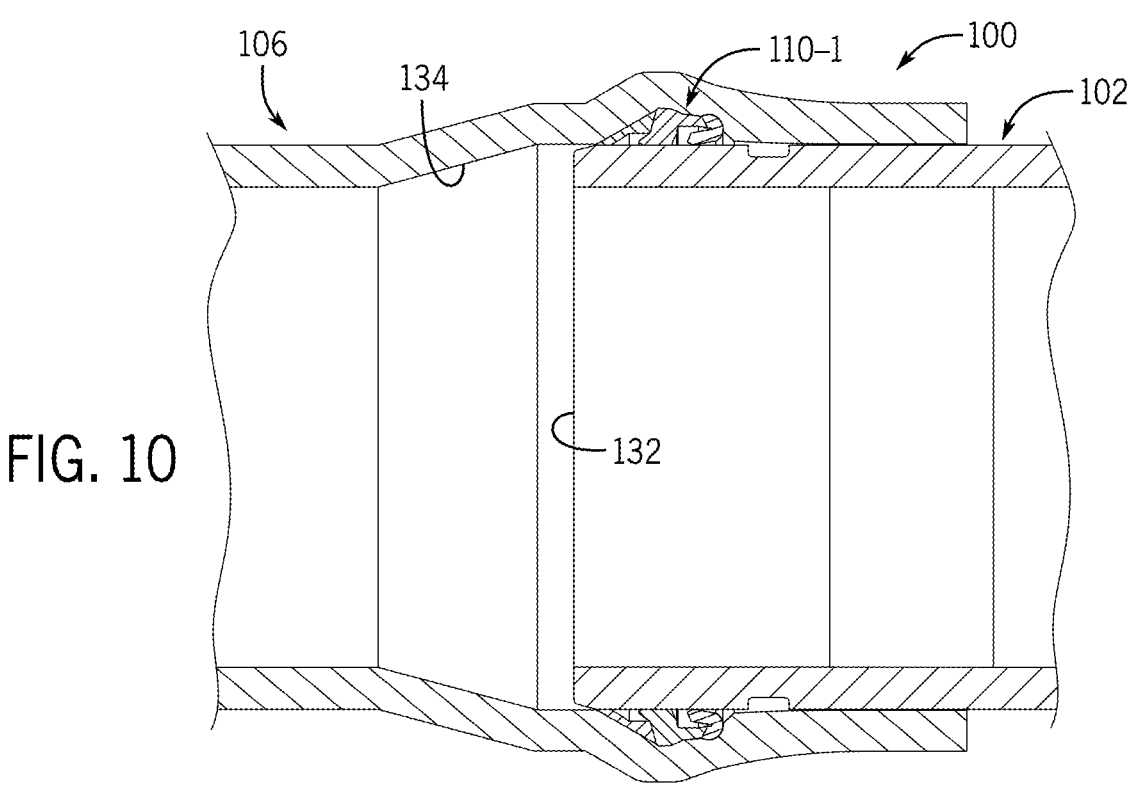
Figure 11:
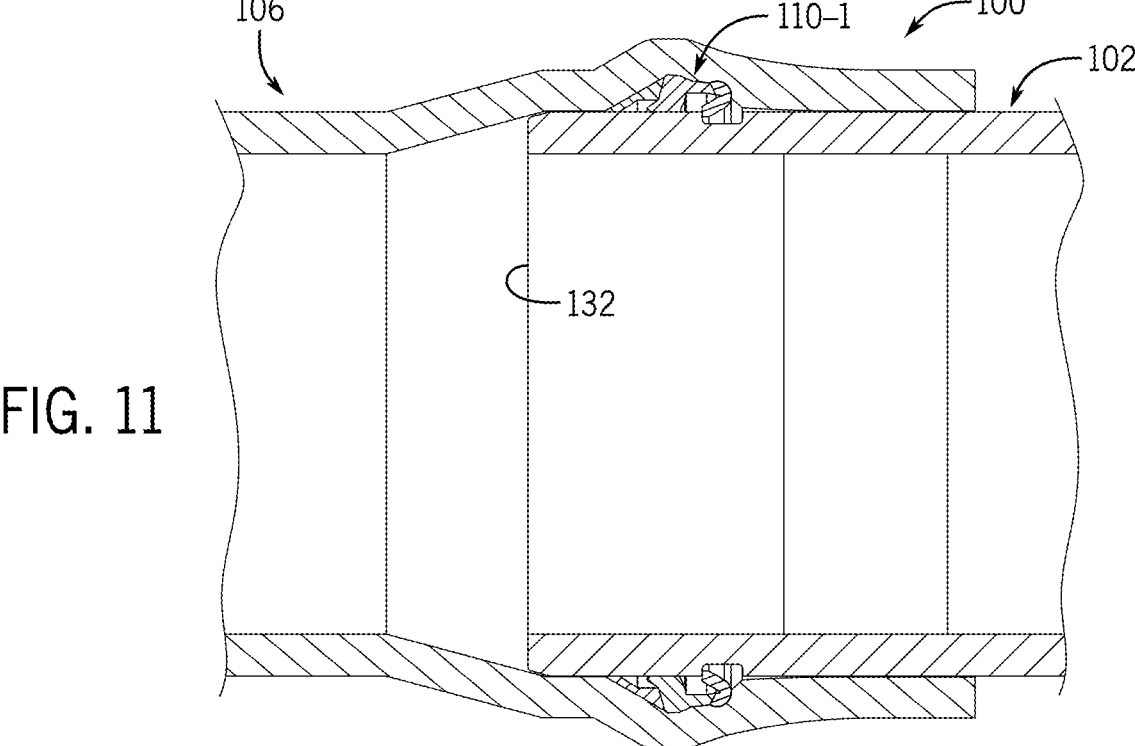

FIGS. 8-11 show the pipe joint assembly 100 of FIGS. 1-3 in various stages of assembly. The insert device 110-1 resides within the ID of the second pipe 106 in the female or belled portion 108. To assemble the pipe joint assembly 100, the spigot 104 of the first pipe 102 is inserted into the female or belled end 108 of the second pipe 106 and is pushed axially inward, as shown in FIGS. 8-10. A distal end 132 of the spigot 104 can abut an angled wall 134 or a stop in the female or belled end 108 of the second pipe 106. The positioning of the distal end 132, the angled wall 134, the spline 118, and the spline groove 128 can be configured so that the spline and spline groove automatically align with one another, as shown in FIG. 11, when the distal end 132 of the pipe 102 bottoms against or abuts the angled wall 134.

In this example, the spline 118 has an angled or tapered surface 136 that faces radially inward and that is angled or ramped to permit insertion of the first pipe. As the first pipe 102 is being pushed into the second pipe 106, the spline 118 is resiliently biased radially outward by contact between the tapered surface 136 and the OD surface 116 of the first pipe, as depicted in FIGS. 9 and 10. Once in the fully inserted position, or when the spline groove 128 and spline 118 align with one another, the spline 118 resiliently retracts into the spline groove 128. As shown in FIG. 11, the spline 118 is also configured to lock the two pipes 102, 106 together and prevent the two pipes from being pulled apart. In this example, the spline 118 has a free end 138 resides in the spline groove 128 and abuts an axial surface of the groove. The spline 118 also has an opposite stop end 140 that can abut a stop surface of one of the grooves or recesses 112 in the ID surface 114 of the female or belled end 108 of the second pipe 106. When the two pipes 102, 106 are pulled apart, the axial surface within the groove 128 will apply a force against the free end 138 of the spline 118. This will create hard contact between the stop end 140 of the spline 118 and the stop surface of the groove or recess 112 on the ID surface 114 in the second pipe 106, preventing separation of the two pipes.

In the example of FIGS. 1-11, the spline 118 is created as a part of the insert device 110-1 to mimic and thus replace an elongate plastic strip type spline. Such a spline would have been inserted into a space formed by corresponding grooves in the overlapping ends of the two pipes or would have been inserted through a hole in the female end of the second pipe section into the space of the corresponding grooves. The integrated spline of the disclosed insert device examples replaces such discrete spline parts. The integrated spline of the disclosed examples still interlocks the two pipes together by preventing the two pipe sections from being separated axially relative to one another. In the disclosed examples, the spline is circumferentially expandable and contractable, as described further below.

Details of the insert devices can vary within the spirit and scope of the present disclosure, as will become evident upon reading the written description and reviewing the various examples disclosed and described herein. In the above example, the insert device 110-1 includes a relatively stiff or rigid body material that forms the annular body and includes a different, less stiff, softer, or less rigid seal material S joined to, connected to, or carried by the annular body.

In one example, the annular body 120 may be formed from a polymer. In some examples, the polymer may be at least one of polypropylene (PP), high density polyethylene (HDPE), Acetal, Delrin, Nylon, flexible polyvinyl chloride (PVC), or the like. In other examples, the polymer may include at least one reinforcing material or fiber, such as glass, carbon, fibers, talc, a structural filler, or the like. In one example, the annular body can have a modulus of elasticity in a range of about 1E9 N/m$^2$ to about 4E9 N/m$^2$. The annular body may include an axis, an ID, and an OD. The annular body 120 may also have an axial length, such as is depicted in each of FIGS. 4, 5, and 7.

In one example, the seal material S may be an elastomer. The seal material is also formed to have a circular, annular, or ring shape and is coaxial with the annular body 120. In some examples, the seal material can be connected to an axial end of the annular body. In other examples, the seal material can extend though the annular body or can be received in a pocket formed around the annular body. These various embodiments are disclosed throughout the written description and drawings. Portions of the seal material may be exposed on the ID surface of the insert device, on the OD surface of the insert device, or both, to create a fluid tight seal within the pipe joint assembly. In some examples, the seal material, such as the elastomer, may be formed of at least one of an isoprene rubber (IR), a styrene butadiene rubber (SBR), an IR/SBR blend, a nitrile, an ethylene propylene diene monomer (EPDM) rubber, Viton, or the like. In some applications, the seal material may be an elastomer that may satisfy the chemical compatibility requirements of ASTM standard F477 for elastomer seals for plastic pipe joints. In an example, the seal is less rigid than the annular body and may have a hardness in a range of about 40 Shore A to about 80 Shore A.

As shown in FIGS. 4-7, the insert device 110-1 in this example carries the integrated spline 118 as part of the insert device. In this example, the spline 118 is provided as part of the spline portion 124 of the annular body 120 and may be formed as a contiguous portion of and from the same material as the annular body of the insert device. The seal material S may be insert molded or dual molded with the annular body 120 and spline 118. The spline 118 may be formed having two or more spline segments 118a that are ultimately circumferentially disconnected from one another around the insert device 110-1. The spline part may thus expand or contract in diameter, as needed, during installation and use of the insert device. The spline 118 may be connected to the remaining or main part, i.e., the leading end part 126 of the annular body 120 through only minimal connecting parts. For example, one or more axial bridges 142 may extend between the leading end part 26 and the spline 118 and the spline segments 118a may be circumferentially connected by breakable or frangible connections 144. The axial bridges may also be connected to the spline 118 by similar breakable or frangible connections (not shown). During formation of the insert device 110-1, the annular body 120 can be one integrated part. During installation of the insert device 110-1, these frangible connections 144 can be configured to break, releasing the spline 118 and spline segments 118a to move radially relative to the remainder of the annular body 120.

Figure 7:
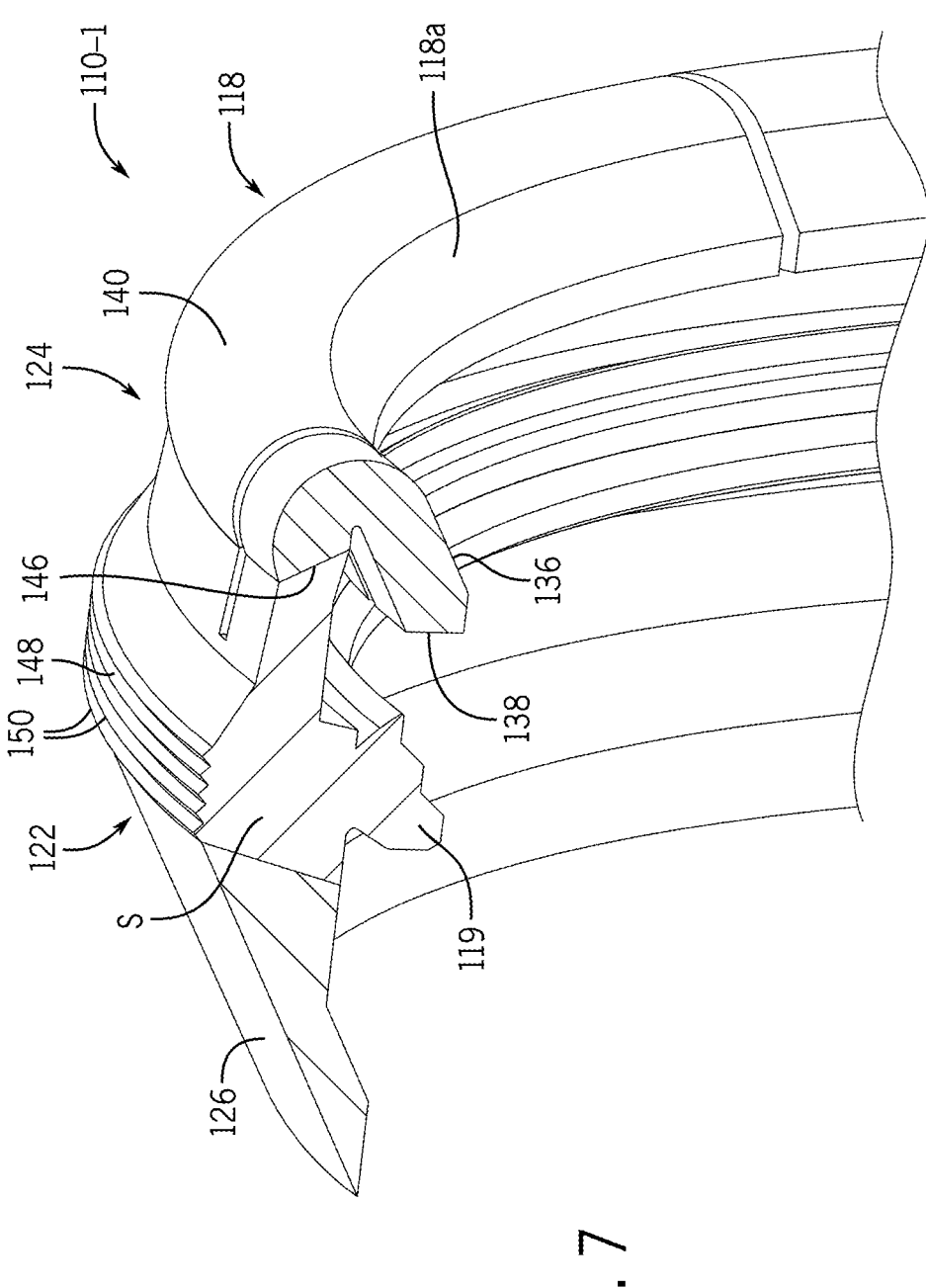
FIG. 7 shows a cross-section taken along line 7-7 of the insert device of FIG. 4.

In this example, as shown in FIG. 7, the spline 118 is connected to the seal material S at an axial end thereof that is opposite the main part or leading end part 126 of the annular body 120. The spline 118 thus may be resiliently movable in a radial direction due to the flexibility of the seal material S. In this example, the spline 118 is cantilevered to the seal material S and thus can bend or pivot in the radial outward direction. In this example, the spline 118 has a J-shape in cross-section with a proximal end 146 that is connected to the seal material S and faces toward the leading end part 126 of the annular body 120. The spline 118 also has a curved portion that defines the stop end 140 and a leg extending from the curved portion and terminating at the free end 138. In an unstressed, i.e., an at rest or natural position (see FIGS. 3 and 7), the leg extends at an angle radially inward relative to the annular body 120 and the seal material S but in an axial direction generally back toward the annular body. The leg terminates at the free end 138 or locking end. The angled inward facing surface of the leg defines the tapered, angled, or ramped surface 136 of the spline 118 to allow insertion of the spigot into the belled end of the second pipe and through the insert device until the spline snaps into the spline groove on the OD of the spigot.

The circumferential separation of the spline 118 into two or more spline segments 118a allows the spline part (each spline segment) in this example to pivot and expand radially outward. The number of spline segments can vary from two (2) segments (one-half of the spline part circumference) to any number of smaller segments, such as sixteen (16) different segments. The insert device 110-1 as disclosed herein, including the annular body 120 (inclusive of the seal portion 122 and the spline portion 124), the spline 118, and the seal material S, is not intended to be limited to any specific materials or material types. The material of both the annular body and the seal may vary within the scope of the present disclosure and may vary from the limited examples mentioned herein. In this example, the seal material is resilient enough to allow the spline to move relative to the remainder or main part of the annular body.

Embodiments of the insert device are configured to be installed in an interior of a polymer tube, such as an end of a PVC pipe or in a PVC pipe coupling, i.e., the second pipe in the disclosed example. In addition, the installed insert device in some embodiments may form a seal or seals at the pipe joint assembly. Referring to FIGS. 1-11, in some examples, the seal material may be configured to form a seal 148 between the insert device 110-1 and the ID surface 114 of the second pipe 106. The seal material S may have a portion exposed on the OD surface of the annular body 120 to form the seal 148 and contact the ID surface 114 of the belled end of the second pipe. In the various disclosed examples, the insert device 110-1 may also be configured to form the seal 119 between the insert device and the OD surface 116 of another pipe or coupling, i.e., the spigot of the first pipe in FIGS. 1-11.

In an example, when an insert device is installed in the pipe joint assembly between the first and second pipes, the seal or seals may experience a degree of compression to form the liquid tight seal. In one example, the seal part may experience a compression ratio of about 10% to about 35%. This ratio may be different within different pipe joint arrangements and depending on the specific seal part and annular body configuration of a given insert device. As used herein, compression ratio may be defined as a percentage of the seal part that changes shape from uncompressed to compressed in use within a pipe joint assembly.

In some examples, the insert device may be sized for a wide range of pipe diameters. This range may be between about 3 inches OD to about 48 inches OD, though other sizes are certainly possible. Further, the axial length of the insert device and the seal part can also vary within a wide range of sizes. In one example, the insert device, or the seal part, may have an axial length of about of about 0.125 inches to about 3 inches.

In some examples, the annular body may have at least one, but possibly two or more, distinct portions that protrude radially outward relative to other parts of the annular body or insert device to define one or more "humps" when viewed relative to the OD surface of the insert device. Such annular hump portions in such an example may be integrally formed as part of the monolithic or unitary annular body.

Though not shown in this example, one annular portion or hump may be provided to form a spline groove portion in the annular body, as described further below. A spline groove portion may define an annular spline groove that faces radially inward and that extends around the annular body. The annular spline groove may create a part of the for receiving the spline 118 or at least accommodating the radial outward movement of the spline when assembling the pipe joint assembly 100 to permit installation of the first pipe 102 into the second pipe 106. The other part of the locking space may be created by the spline groove 128 formed in the outer or OD surface 116 of the first pipe 102, as shown in FIGS. 2 and 8-11 and as mentioned above.

An annular hump portion of the annular body 120 may also be provided that coincides with the seal material S, as in the example of FIGS. 1-11. The seal material of the insert device may be configured to form a hump, such as at the seal 148. In the disclosed examples, the annular body may be formed having a cross-section profile that creates at least one change in radial height, such as the aforementioned hump or humps, in an axial direction on the body. This is to create an axial positioning and locking mechanism to position the insert device at a desired axial or lengthwise location along the length of the pipe joint assembly and to aid in retaining the insert device in the desired axial position relative to the female or belled end of the second pipe.

In at least some of the disclosed examples, a connecting portion may be defined as joining the seal portion 122 and the spline (and optionally a spline groove) portion 124 of the annular body 120. The connecting portion may have a shorter radial height dimension than that of the adjacent seal portion and spline portion on the annular body. Thus, the outer surface of the insert device may have an M-like shape with a valley or trough defined by the connecting portion between the annular seal and spline portions. The inner surface of the belled end on the second pipe would thus have a corresponding M shaped double insert recess or double groove 112 in the female or belled end. When installed, the insert device is nested or seated in the insert recess and is captured between the first and second pipes. The corresponding shape of the OD surface of the insert device and the insert recess or recesses on the ID surface of the belled end of the second pipe locates the insert device and axially retains the insert device in place when the pipe joint assembly is assembled. In the example of FIGS. 1-11, the annular body only has a single hump. Thus, when the belled end of the second pipe is formed, the belled end would only have a single insert recess on the ID surface.

The shape and configuration of the annular body, the seal material, and the spline of the insert device may vary from the examples shown and described herein and yet function as intended. The annular seal portion and the spline portion (as well as the optional connecting portion) of the annular body can each have their own unique size, shape, and configuration, independent of the other portion. Each portion can also take on any of the disclosed example shapes, regardless of the shape of the other portion. The seals and seal material may also vary in size, shape, and configuration from the examples disclosed and described herein.

FIGS. 4-7 show an example of an insert device 110-1 constructed in accordance with the teachings of the present disclosure. The seal material S is co-molded to an edge of the seal portion 122 or the leading end part 126 of the annular body 120. The seal material S has a protruding inner seal 119 or seal element that protrudes radially inward and is sized and configured to contact the OD surface 114 on the male end, i.e., the spigot 104, of the first pipe 102 to create a seal thereat. The seal material also has a protruding outer seal 148 or seal element that protrudes radially outward from the seal portion 122 of the annular body 120 and is sized and configured to contact the ID surface 116 in the female or belled female end 108 of the second pipe 106 to create a seal thereat. The outward radial height of the outer seal 148 is larger than the outward radial height of the annular seal portion 122 in this example. However, the outer seal 148 may be formed to contact the belled end of the second pipe at a position or location that is radially inward of the maximum radial height of the annular body. Further, each of the inner and outer seals 119, 148 may be have a rib or ribs 150, or other such formations, to aid in creating a fluid tight seal against the pipe surface in contact with the seals. Each seal 119, 148 can include a plurality of such ribs 150, which can extend circumferentially around the insert device 110-1 and which can be spaced part from one another on each of the seals.

In the example of FIGS. 4-7, the seal material S may be over-molded to both the ID and OD surfaces of the annular body 120, and may pass through openings, holes, or gaps in the seal portion 122 of the annular body so that the seal material S is exposed on both the OD and ID surfaces of the insert device. The seal material S includes a connecting part 152 extending axially toward the spline 118 from the portion of the seal material that defines the inner and outer seals 119, 148. The connecting part 152 joins to the spline 118 and acts as the resilient cantilever for the spline. The connecting part 152 of the seal material S can flex or give, as the spline 118 is pivoted during formation of the belled end of the second pipe (see below) and during installation of the spigot of the first pipe into the belled end to form the pipe joint assembly.

As noted above, in one example, two annular portions of the annular body 120, i.e., the seal portion 122, or the leading end part 126, and the spline portion 124, may be connected by a connecting portion disposed between the two annular portions. The connecting portion may be formed as a plurality of the aforementioned thin walled axial bridge parts 142, ribs, or the like, separated or spaced apart by voids, openings, or holes through the connecting portion. The connecting portion may instead be formed as a substantially solid, thin walled, continuous structure. Smaller perforations or separations may be formed in the connecting portion instead of it being a completely solid structure to allow for flexibility of the connecting portion, and thus the spline portion. The design of the connecting portion may vary, depending on the need to achieve a cost, material usage, and/or weight objective. The size, axial length, thickness, and the like, of the connecting portion may also vary, depending on the needs or design parameters of a given pipe joint assembly application. However, the connecting portions may be provided so that the annular body can be molded as one single contiguous component. Further, the connecting portions may be frangible or include frangible parts so that, once the seal material is formed, joined, or otherwise molded onto the annular body, the spline portion can break free of the seal portion of the annular body.

In other examples, the annular body may include the annular seal portion and the spline portion joined directly to one another and may thus exclude the connecting portion. In still other examples, the annular body may include only a single annular portion, i.e., a single "hump." In some of those embodiments, the single annular portion may be configured to facilitate both the seal aspect or function and the spline aspect or function of the insert device. In other of those embodiments, the single annular portion may include only the spline function or the seal function. Both single and dual hump examples are disclosed and described further below.

Other examples of an insert device according to the teachings of the present disclosure, though not shown herein, may have an annular body with a seal portion that defines a seal groove. Seal material may be seated (co-molded, dual molded, insert molded, adhered, etc.) in the seal groove to create an inner seal that contacts and seals against the OD surface of a spigot. The annular body may also have a spline portion coupled to a connecting portion. The connecting portion may extend axially from one end of the seal portion and the spline portion may have a spline joined to the connecting portion. The spline may have a leg that extends radially inward and back in an axial direction toward the seal portion of the annular body. In this example, the spline or leg may be oriented at an acute angle relative to the connecting portion. The leg or spline may pivot or flex, similar to the example of FIGS. 1-11. However, the flexibility may be provided by the connecting portion and/or the angled joint between the connecting portion and the leg or spline. A spline groove portion may be defined between the inner surface of the connecting portion and the leg or spline, which can flex or bend in the direction of the spline groove portion. Further, the annular body may be formed such that the spline is provided in segments and such that the seal part is also provided in segments. The free end of the spline or leg may define the locking element and the angled inner facing surface of the spline or leg may define the assembly or insertion ramp, similar to the example of FIGS. 1-11.

In another example, also not shown, an insert device may be similar to the alternate examples described above, but where the spline is a body joined to a thin walled connecting portion between a seal portion and a spline portion of the annular body. The spline body may be formed to define the locking element on one side and to define an angled ramp surface on another side permitting installation of a spigot. The spline can be configured to pivot or flex relative to the annular body by bending of the thin walled connecting portion.

Figure 12:
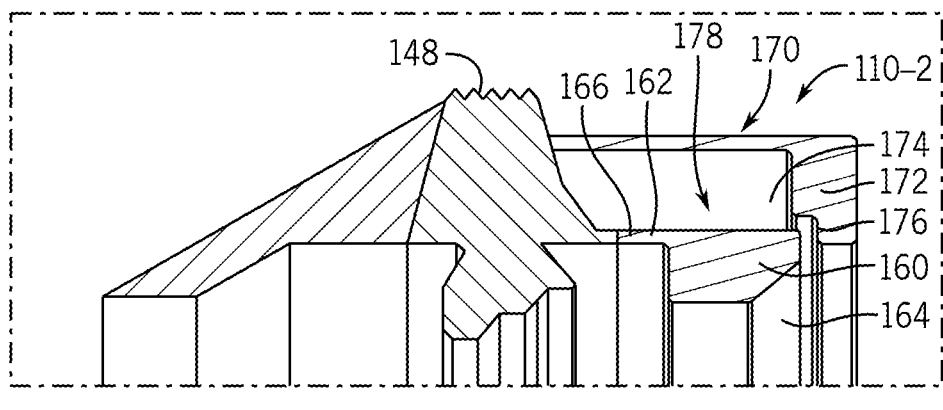
FIG. 12 shows a close-up cross-section view of a portion of another example of an insert device constructed in accordance with the teachings of the present disclosure.
Figure 13:
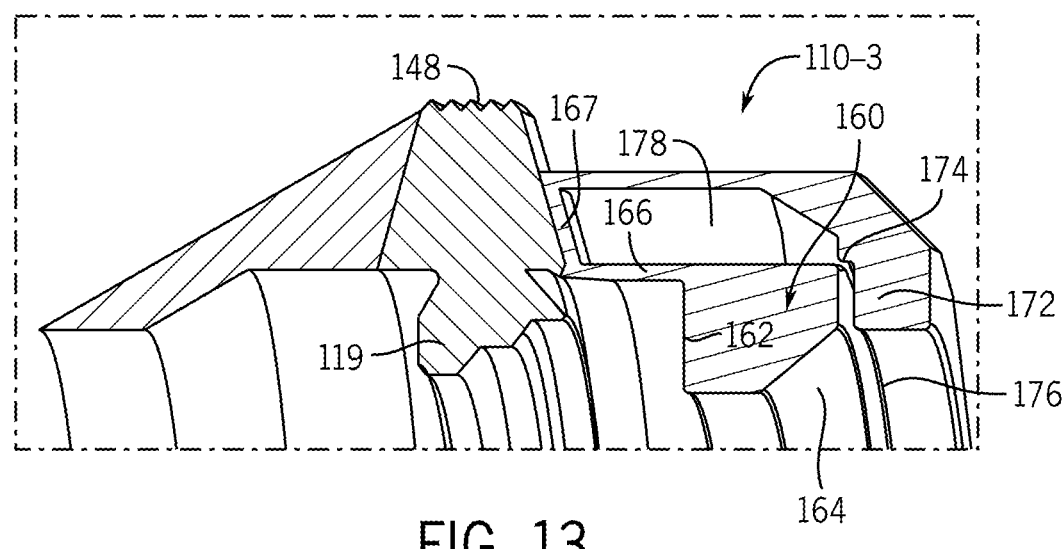
FIG. 13 shows a close-up perspective cross-section view of a portion of another example of an insert device constructed in accordance with the teachings of the present disclosure.

FIGS. 12 and 13 show further alternate examples of insert devices 110-2 and 110-3 that combine features of the previously described cantilevered or pivoting spline examples while including further modifications. In these examples, a spline 160 is again a body with a locking surface 162 on one side and an angled ramp surface 164 on another side. The spline 160 in each example has an arm 166 extending from the locking surface 162 side. In the insert device 110-2 of FIG. 12, the arm 166 is joined to a flexible portion of the seal material S. In the insert device 110-3 of FIG. 13, the arm 166 is joined to a radial extending portion 167 of the annular body. In each example, the annular body also has a connecting portion 168 that extends axially from the seal material S (110-2) or the radial extending portion 167 of the annular body (110-3) to a spline portion 170 of the annular body. A stop part 172 of the spline portion 170 is joined to the free end of the connecting portion 168. The stop part 172 has a right angle recess facing the spline 160 that forms an axial stop surface 174 and a radial stop surface 176. A free corner of the spline 160 can bear against the axial stop surface 176 and the radial stop surface 174 when two pipes of a pipe joint assembly are pulled apart. The stop surfaces 174, 176 aid in preventing the spline 160 from releasing from a groove in a male pipe of the pipe joint assembly, retaining the connection. A spline groove portion 178 on the annular body is also defined between the stop part 173 of the spline portion 170 and the seal material S. spline part and on a radially inward facing surface of the connecting portion 168. The spline 160 can resiliently pivot radially outward via the arm 166 toward the spline groove portion 178 when installed on a mandrel or when a spigot is inserted. In this example, the spline and the connecting portion can again be formed as segments.

Figure 14:
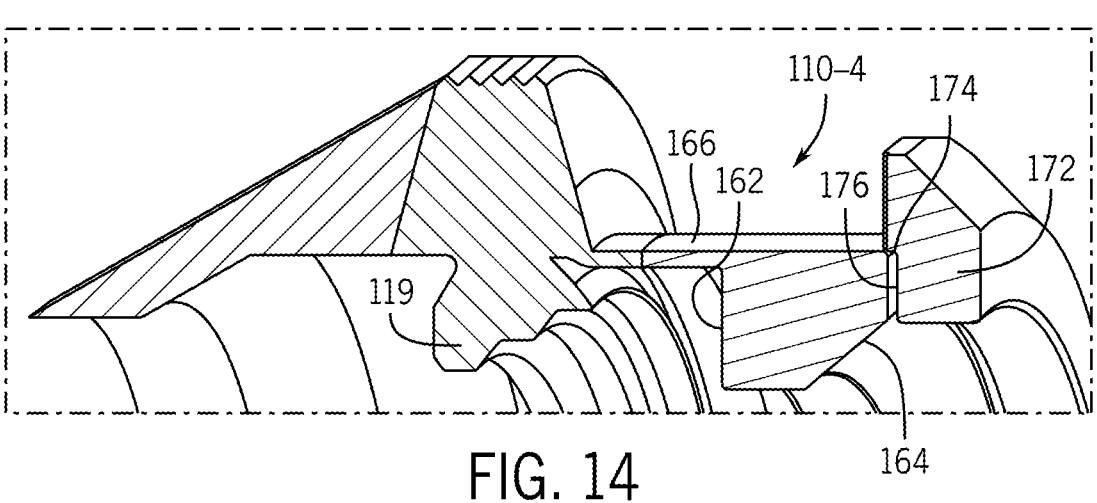
FIG. 14 shows a close-up perspective cross-section view of a portion of another example of an insert device constructed in accordance with the teachings of the present disclosure.

FIG. 14 shows an insert device 110-4 constructed in accordance with the teachings of the disclosure. The insert device 110-4 is very similar to the insert device 110-2 of FIG. 12 in that the spline 160 is connected via an arm 166 to the seal material S providing flexibility and resiliency to the spline. However, in this example, the annular body of the insert device 110-4 does not include the connecting portion 168 and thus has no spline groove portion 178. Instead, the spline portion 170 can be connected to the seal portion or other part of the annular body via axial bridge parts (not shown), as described above and further below. The spline 160 can move radially within the space between the spline portion of the annular body and the seal material S.

As should become evident to those having ordinary skill in the art, the foregoing examples can be modified within the spirit and scope of the present disclosure. Structural details of the splines, the seal material, the annular body, including the seal portion and the spline portion, can be changed. The spline in these examples is radially movable by a resilient pivoting or cantilevered bending action, which can be generated using the seal material, the body material, or both within the scope of the disclosure. The shapes, sizes, materials, and configurations of the various disclosed and other examples can be varied within the inventive concepts.

Figure 15:
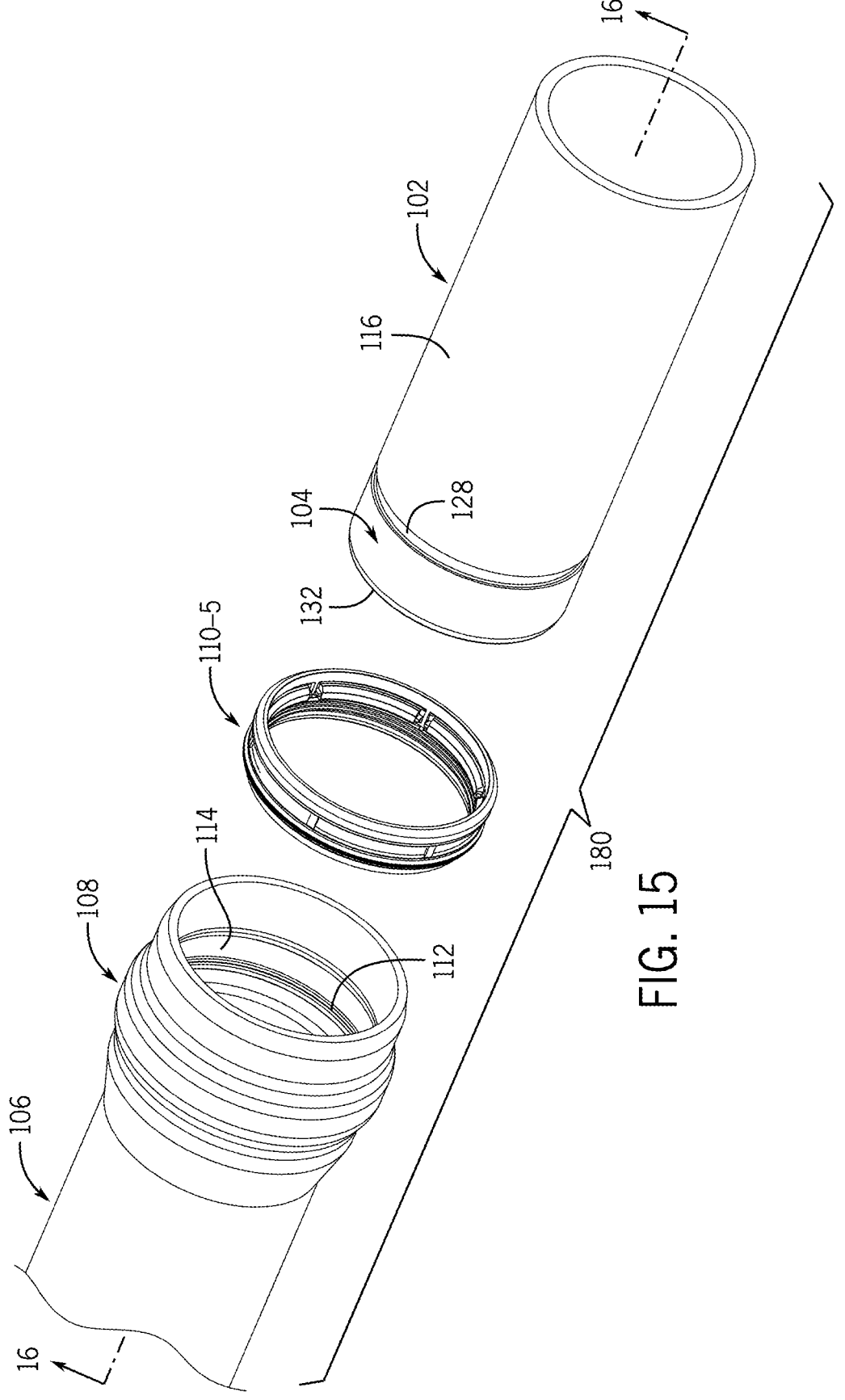
FIG. 15 shows an exploded view of a pipe joint assembly similar to that of FIG. 1 including an insert device constructed in accordance with the teachings of the present disclosure.
Figure 16:
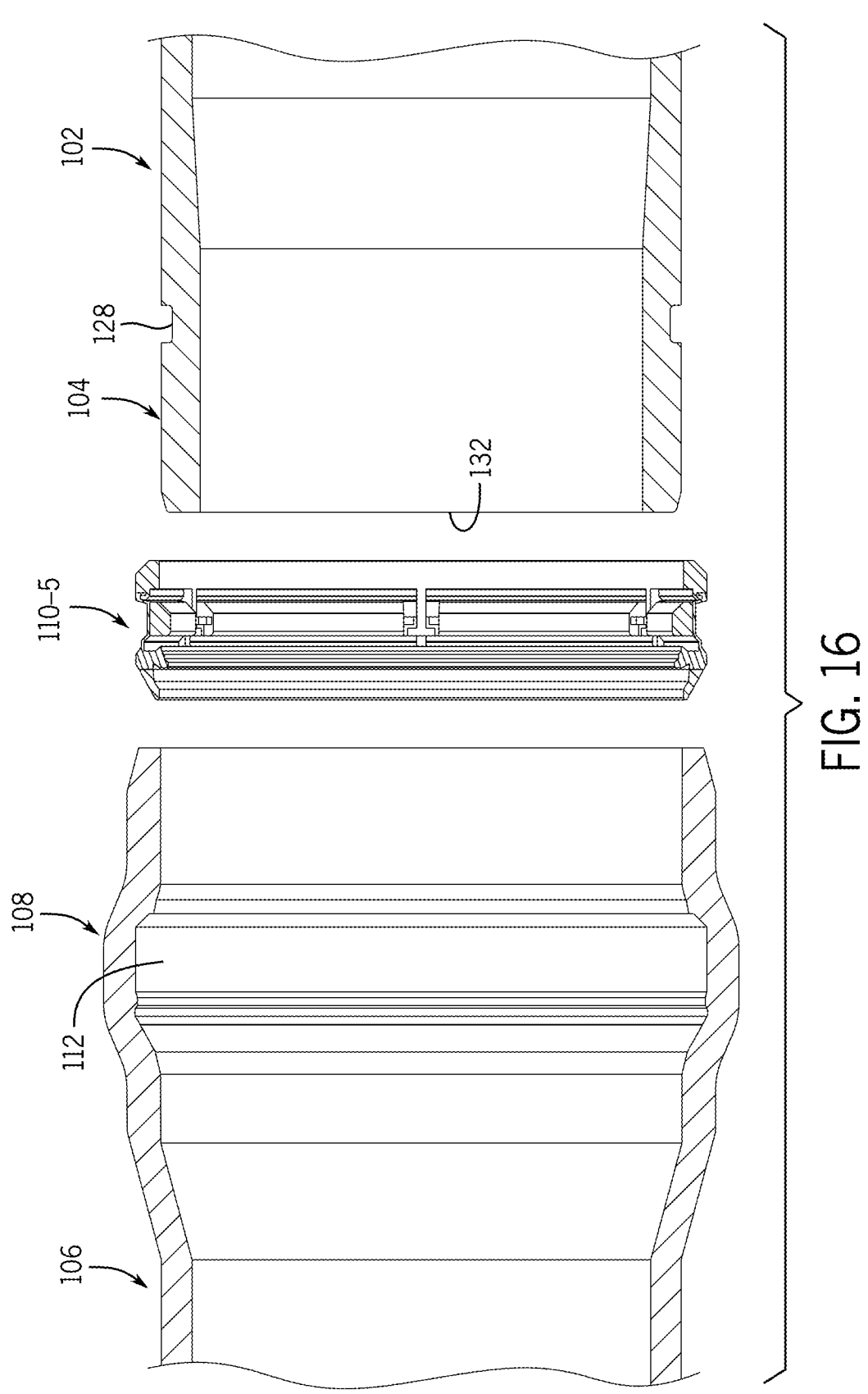
FIG. 16 shows a cross-section view taken along line 16-16 of the pipe joint assembly of FIG. 15.
Figures 17, 18:
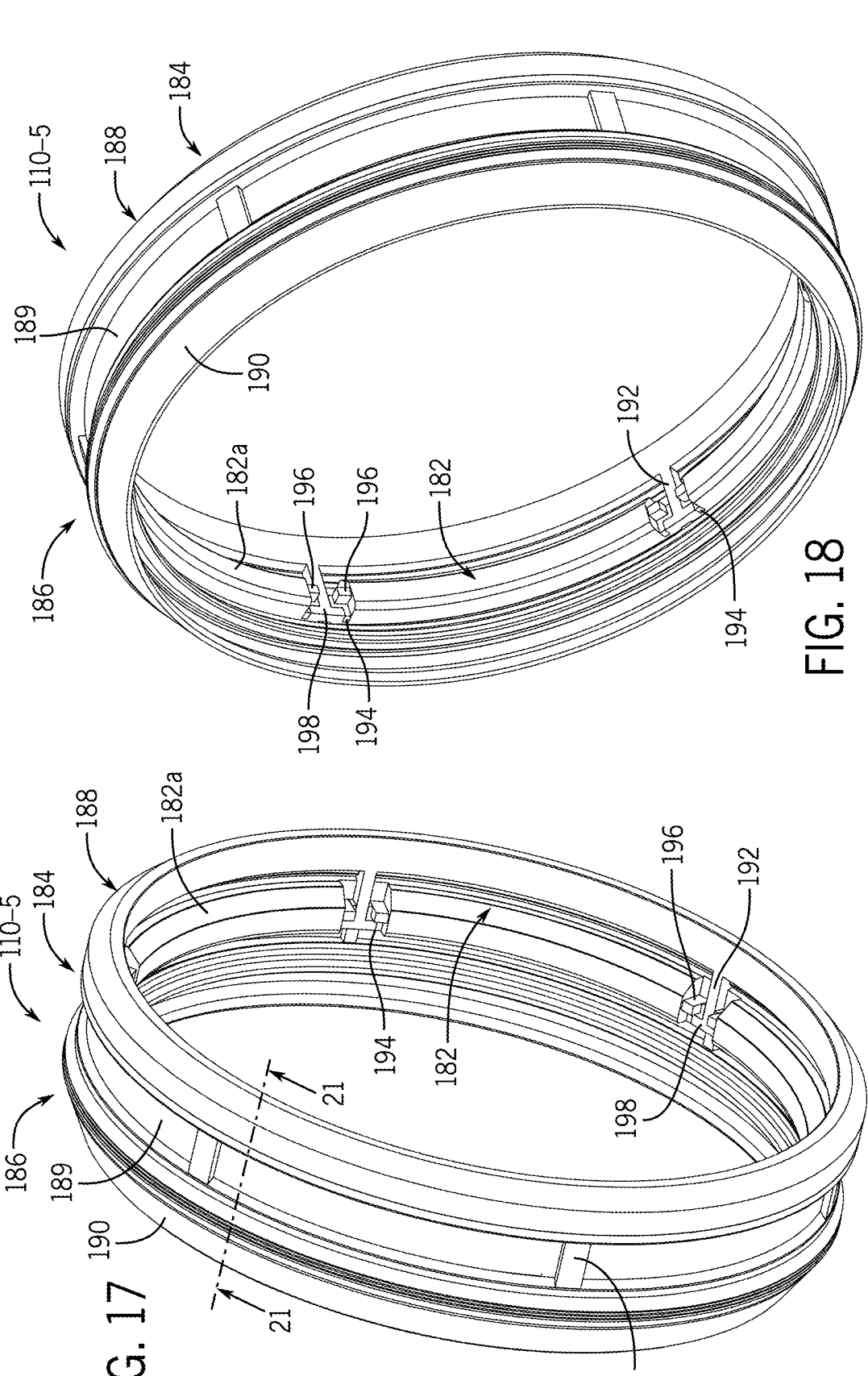
FIGS. 17 and 18 show opposite perspective views of the insert device of the pipe joint assembly of FIG. 15.
Figures 19, 20:
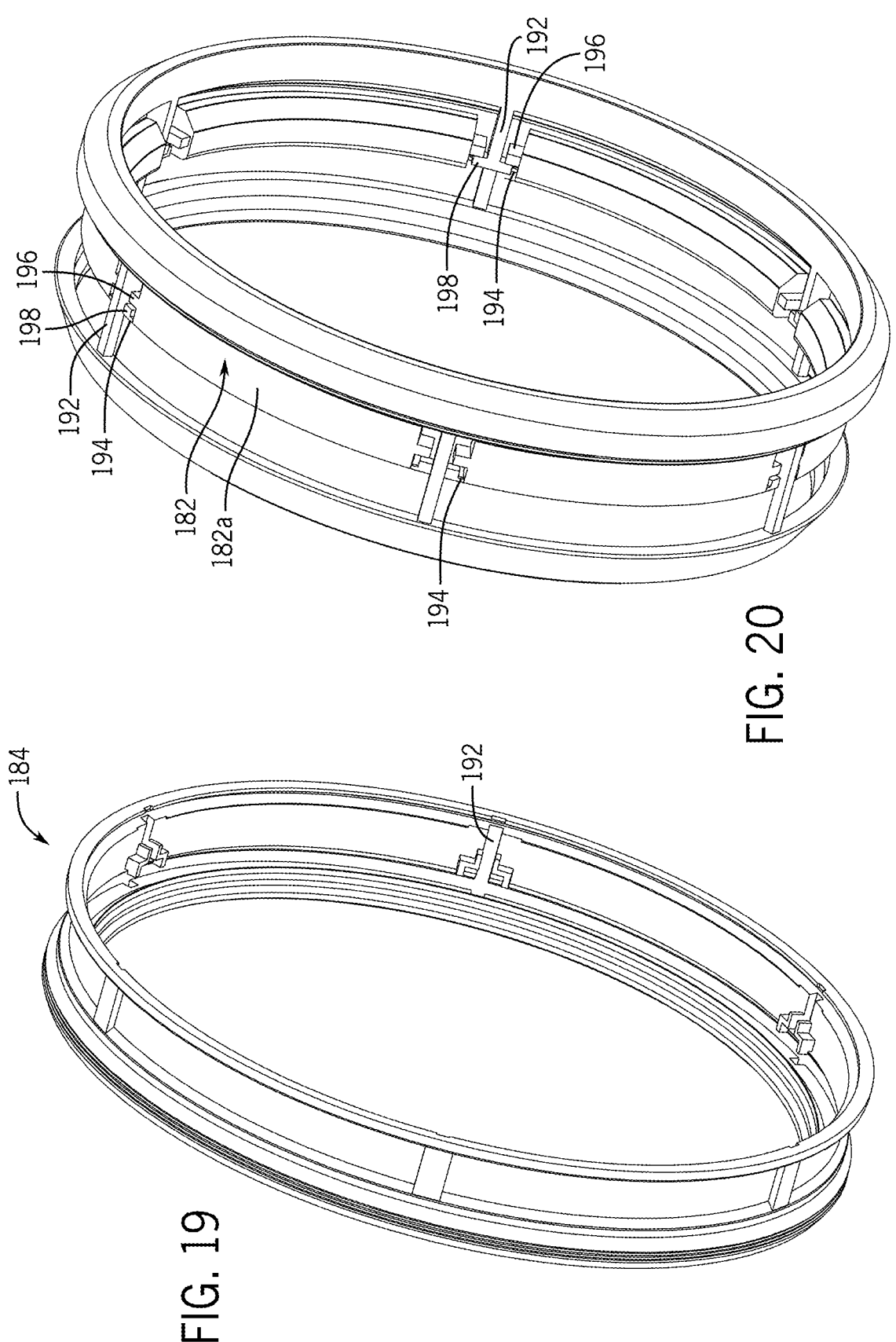
FIG. 19 shows a perspective view of the annular body and the seal material, minus the spline of the insert device of FIGS. 17 and 18.
FIG. 20 shows a view of the annular body of the insert device of FIGS. 17 and 18, minus the seal material.

FIGS. 15 and 16 illustrate another example of a pipe joint assembly 180 constructed in accordance with the teachings of the present disclosure. In this example, the pipe joint assembly 180 has two pipes 102, 106 joined to one another at the pipe joint assembly. The first pipe 102 has a male end or spigot 104 and the second pipe 106 has a belled end 108 or a female end or socket into which the male end or spigot 104 of the first pipe 102 is received. The pipes 102, 106 and their construction and arrangement may be the same as described above with reference to FIGS. 1-3.

Another example of an insert device 110-5, constructed in accordance with the teachings of the present disclosure, is again installed between the outside surface 116 on the OD of the first pipe 102 and the inside surface 114 on the ID of the second pipe 106 in the pipe joint assembly 180 in the same manner as described above. The insert device 110-5 again creates or is implemented to create a spline 182 as an integral part of the insert device and which interlocks the two pipes together at the pipe joint assembly 180. The insert device 110-5 in this example also creates seals 119 and 148 between the two pipes 102, 106 at the pipe joint assembly 180 and forms the spline 182 for locking the two pipes together.

FIGS. 17-21 show various views of the insert device 110-5 constructed in accordance with the teachings of the present disclosure. In this example, the insert device 110-5 includes an annular body 184 with a seal portion 186 and a spline portion 188. In this example, the seal portion 186 includes a leading end part 190 of the annular body 184 but again is mostly a space axial disposed between the leading end portion and the spline portion 188. The annular body 184 is again generally annular or circular in shape with a circumference and an axis. In this example, the spline portion 188 of the annular body 185 also forms the spline 182 as an integrated part of a monolithic insert device structure. The spline 182 is again configured to resiliently move in a radial direction relative to the axis of the insert device. The seal material S is molded to the annular body 184 to form the insert device 110-5.

Figure 21:
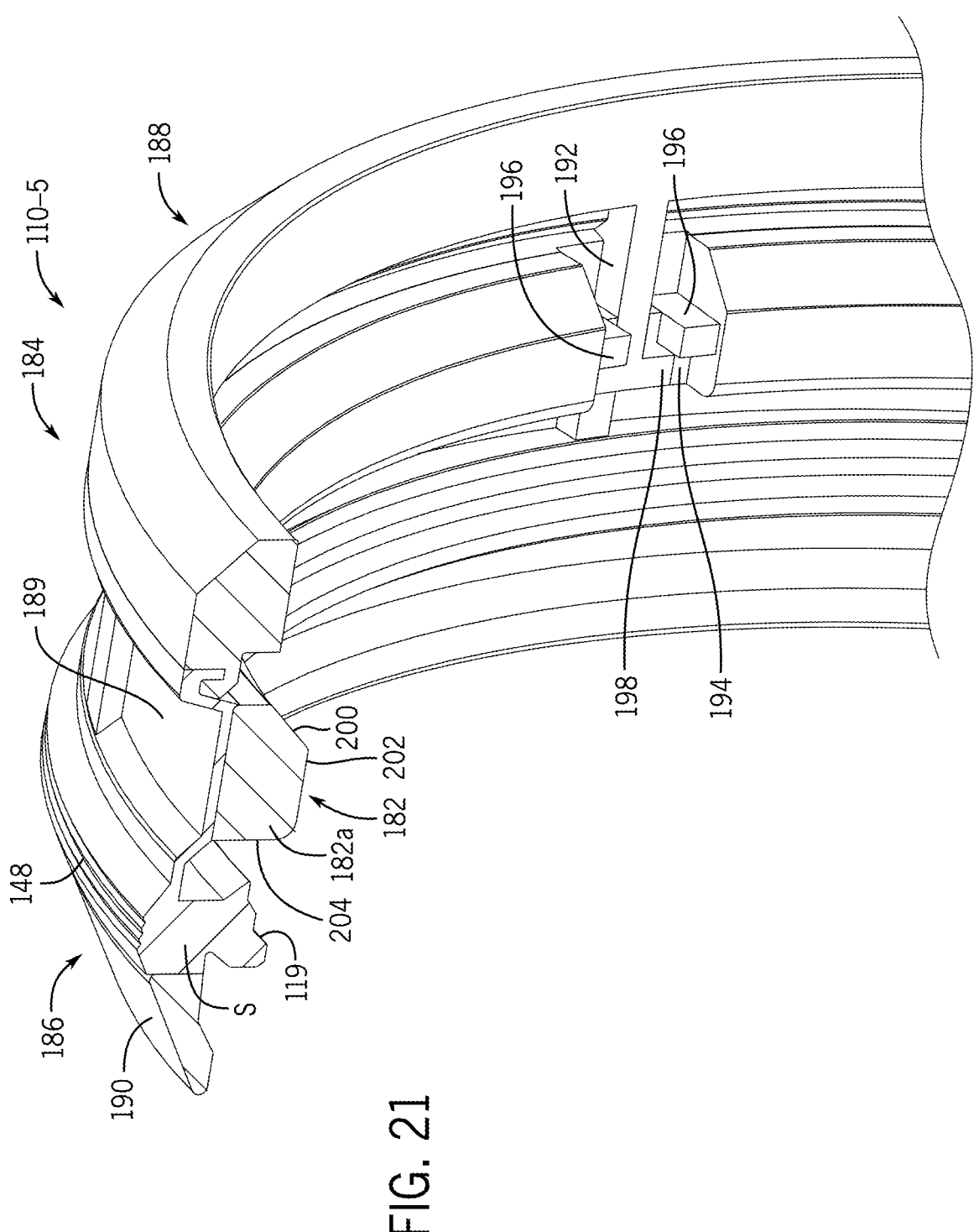
FIG. 21 shows a cross-section taken along line 21-21 of the insert device of FIG. 17.

The seal material S forms the ID seal 119 and the OD seal 148 as integrated parts of the monolithic insert device structure in this example. In this example, the seal material S also is bonded to the spline 182 of the insert device 110-5. As shown in FIG. 21, the seal material S includes a connecting section 189 that extend from the seals 119, 148 to the spline portion 188 of the annular body. A free end of the connecting section 189 is securely bonded to the spline portion 188 and the proximal end is integral with the seal material at the seals 119, 148. The radial inward surface of the connecting section 189 is also bonded to the radial outward facing surfaces of the spline segments 182a.

As shown in FIGS. 17-21, the leading end part 190 can be joined to the spline portion 188 via a plurality of axial bridge parts 192. These bridge parts 192 may be permanent bridges, not breakable or frangible connections, creating the integrated annular body 184. The spline 182 in this example may again include a plurality of spline segments 182a. The circumferential ends of the spline segments 182a may include frangible connections 194 that connect the spline segments to the bridge parts 192. In this example, the annular body 184 also has an optional feature imparted to the spline segments 182a. Each spline segment 182a may include an integral boss 196 that protrudes from each circumferential end. The adjacent axial bridge parts 192 may include stop projections 198 that protrude circumferentially therefrom and spaced from but adjacent to the bosses. The frangible connections 194 between the spline segments 182a and the rest of the annular body 184 may be between the bosses 196 and the bridge parts 192 or between the stop projections 198 and the circumferential ends of the segments. The bosses 196 and stop projections 198 can be positioned to limit the travel of the spline segments 182a and thus the spline 182 in the axial direction when the pipe joint assembly 180 is being assembled. As the pipe 102 is pushed into the pipe 106, the bosses 196 will contact a stop surface on the stop projections 198, preventing undue stress being applied to the connecting section 189 of the seal material S bonded to the spline 182.

Figures 22, 23:
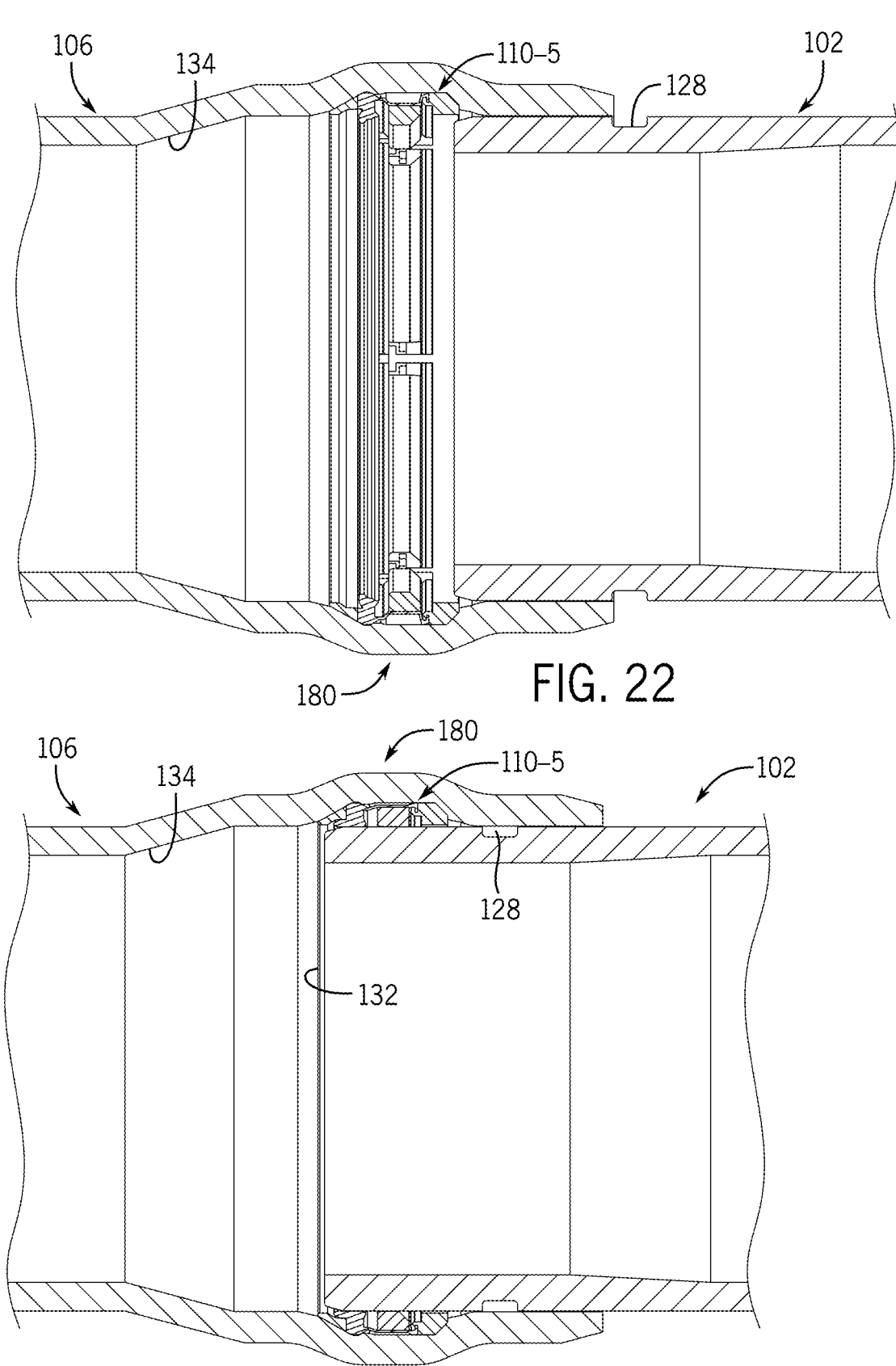
FIGS. 22-25 show views of the pipe joint assembly of FIG. 16 in progressive stages of being assembled.
Figure 24:
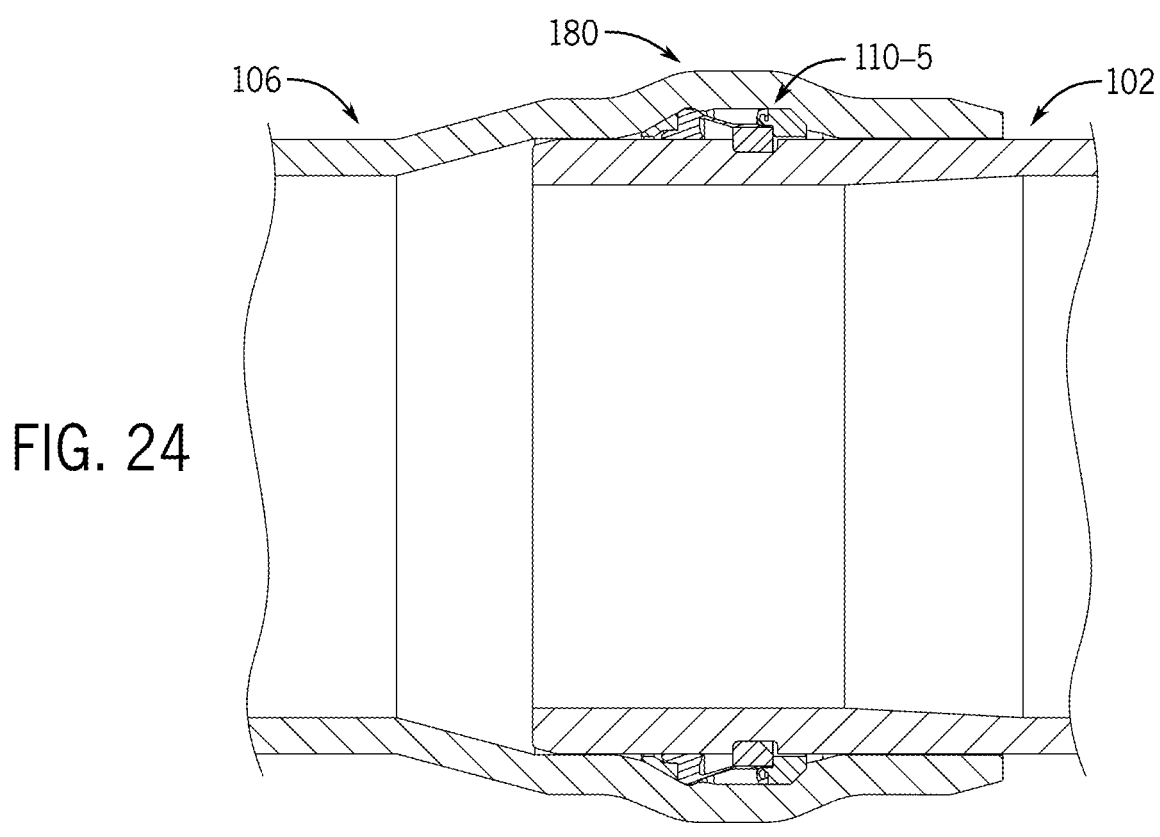
Figure 25:
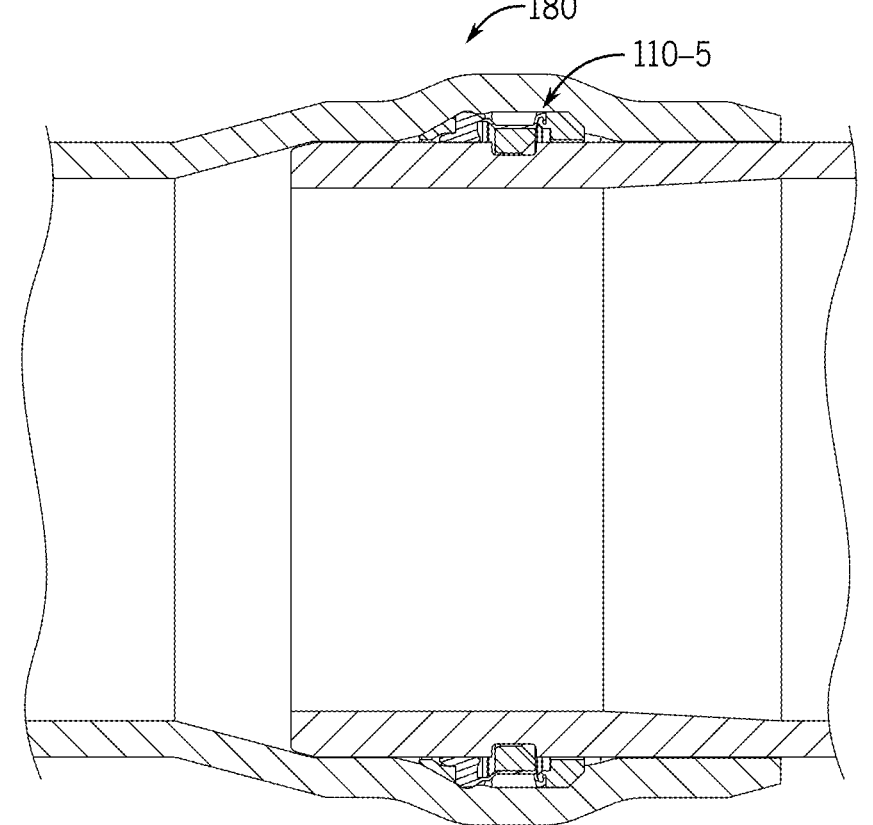

The insert device 110-5 may be pre-disposed or pre-installed within the female end or belled end 108 of the pipe 106 or may be inserted such as through automated process into a groove, race, recess, or the like in the female end or belled end of the pipe. FIGS. 22-25 show the pipe joint assembly 180 of FIGS. 15 and 16 in various stages of assembly. The insert device 110-5 again resides within the ID of the second pipe 106 in the female or belled portion 108. To assemble the pipe joint assembly 180, the spigot 104 of the first pipe 102 is inserted into the female or belled end 108 of the second pipe 106 and is pushed axially inward, as shown in FIGS. 22-24. The positioning of the distal end 132, the angled wall 134, the spline 182, and the spline groove 128 can again be configured so that the spline and spline groove automatically align with one another, as shown in FIG. 25, when the distal end 132 of the pipe 102 bottoms against or abuts the angled wall 134.

In this example, the spline 182 has an angled or tapered surface 200 that faces radially inward and that is angled or ramped to permit insertion of the first pipe 102. As the first pipe 102 is being pushed into the second pipe 106, the spline 182 is resiliently biased radially outward by contact between the tapered surface 200 and the OD surface 116 of the first pipe, as depicted in FIGS. 23 and 24. Once in the fully inserted position, or when the spline groove 128 and spline 182 align with one another, the spline resiliently retracts into the spline groove. As shown in FIG. 25, the spline 182 is also configured to lock the two pipes 102, 106 together and prevent the two pipes from being pulled apart. In this example, the spline 182 has an axial surface 202 that resides in the spline groove 128 and abuts an axial surface of the groove. The spline 182 also has an opposite axial stop surface 204 that can abut a stop surface on the spline portion 188 of annular body 184. When the two pipes 102, 106 are pulled apart, the axial surface within the groove 128 will apply a force against the axial surface 202 of the spline 182. This will create hard contact between the stop surface 204 of the spline 182 and the stop surface of on the spline portion 188 of the annular body 184, preventing separation of the two pipes. In the example of FIGS. 15-25, the spline 182 is again created as a part of the insert device 110-5 to mimic and thus replace an elongate plastic strip type spline.

In the foregoing example, the spline 182 moves radially via elastic movement of the connecting section 189 of the seal material. The spline 182 does not pivot or bend as in the earlier examples. In this and other examples, the seal material S has a main section that forms the inner and outer seals 119, 148, as described above. The seal material S also has an axial extension, i.e., the connecting section 189, that extends between the seal portion 186 and the spline portion 188 of the annular body 184. The radial outward face of the spline 182 is joined to a surface of the axial extension of the seal material. The axial extension is joined, secured, bonded, or the like to a fixed part of the spline portion 188 of the annular body 184. The spline 182 is thus able to move with the axial extension 189, which is resilient and flexible between the seal portion and fixed part of the spline portion of the annular body.

In this example, the axial extension 189 of the seal material S has limited excess length between where it is fixed to the radially outward facing side of the spline 182 and where it is fixed to the fixed part of the spline portion 188 of the annular body 184. The axial extension 189 also has limited excess length on the opposite end between the spline 182 and the main part of the seal material S. That portion is also oriented at an angle, which can allow for radial movement of the spline 182. The excess length of the connecting section 189 of the seal material, and the shape of those excess length portions, can define how the spline 182 moves when a spigot is installed or when the insert device is installed on a mandrel to form the belled end of the second pipe. The spline 182 moves radially outward and may rotate slightly in one direction or the other, depending on the shape and excess length of the connecting section 1809 on each axial side of the spline. As with the earlier pivoting examples, the rotation direction of the spleen 182 may be such that the angled or ramp surface 200 becomes more parallel to the axial direction, making it easier to install the insert device 110-5 on a mandrel or to install a spigot through the insert device. In this example, the spline 182 is again formed having discrete segments 182a around the insert device 110-5 to allow for the outward radial expansion of the spline.

The configuration and construction of the insert device 110-5 can again vary from the above example within the spirit and scope of the present disclosure. In another example (not shown) of an insert device similar to the insert device of FIGS. 17-21, the axial extension or connecting section of the seal material may extend axially toward the main section of the seal material S directly from the radial outward facing side of the spline, instead of extending at an angle. The radial outer surface of the axial extension may also have a plurality of ribs. The excess lengths of the axial extension may vary, and the ribs may allow the axial extension to deform and bend, permitting the spline to rotate and move radially outward when a spigot is installed.

Figure 26:
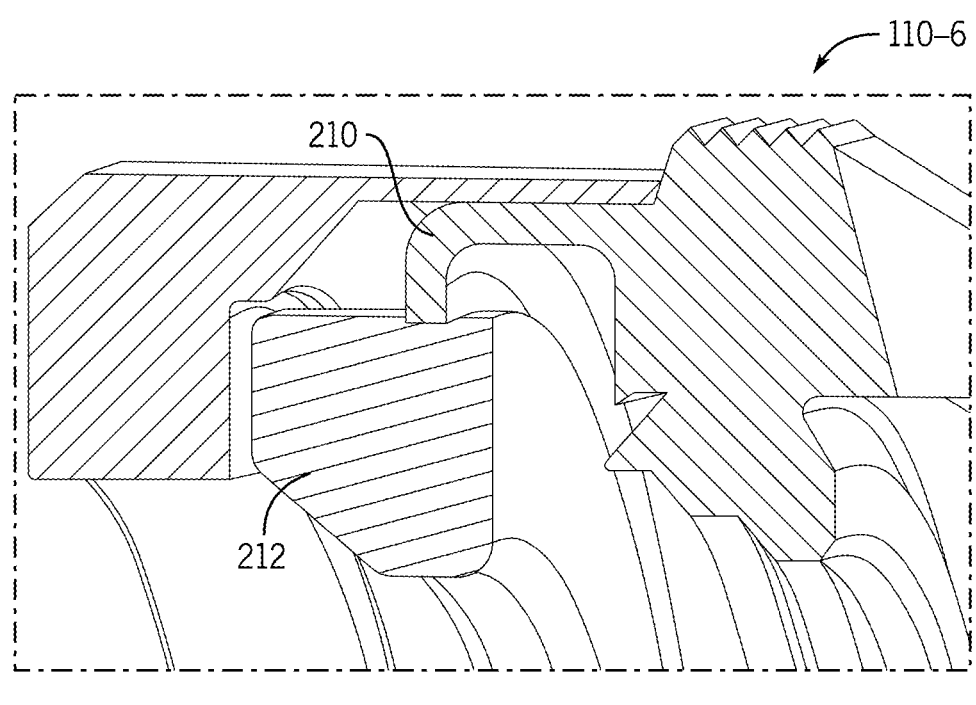
FIG. 26 shows a close-up perspective cross-section view of a portion of another example of an insert device constructed in accordance with the teachings of the present disclosure.

In another example of an insert device similar to the insert device of FIGS. 17-21, the thickness of the portion of the axial extension adhered to the radial outward facing side of the spline may be relatively thicker as compared to the thickness of the excess length portions between the spline portion and the spline and between the spline and the annular body. In yet another example, as shown in FIG. 26, an insert device 110-6 may include excess length of an axial extension 210 with a relatively thin walled cross-section and having an L shape. The free end of the axial extension 210 may be joined directly to the radial outward facing side of the spline 212.

Figure 27:
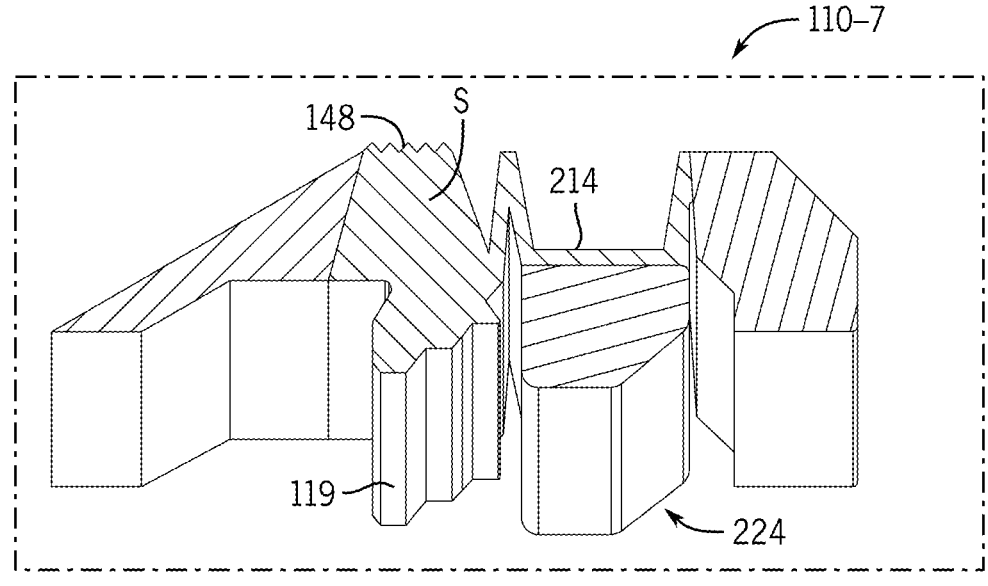
FIG. 27 shows a close-up perspective cross-section view of a portion of another example of an insert device constructed in accordance with the teachings of the present disclosure.

FIG. 27 shows another example of an insert device 110-7 that is again similar to earlier examples. In this example, an axial extension 214 is connected differently to a spline portion 216 of an annular body 218 and the excess length of the axial extension is shaped differently. In this example, a limited length end of the axial extension 214 is adhered to an axial face of the spline portion 216 of the annular body 218. The excess length end of the axial extension 214 has sharp inverted V shape. In another example, a similar insert device may include an axial extension of the seal material with only the excess length end connected to a finger protruding from the spline.

In many of the disclosed examples, a stop may be provided on a section of the spline portion of the annular body that prevents axial motion of the spline when two pipes are pulled apart. Further, a spline groove portion between the seal portion and the spline portion of the annular body may permit the pivoting, rotating, and/or radial outward movement of the spline when a spigot is installed. Also, the spline in each example herein refers to the entire circumferential spline, which may be segmented to permit each segment to move radially, as needed. Still further, in many of the disclosed examples, by connecting the axial extension of the seal material at the top or radial outward facing side of the spline, a pocket or space, i.e., the spline groove portion, is formed between the bell and the spline when installed. The pocket is protected from dirt, ice, and the like, which will help ensure that the spline is free to move without obstruction, when needed.

In still other examples, the insert devices may include subtle but potentially important differences. In these examples, the axial extension, formed of the seal material, may be adhered to the top or radial outer surface of the spline. A free length of the axial extension may extend therefrom along an axial face of the spline portion of the annular body and may be adhered to the spline. The other end of the axial extension may also have an excess length formed in a sharp inverted V shape or other suitable shape, which is joined integrally to the main body of the seal material. The amount of and shape of the seal material in these locations may be varied.

The amount of material of these portions may be varied in an attempt to save seal material usage. In some examples, the axial extension material on the radial outer surface of the spline may not be not contiguous but may instead be formed as a thin rectangular ring adhered to the perimeter of the spline surface. The amount of material on this surface may also contribute to the relative ease or difficulty of the spline being movable radially outward. These areas may be designed to meet the requirements of a given insert device and pipe application. An increase in difficulty may cause the spline to move axially more than radially outward during assembly, which may bind up the spline against the seal. Depending on the type of materials and how the body, spline, and seal materials are adhered together at the various connection surfaces, the soft material may be configured to stretch more or less freely. If the materials are adhered across the entire interface and remain so during the motion of the spline, the rigid plastic and soft rubber may likely deform in the same way where bonded to one another. The force required to deform the rigid plastic would be significantly higher that the force required to deform the softer seal material, i.e., rubber. Thus, the material used may not matter significantly. The non-adhered portions of the seal material or rubber would experience all of the stretching required for the spline to move. If the rigid plastic and seal materials are not adhered to one another across an entire surface, such as the radial outward surface of the spline or the axial face of the spline portion, then the softer seal material or rubber would be free to stretch wherever it is not adhered. These features can be designed to increase or decrease the amount of force required to move the spline, depending on the mechanical properties of the seal material or rubber and the specific geometry. In some examples, a larger volume of the seal material or rubber may have to be deformed, but the distance that the softer material has to be stretched may be the same, since it is based on how far the spline or spline segments need to move. In some examples, the "free" length of the seal material or rubber may be increased, which would result in the percent elongation of the material being lower.

Figure 28:
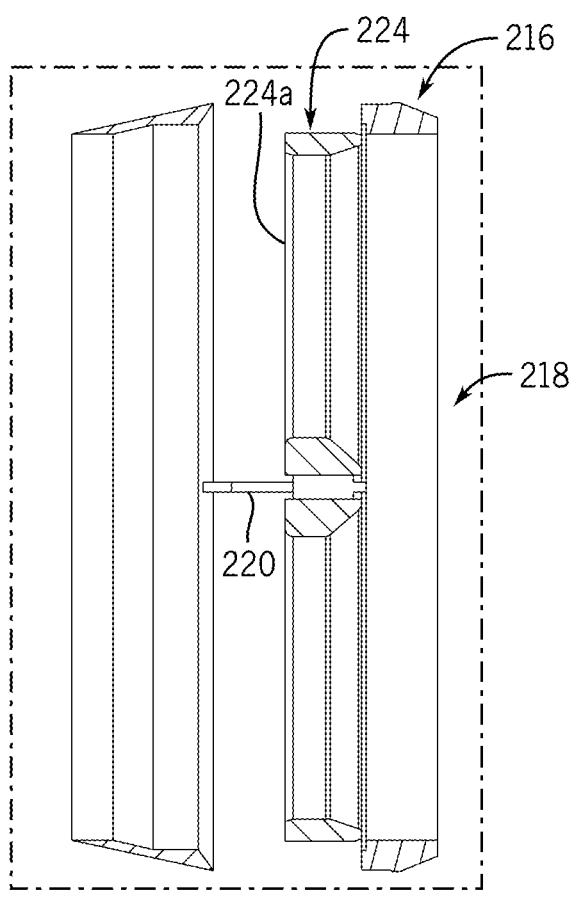
FIG. 28 shows a side view of the annular body, minus the seal material, of the insert device of FIG. 27.
Figure 29:
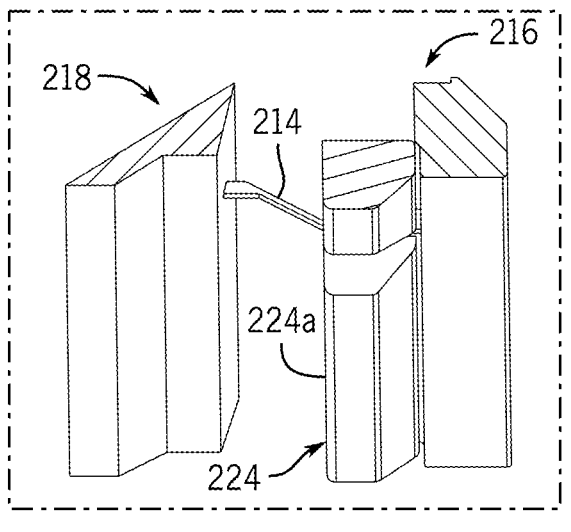
FIG. 29 shows a close-up perspective cross-section view of the annular body and spline portion of the insert device in FIG. 28.
Figure 31:
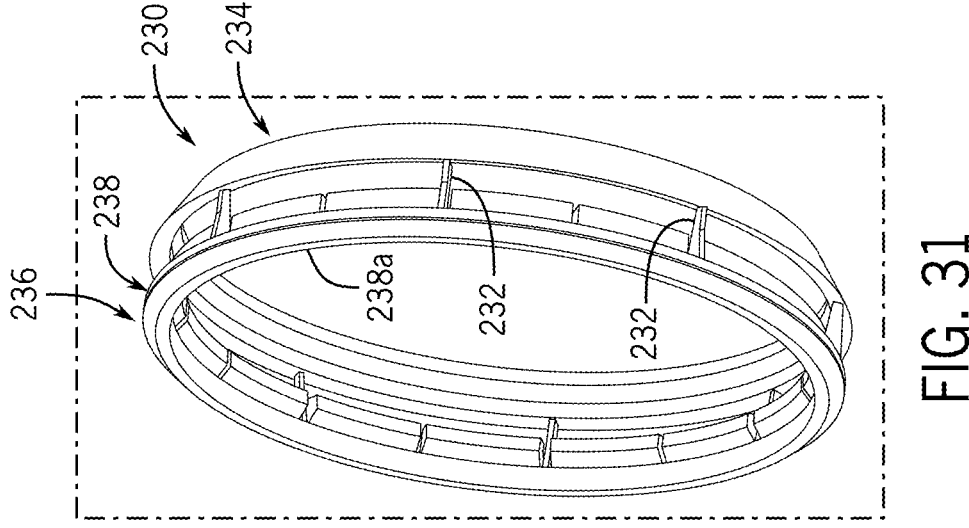
FIG. 31 shows the annular body, minus the seal material, of the insert device of FIG. 30.
Figure 30:
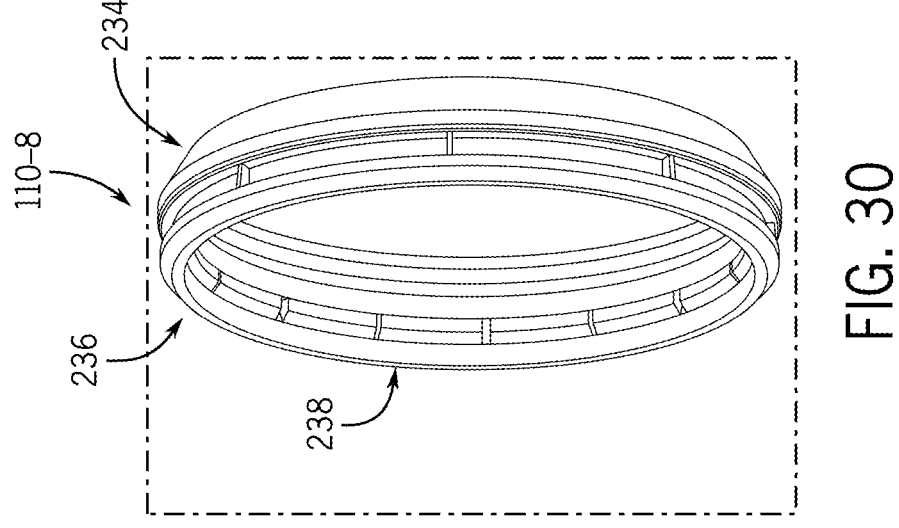
FIG. 30 shows a perspective view of another example of an insert device constructed in accordance with the teachings of the present disclosure.
Figure 32:
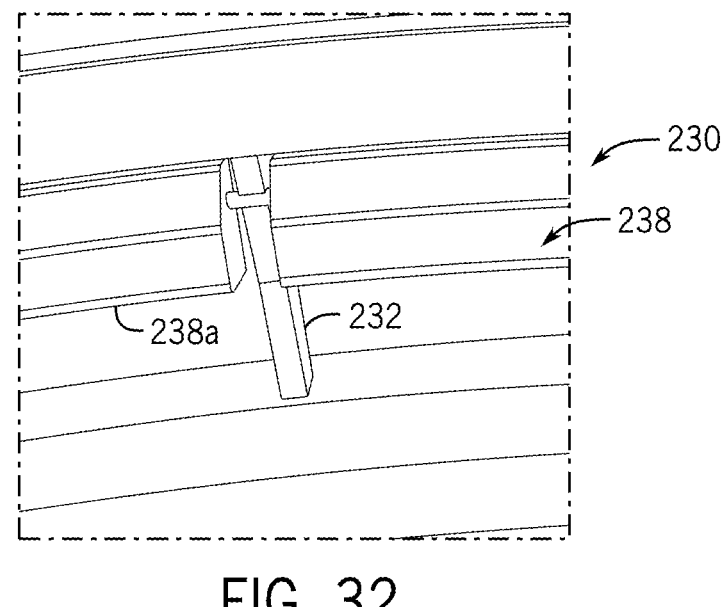
FIG. 32 shows a close-up perspective view of a portion of the annular body of the insert device in FIG. 30.
Figure 33:
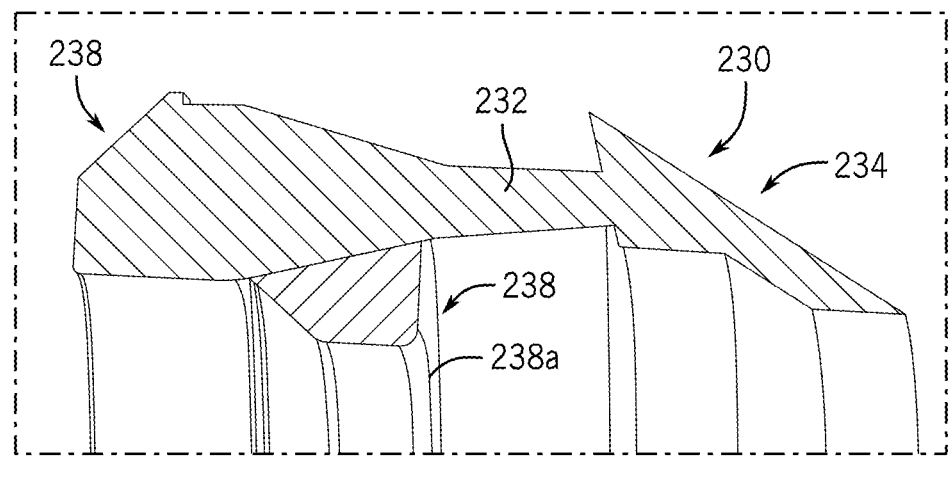
FIG. 33 shows a close-up cross-section view of a portion of the insert device of FIG. 32.

Referring to FIGS. 28 and 29, and as noted above, a plurality of bridges or bridge parts 220 can be formed in the mold to connect a seal portion 222 and the spline portion 216 of the annular body 218. These bridges 220 may be thin enough to be frangible and to break during use, if desired, relying on the seal material to maintain the integrity of the insert device. Alternatively, these bridges 220 may be substantial enough to stay connected during use. The bridges 220 may be provided between spline segments 224a of a spline 224. In this example, only two bridges 220, and thus only two spline segments 224a are shown. The bridges 220 should be substantial enough to permit plastic flow during molding of the annular body 218. However, in one example, the bridges may be intended to break before or during use. In another example, the bridges 220 may need to flex to allow the spline parts to move during use. If intended to break, the initial break of the bridges may occur during pre-belling install of the insert device on a mandrel.

FIGS. 30-33 illustrate additional views of a very similar example of an insert device 110-8, but with a slightly different configuration of the annular body and the bridge parts. The insert device 110-8 includes an identical functioning annular body, spline, and seal material. The insert device 110-8 is constructed in accordance with the teachings of the present disclosure. The insert device 110-8 in this example is quite similar to the examples described immediately above. However, in this example, an annular body 230 includes additional bridges 232 connecting the seal portion 234 to the spline portion 236 of the annular body. Thus, the spline 238 includes additional segments 238a separated from one another by the bridges 232. In this example, the segments 238a are connected to the bridges 232 by frangible connections. The frangible connections may be configured to break when the insert device 110-8 is installed on a bell forming mandrel, whereas the bridges may be designed to stay unbroken.

Figure 34:
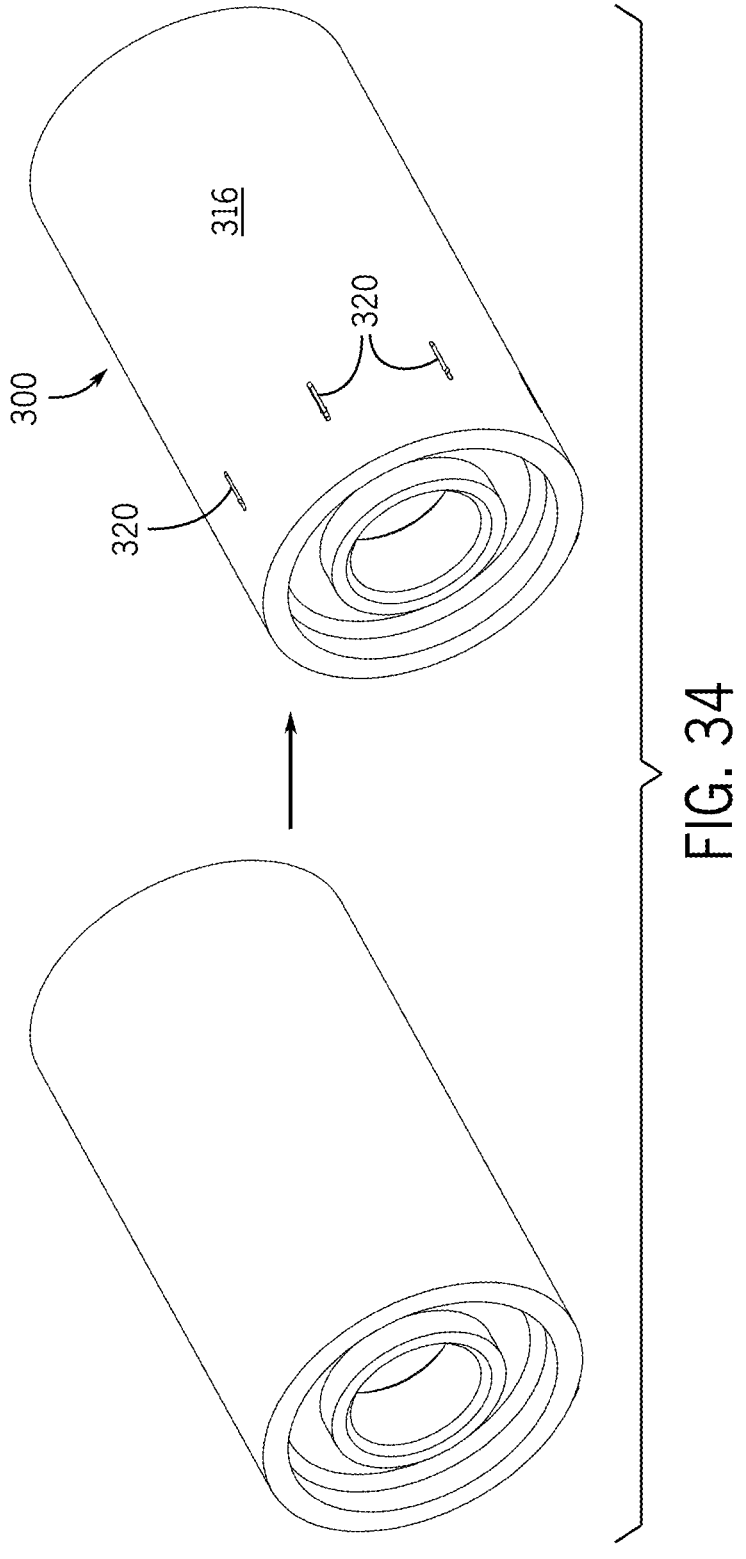
FIG. 34 shows a perspective view of one example of a mandrel for a pipe belling process, the mandrel modified to include vacuum ports to accommodate an insert device as disclosed herein, the mandrel constructed in accordance with the teachings of the present disclosure.
Figure 35:
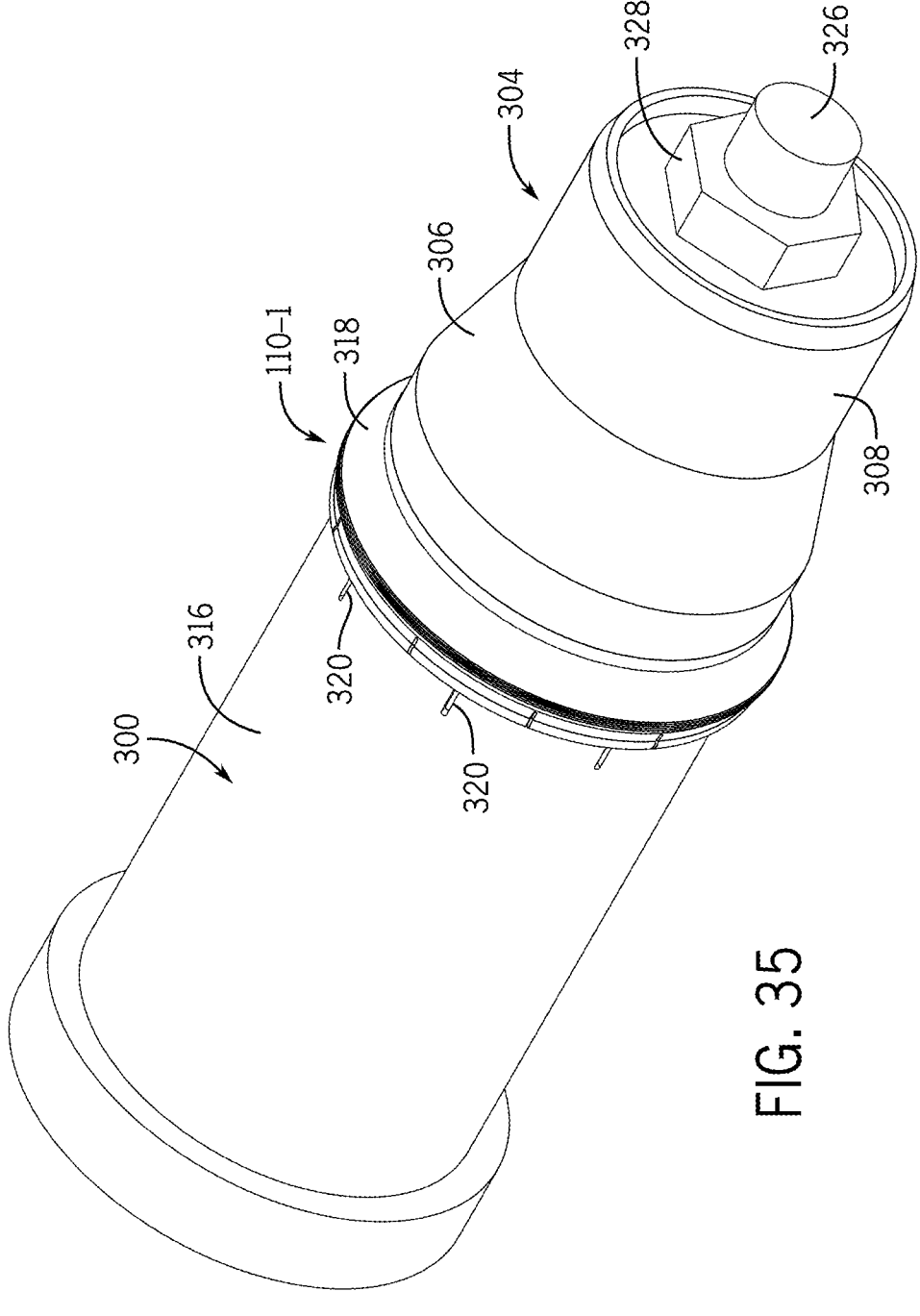
FIG. 35 shows a perspective view of a mandrel assembly, i.e., a belling tool assembly in an assembled condition including the mandrel of FIG. 38 and with an insert device installed thereon.

The methods used to form a belled end 108 on a second pipe 106, which includes a pre-disposed or pre-installed insert device, such as the insert device 110-1 as disclosed herein, can vary according to the teachings of the present disclosure. Referring to FIG. 34, one example of a method utilizes a bell-shaped mandrel 300 and a stripper plate (not shown). In general, the mandrel 300 is forced into the distal end of a hot or heated second pipe 106. The mandrel 300 is somewhat bullet shaped, as shown in FIG. 35, and may have a smaller diameter nose 304, a tapered, gradually increasing diameter section 306, and a constant larger diameter section 308. The mandrel 300 is configured to gradually increase the ID of the distal end opening and an end portion of the hot pipe material as the mandrel is forced further into the end of the second pipe 106. The end 108 of the pipe 106 takes on the bell-like shape of the mandrel 300. This shaping process can be done while the pipe 106 is hot after being extruded.

Figure 36:
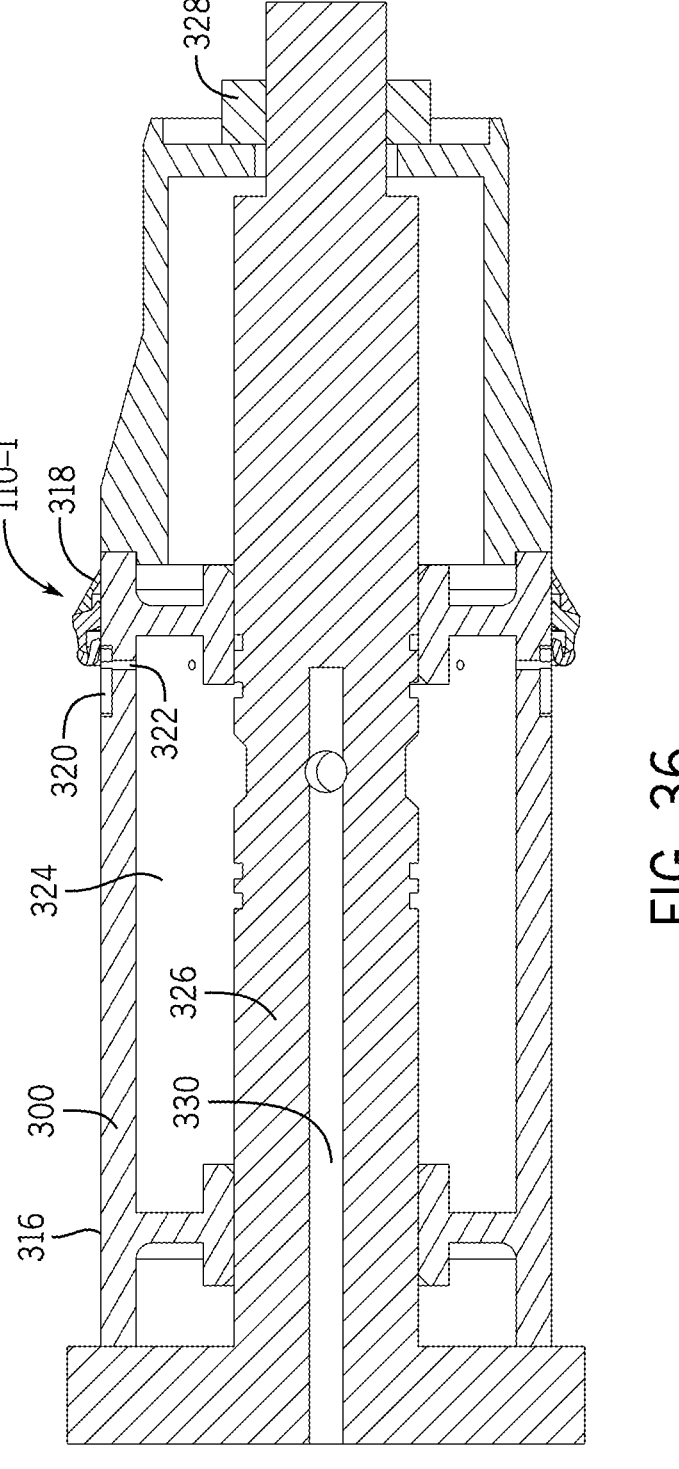
FIG. 36 shows a lengthwise cross-section view of the mandrel assembly of FIG. 35.
Figure 37:
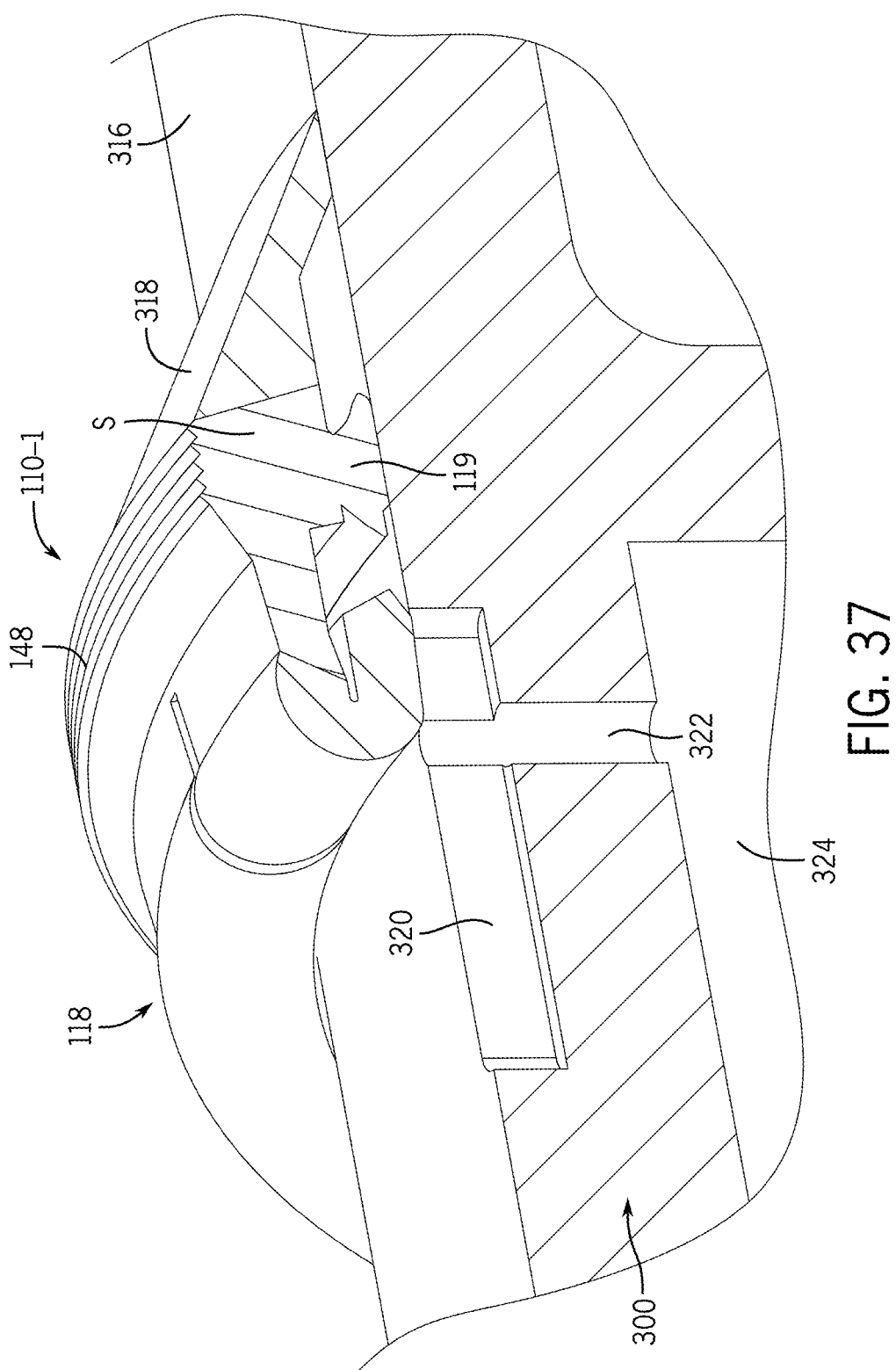
FIG. 37 shows a perspective cross-section view of a vacuum port of the mandrel assembly of FIG. 36.
Figure 38:
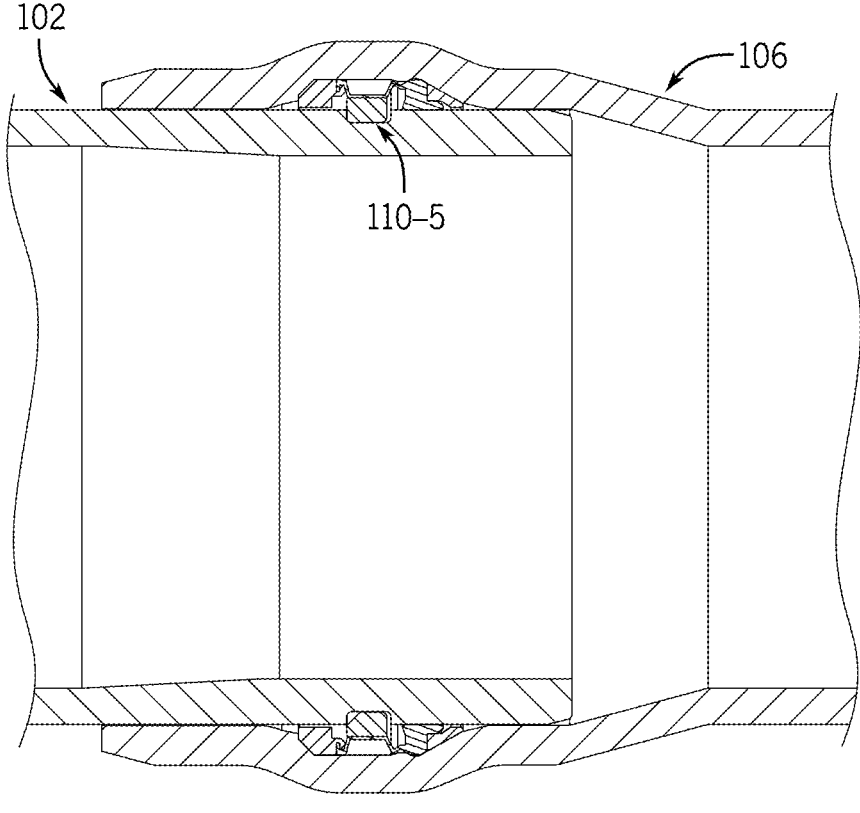
FIG. 38 shows a cross-section view of the pipe joint assembly of FIG. 25.

As shown in FIGS. 35-37, an insert device, generically identified as the insert device 110-1 for describing the process, may be mounted on the mandrel 300 at a desired position along the constant diameter portion 308 of the mandrel. A tapered or free end of a cylindrical section of a stripper plate may face the pullet nose end 304 of the mandrel and the opposite end, i.e., a flat end of the spline portion 124 of the insert device may abut the stripper plate. The stripper plate thus may hold the insert device 110-1 in the desired position on the mandrel 300 as the mandrel is forced into the end of the pipe 106 or the pipe is forced onto the mandrel. Instead of the distal end of the pipe 106 pushing the insert device 110 along an outer surface 316 of the mandrel 300, the stripper plate holds the insert device in place. The end of the pipe 106, while the material is hot, will thus pass over and onto the insert device 110-1 and over a cylindrical section of the stripper plate. The leading end part 126 of the insert device 110-1 may have a ramped or tapered end or face 318 that gradually expands the distal end of the pipe 106 so that the pipe can pass over the insert device. FIG. 36 shows the pipe end 108 (in phantom view) over the mandrel 300 and the insert device 110-1 after the mandrel is forced into the end of the pipe, or vice versa.

When the pipe 106 has taken the desired bell shape 108, the pipe is disposed axially at a specific desired position relative to the mandrel 300 and the insert device 110-1 is captured between the ID surface 114 of the pipe 106 and the outer surface 316 of the mandrel 300. A vacuum can be applied via the stripper plate and/or through the mandrel 300, and through various vacuum openings or holes (not shown) that may be provided in the annular body of the insert device 110-1. The vacuum can aid in pulling or drawing the plastic material of the hot pipe 106 radially inward onto the mandrel 300 and thus the annular body 120 of the insert device 110-1. This can help to form the shape of the belled end 108 of the second pipe 106. Alternatively, the belled end 108 may be pressed onto the 300 mandrel as the pipe 106 cools. More specifically, the insert recesses or grooves 112 are formed as the insert device 110-1 is pressed into the warm pipe 106 material. The pipe 106 is pre-heated, after-hardened, and formed. Then the bell end 108 is heated and pressed onto the mandrel 300. The belled end 108 is then pulled or drawn via vacuum or pressed onto the mandrel and around the insert device 110-1.

The stripper plate can be withdrawn from or along the mandrel 300 and thus the distal end of the pipe 106. The belled end 108 of the heated pipe is then cooled. The vacuum may be applied or continue to be applied after the stripper plate is withdrawn. Cooling of the pipe material further shrinks the expanded pipe diameter, except that the insert device 110-1 prevents the pipe from shrinking thereat. The mandrel 300 may also be withdrawn relative to the pipe once the pipe material cools sufficiently. The insert device 110-1 is captured in the insert recesses 112 or grooves that form around the ID surface 114 of the pipe 106 as it shrinks in diameter in order to accommodate the insert device. The insert device 110-1 is thus pre-disposed, pre-installed, or self-installed within the belled end 108 of the pipe 106 using this method. The insert recess or recesses 112 formed in the belled end 108 take the shape of the outer or OD surface of the insert device 110-1 and retain the position of the insert device within the pipe joint assembly. The bell shape in the second pipe 106 may be formed so that the first pipe 102 is inserted to a precise, predetermined depth in the pipe joint assembly, as described above. The gradual increase in pipe diameter can thus create a stop for the first pipe 102 when inserted in the belled end 108 of the second pipe 106. This depth should insure that the spline groove 124 and the spline 118 of the two pipes axially align with one another and so that the seal within the second pipe is positioned against a flat portion of the OD of the first pipe to create an adequate seal, and so that the spline seats in the spline groove, as described above.

Various aspects of the method, belling tool assembly, and the pipe joint assembly formed thereby can vary within the scope of the present disclosure. The cylindrical section of the stripper plate may be provided with a pocket that is formed in the ID surface at the free end. The pocket can be sized and configured to extend over and cover the insert device 110-1 when the stripper plate is in position to receive the distal end of a pipe 106 for belling. The end of the pocket can be positioned to abut the flat end of the spline portion 124 of the insert device 110-1 to position and hold it along the mandrel 300 where desired. The pocket may be provided to aid in preventing the insert device 110-1 from rolling, buckling, or otherwise deforming as the end of the pipe 106 is forced axially along the mandrel 300. The leading end part 126 of the insert device 110-1 may be exposed and may have the ramped or tapered surface 318 to help the end of the pipe 106 to pass over the insert device and the stripper plate.

As noted above, aspects of the method, belling tool assembly, and the pipe joint assembly formed thereby can vary within the scope of the present disclosure. FIG. 37 shows a further example of aspects that may be varied. As shown in FIG. 37, the belling tool assembly can include a mandrel 300 with vacuum ports or slots 320 around the outer surface 316. The slots 320 are in fluid communication with corresponding air flow passages 322, which are in fluid communication with an air flow chamber or chambers 324. A negative pressure is applied to the chamber or chambers 324, which applies a vacuum to the passages 322 and slots or ports 320 at the outer surface 316 of the mandrel 300.

The vacuum ports or slots 320 in this example have an axial length sufficient to perform a dual purpose. As shown in FIG. 37, a portion of each slot 320 aligns with and underlies part of the installed insert device 110-1, which extends around the mandrel 300. A portion of each slot 3206 is exposed to the outer surface of the mandrel. A negative pressure or vacuum is applied to the slots 320 when a heated end of a pipe 106 is forced onto the mandrel 300. The vacuum may aid in holding the insert device 110-1 in place on the mandrel. The vacuum will also aid in drawing the material of the end of the pipe that overlies the exposed portions of the slots toward the mandrel. This aids in forming the recesses in the ID surface of the belled end of the pipe around the insert device.

In this example, as shown in FIGS. 35 and 36, the mandrel 300 can be fitted onto and secured on a cylinder or shaft 326 to fix the mandrel for use. The mandrel 300 can be secured using a nut 328 over a threaded end of the shaft 326. O-rings or seals can be used within the interior of the mandrel 300 to form a seal between the shaft 326 and mandrel body and to create the air chamber 324 in the mandrel 300. A shaft air passage 330 can extend along the cylinder or shaft 326 and one end can be connected to a vacuum source (not shown). The other end or other portions of the shaft passage 330 can be in fluid communication with the air chamber or chambers 324 within the mandrel 300 through one or more bores or holes between the shaft air passage and the air chamber or chambers. The negative pressure can be applied to the mandrel 300 via the shaft air passage 330.

The belling tool assembly can be configured and modified to accommodate belling a pipe end while also installing insert devices of different constructions. The insert devices disclosed herein can be formed using any suitable process or processes. The annular body of the insert device may be machined, cut, molded, or the like and can be made from any suitable material, such as PVC, Nylon, Urethane, or the like. The bell tooling assembly and process can be configured to accommodate such insert devices as disclosed and described herein.

Though not shown herein, the outer circumference of the mandrel may include an annular shallow recess to receive the insert device thereon when installed. The recess may provide accurate axial positioning of the insert device and may also provide some resistance to axial movement of the insert device when the pipe end is forced over the mandrel during formation of the belled end of the pipe. Otherwise, a portion of the annular body 120, such as the inner radial contact surfaces of an insert device can be radially under-sized to create an interference between the mandrel 300 outer surface 316 and the insert device to aid in holding its position during formation of the belled end 108 of the pipe 106. Further, the passages and slots or holes can be machined or otherwise formed in the mandrel body.

As illustrated according to the embodiments and examples described above, various aspects of the insert devices can also vary within the scope of the present disclosure. In some examples, the annular body of the insert device may include a substantially consistent wall thickness, in a radial direction, from axial leading edge to axial trailing edge on the body. In other examples, the wall thickness may vary, in a radial direction, from leading edge to trailing edge on the body. In some examples, a wall thickness of the belled end of the pipe may be approximately equal to a wall thickness of the non-belled remaining length of the pipe. In other examples, the belled female end of the pipe may have a wall thickness that is greater than or less than a wall thickness of the non-belled remaining length of the pipe. For example, the wall thickness of the female belled end of the pipe may be about 5% to about 20% thicker than the wall thickness of the non-belled remaining length of the pipe.

Examples of the insert device may include a compression ratio of about 10% to about 35%, over a range of pipe-to-pipe angular deflection of about 0 degrees to about 6 degrees. For example, about 0 degrees to about 6 degrees of pipe-to-pipe deflection (i.e., an angle formed between a central axis of a first pipe and a central axis of a second pipe at a pipe joint assembly as measured at opposite pipe ends) may be the defined deflection or pipe flex.

In one example of the method, no cutting or machining of the female belled end is required to form the final pipe joint assembly. In one example, neither the spline groove nor an annular seal groove requires machining operations in the belled end of the pipe before or after belling. In another example, the insert device is automatically placed and installed in the belled end during belling of the pipe. In another example, the method may further include coupling the first pipe and the insert device to a second pipe to form a pipe joint assembly. The disclosed insert devices eliminate the need for a separate mechanical restraint (i.e., a separate spline) within spline groove in the first and, optionally, in the insert device of the second pipe. The pipe joint assembly can thus be a restrained joint type of pipe coupling merely by installing the insert device in the belled end of one of the pipes. In some examples, the final pipe joint assembly may have a tensile strength in a range of about 5,000 lbs to about 250,000 lbs.

Examples of the insert device may have an aspect ratio (AR) of axial length (AL) to radial height (RH) that can vary. For example, the AR of an insert device can be in a range of about 3.0 to about 5.0, without the seal portion. In another example, the AR of an insert device may be in a range of about 6.0 to about 9.0, with both the spline portion and the seal portion. Examples of the annular body may have an AR, without the seal portion, in a range of about 5.0 to about 7.0. With both the spline portion and seal portion, the annular body AR can be in a range of about 10.0 to about 15.0. Other examples are certainly possible within the scope of the disclosure.

Examples of the seal may include a plurality of annular ridges or ribs on the ID surface, as noted above. In some examples, the ridges may be symmetrically spaced apart from one another and from axial ends of the seal. Examples of the ribs or ridges may be configured to have a compression ratio of about 10% to about 35% against a mating pipe. Examples of the ribs or ridges may protrude radially inward from a main body of the seal in a range of about 0.1 inches to about 1 inch, depending on the size of the pipes being joined. In other examples, the ribs or ridges on the seal may have one or more specific shapes, such as triangular prisms, half ellipses, half spheres, non-symmetric prisms, angled elements, kidney-shaped elements, and the like. Also as noted above, the seal material may have one or more annular ribs on the OD surface to mate with and seal against an ID surface of a belled end of a pipe.

In one example, the substantially rigid plastic or polymer material of annular body may have one or more annular ribs or protrusions extending round the OD of the body. These plastic ribs may penetrate the material of an ID surface of the belled second pipe into which the insert device is installed during assembly because the material will be hot enough to allow penetration. Such ribs can thus form an axial mechanical link via a radial overlap between the material of the annular body at the ribs and the material of the pipe into which it is installed.

The shape and configuration of the spline or spline parts on the insert device can also vary depending on the type of spline and joint to be used between two pipes. Many of the above described drawings show a spline shape to be used with the CERTA-LOK® CLIC pipe joint configuration of the assignee, which are described in the below-noted pending applications. However, an insert device may be formed having a spline shape of a different, earlier, standard spline shape having a single radius depth.

Co-pending U.S. application Ser. Nos. 15/882,696 and 15/882,726, both filed on Jan. 29, 2018, and Ser. No. 16/134,561, filed on Sep. 18, 2018, are each incorporated in their entirety herein. Each discloses details and aspects of examples of the spline and the splined pipe joint noted above. In those applications, the spline grooves on the ID of the belled pipe are formed in the pipe material directly. In the examples disclosed herein, the spline grooves in the belled end of the pipe are either eliminated or formed in part by the insert device. The splines and groove shapes may vary, and particularly, may vary to at least include the examples in these co-pending applications.

The insert devices disclosed herein can be altered or modified in size, shape, configuration, and detail to accommodate the needs and requirements of a given application. The spline segments can be configured to open up under a predetermined insertion force to deflect and can open up in different ways. The insert devices disclosed herein eliminate the need to separately fabricate, store, ship, and install discrete spline components, as the spline is integrated as a part of the insert device. Thus, the disclosed spline inserts may save capital cost and may be easier to manufacture and assemble. The disclosed insert devices, because they are preinstalled in the belled ends of pipes, are impossible to install backwards in the field and are nearly impossible to install backwards on a mandrel because of the spline geometry and permissible spline movement. Many of the disclosed insert devices may also eliminate dirt and ice problem because the pre-installed insert devices may provide a sealed internal space for the spline parts to move or deflect that cannot be contaminated in the field during pipe assembly.

The segmented spline configuration and the connection of the spline parts to the seal material alleviates the need for the spline itself to deflect or deform very much. Instead, the resilient, flexible seal material is compressed, deformed, and/or used as a spring to allow the spline parts to move. A full ring would force the rigid spline material to greatly deform in order allow a spigot OD to pass. The split spline segments instead allow the integrated spline to deform outward, in different permissible ways, without substantial loss of longitudinal strength. Like a CLIC type spline, an increases in radius may be accomplished with only one split, and thus only one spline "segment." However, a more rigid material used for the annular body and spline of the disclosed insert devices may be better served with two or more splits and thus, two or more spline segments. The number of spline segments may vary from one (1) or two (2) and may include any suitable even or odd number of splits and/or segments, such as four (4), eight (8), sixteen (16), or the like. Increasing the number of spline segments may: increase mold complexity and cost; decrease spline deformation force (spigot insertion force); increase the number of support fingers or bridges needed; increase initial breaking force; increase the ability to fill a spline within a mold; marginally decrease the longitudinal strength; and/or the like.

In another example of an insert device according to the teachings of the present disclosure, the insert device may have a leading end of the annular body that is ramped or wedged to assist in the bell forming operation, also as described above. The trailing end of the body may have a lip that projects axially inward toward the spline segments. A gap between the leading and trailing ends of the body may define the spline groove within which the spline segments can radially expand. The lip may define a shallow depth part of the spline groove. The spline segments may have one axial face that is ramped to permit assembly of the two pipes. When the spigot end of the one pipe is inserted in the belled end of the other pipe, the spline segments are pushed radially outward into the spline groove by contact with the OD surface of the spigot end. The spline segments may have an opposite axial face that is flat to engage with a spline groove in the one pipe. In combination, the trailing end axial face and the protruding lip of the body prevent pipe separation by effectively blocking outward expansion of the spline segments when the pipes are pulled apart.

In another example of an insert device constructed in accordance with the teachings of the present disclosure, the insert device may not include a seal portion or seal and is thus a seal-less insert device. The insert device may have a body with a leading end that has a ramp or is wedge shaped for assisting in the belling process, as described above. The body may also have a trailing end and a gap between the leading and trailing ends that defines a spline groove therebetween. The trailing end again may have a protrusion extending axially into the spline groove toward the leading end. The insert device in this example may include softer material connected to spline groove segments and to portions of the body of the device. In this example, the softer material portion may have a portion adhered to the radial outward facing surface of the spline segments. The softer material portion may also have axial extensions that are connected to the leading end and to the trailing end of the body. The extension joined to the leading end may have a relatively lengthy free portion that allows stretching or expansion, permitting the spline segments to move radially outward. The extension joined to the trailing end may be much shorter to allow for significantly less movement of the spline segment at the ramped side that faces the trailing end of the body.

Figure 39:
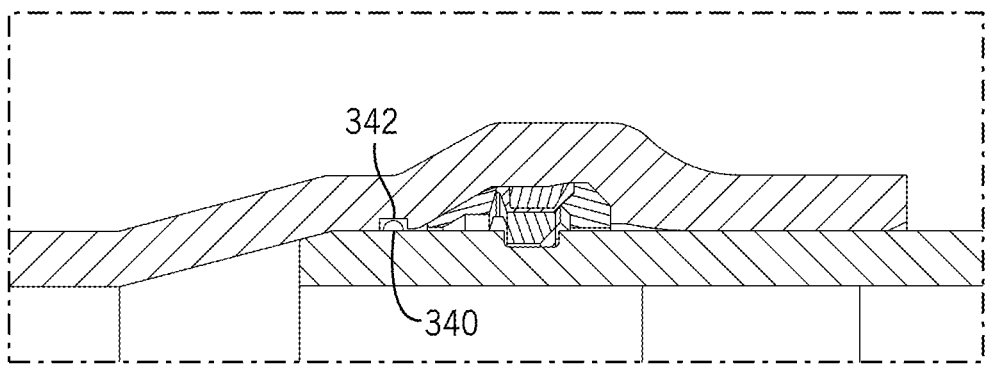
FIG. 39-41 show a close up cross-section view of portions of pipe joint assemblies incorporating the pipe belled end of a pipe and another example of an insert device according to the teachings of the present disclosure.
Figure 40:
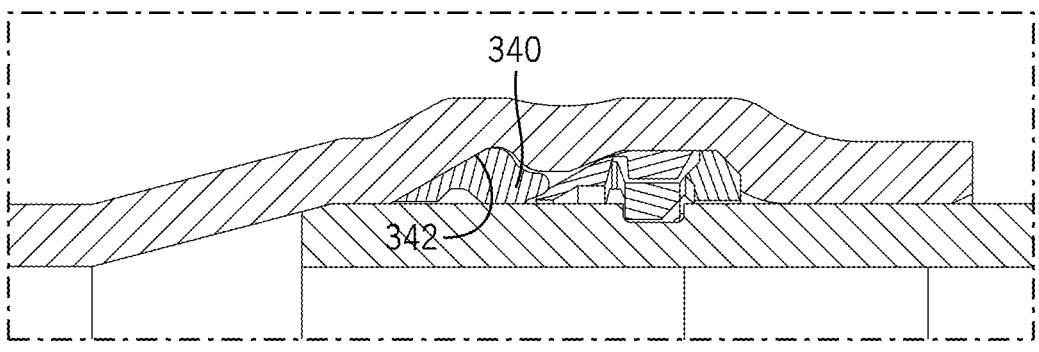
Figure 41:
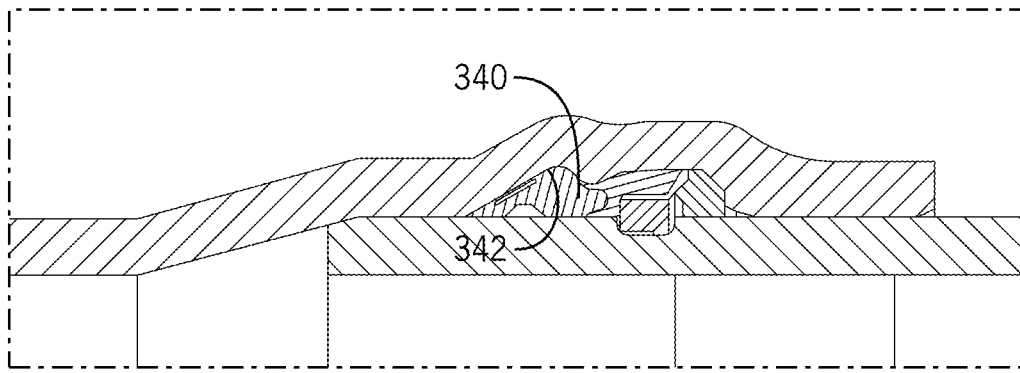

FIGS. 39-41 show examples having a separate, independent seal 340 utilized in combination with the seal-less insert device. FIG. 39 shows a seal groove 342 formed in the ID of the belled end of the one pipe, axially inboard of the insert device. An O-ring 340 is seated in the seal groove. FIGS. 40 and 41 show further examples of a seal groove 344 and seal 346 that may be pre-installed in the belled end of the one pipe, along with, but separate from, the insert device. This type of seal may be a Reiber type seal. Thus, the seal-less style of insert devices disclosed herein can be utilized in pipe joints that do not require a seal at the joint or that do require a seal at the joint.

In other examples, a seal-less type insert device constructed in accordance with the teachings of the present disclosure, the shape and construction of the insert device, without a seal, can also be varied. The device may have spline segments around the circumference of the body connected to the body via softer material. The softer material may have a portion adhered to the radially outer face of the spline segments and has an extension portion adhered to an axial face of the trailing end of the body. The trailing end again has an axial protrusion extending toward the spline segments.

The insert devices with a separate, independent Reiber type seal may be suitable for some applications. To form the joint assembly, the insert device and the Reiber seal are first preinstalled on a belled end of a pipe, as described above. A spigot of another pipe is inserted into the belled end of the one pipe. The end of the spigot contacts the ramped side of the spline segments and forces them radially outward into the spline groove. When the spline segments align with a spline groove in the spigot, the spline segments return radially inward and seat, in part, within the spigot spline groove. If the pipes are pushed further together, the Reiber seal can act as a forward stop to prevent the spline segments, and thus the spigot from being pushed further into the belled end of the other pipe. If the pipes are pulled apart, the spline segments are pushed under the axial protrusion or protrusions, which block radial expansion of the spline segments. Thus, the joint assembly is again maintained.

The belled end of a pipe may have a machined spline groove instead of one formed by the insert device and/or the belling process when pre-installing the insert device. In this example, the Reiber seal could be eliminated and the machined groove can have a forward axial surface that prevents the spline segments and thus the spigot from being pushed further into the belled end. The spline body can still have the axial protrusion to prevent axial expansion of the spline segments if the pipes are pulled apart.

Further examples of seal-less type insert devices that are constructed in accordance with the teachings of the present disclosure may have axial protrusions on the body of the insert device eliminated. Instead, the machined groove can include a second depth that prevents the axial expansion of the spline segments when the pipes are pulled apart. Also, in these examples, the body of the insert device is significantly reduced. The softer material is employed on the outward radial surface of the spline segments to connect them together and yet permit radial expansion during installation of a spigot. Either a separate seal or the machined groove wall can provide the axial stop for the spline segments. Further, the multi-depth machined groove in the ID of the belled pipe, and/or a seal material in the groove, can provide the stop for radial expansion to prevent the pipes from being pulled apart.

Figure 42:
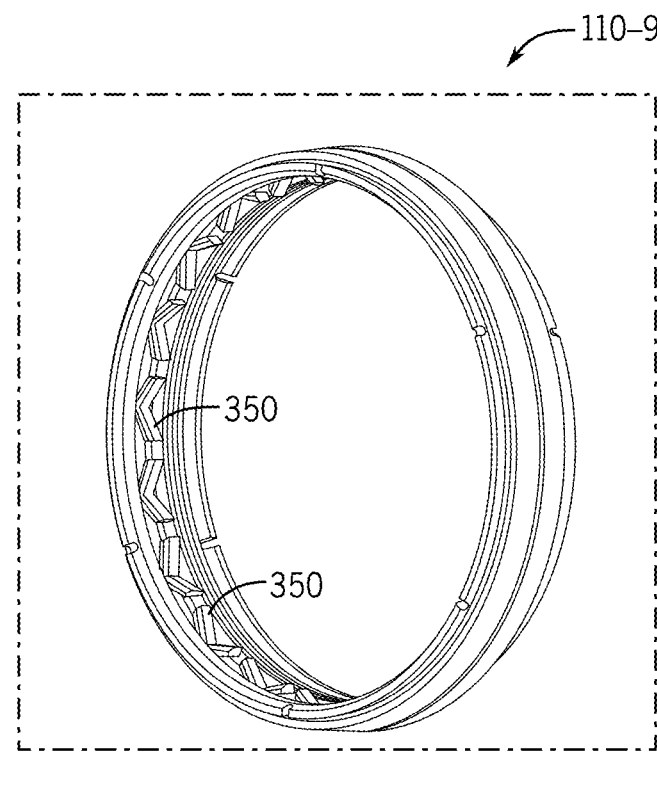
FIG. 42 shows a perspective view of another example of an insert device constructed in accordance with the teachings of the present disclosure.
Figure 43:
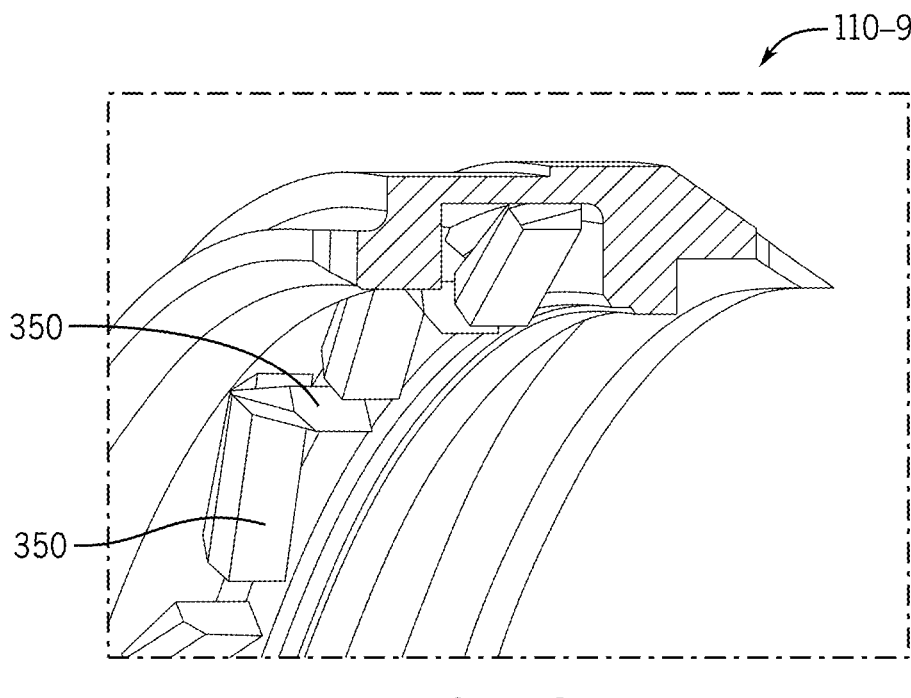
FIG. 43 shows a close up perspective cross-section view of the insert device of FIG. 42.

Again, in many of these additional examples, the thickness, shape, length, and adhered portions of the softer material can be designed to achieve desired flexibility and movement characteristics for the spline parts, such as is described above for earlier examples. In other examples, the softer material may be eliminated altogether. FIGS. 42 and 43 show another example of a seal-less type insert device 110-9. In this example, the insert device has a substantially rigid plastic body with multiple short spline segments 350. Each spline segment in this example is provided in pairs arranged circumferentially around the body. Each pair has one end flexibly and hingedly connected to the body and a circumferentially opposite free end. The spline segments 350 in this example are arranged such that the free ends can move radially outward when a spigot is forced through the body and then snap back into a spline groove in a spigot when aligned with the groove.

Other seal-less insert device examples are also possible within the scope of the disclosure. Further, the style of pipe joint and the type of groove, the splines used in the disclosed examples may define the specific size and shape of the spline portions and spline segments. The cross-section shape of the splines may include a portion that is angled, tapered, or ramped in order to permit spigot insertion with the spline already in place. The disclosed insert devices may be utilized and designed accordingly to accommodate the desired type of spline and joint. The spline shapes can mimic those of the Certa-Lok® CLIC™ PVC pipe interlocking system produced by North American Pipe Corporation, the assignee of the present disclosure.

As disclosed herein, when the insert devices are formed to include both the annular body (the more rigid plastic part) and the seal part (the softer rubber or elastomer part), the seal part can be over-molded or insert molded onto the annular body, such as onto a seal portion of the annular body. During the injection molding process, the two different materials can be chemically bonded to one another along their corresponding contact surfaces, as is known in the art. In this way, the joined surfaces will prevent fluid leakage between the surfaces of the two joined parts during use. In other examples, the two materials may be bonded to one another by an adhesive or other such known methods.

However, in some examples, a mechanical connection between a seal portion of the annular body and the seal part may be necessary, preferred, or desired. The mechanical bond may be created through the design of the mold, and thus the part, geometry. A mechanical bond between the two parts should help to retain the seal part connected to and fixed in place on the annular body. The mechanical bond should also be configured to assist in reducing or eliminating the possibility of a fluid leak between the contacting surfaces of the annular body and the seal part.

Figures 44, 45, 46:
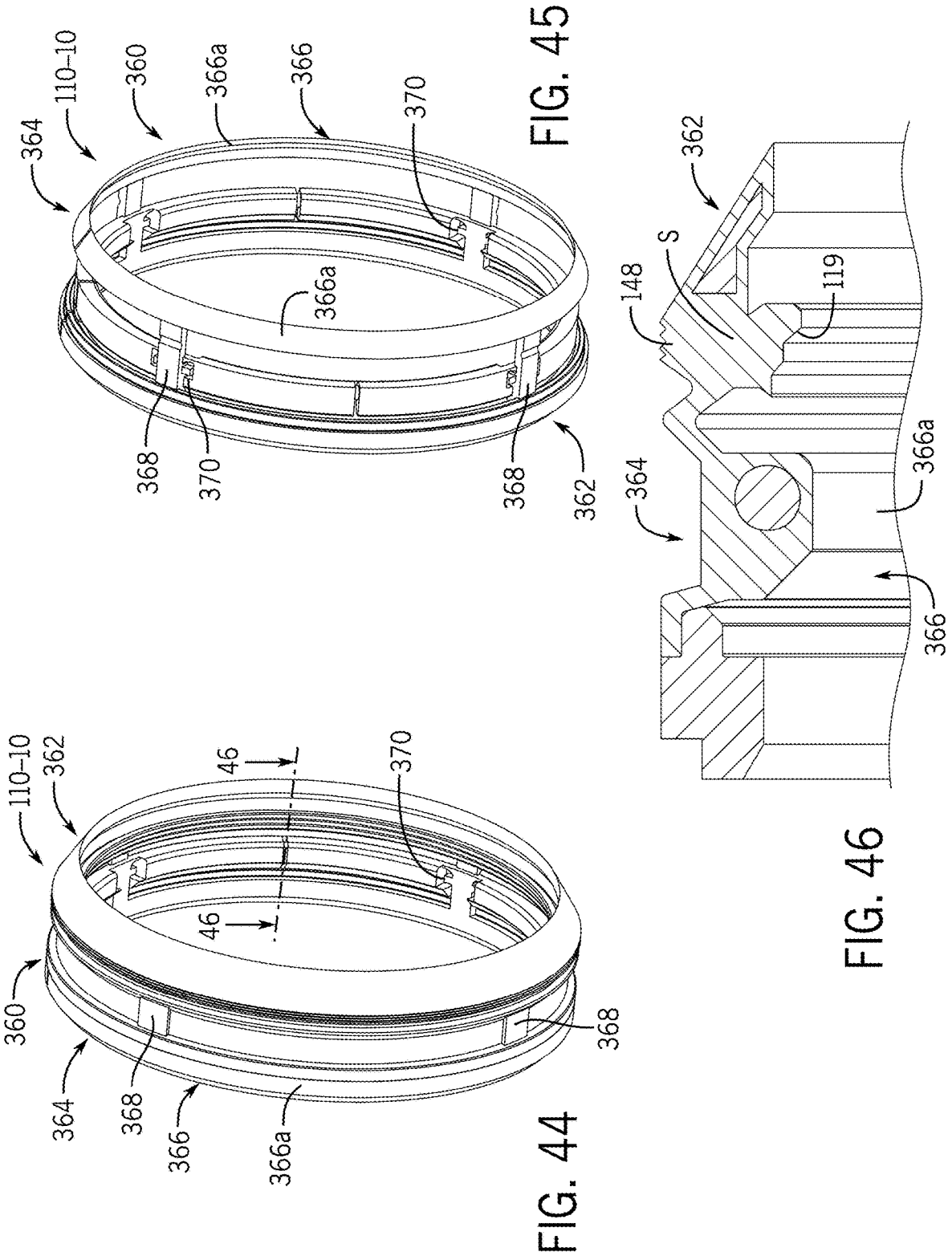
FIG. 44 shows a perspective view of another example of an insert device constructed in accordance with the teachings of the present disclosure.
FIG. 45 shows a perspective view of the annular body portion of the insert device of FIG. 44, with the seal part removed.
FIG. 46 shows a cross-section of the insert device of FIG. 44.

FIGS. 44-46 show one example of an insert device 110-10 that has an annular body 360 and a seal portion 362 joined to the annular body. The insert device 110-10 also has a spline portion 364 similar to those described above for other examples. The annular body 360 has a main portion in the form of an annular ring and a tapered or angled ring portion, i.e., the seal portion 362, that is axially spaced from the main portion. The spline portion 364 includes a segmented spline 366 with segments 366a that are circumferentially joined to one another around the annular body at connector parts 368. The connector parts 368 include axial connectors that are joined to the main portion and the tapered ring portion of the annular body. In this example, there are four (4) such axial connectors, but the number and form of such connector parts can vary. The spline segments 366a are connected to the axial connectors by circumferential connectors 370 of the connector parts at each end thereof. FIG. 45 shows the annular body 360 and the various parts, portions, and connectors.

The seal material S is molded so as to completely cover the tapered ring portion or seal portion 362 of the annular body, as shown in FIGS. 44 and 46. The seal material S is also molded to only cover the radial outer side of the spline segments 366a, not the inner radial sides. Further, the seal material S is disposed in the axial gaps between the spline 366 and the tapered ring portion 362 of the annular body 360. The seal material S forms a radial inner seal 119 that faces inward and forms a radial outer seal 148 that faces outward in these axial gaps and these seals are circumferentially continuous. The seal material also completely fills the circumferential and radial spaces between the spline segments 366a and the axial connectors 368, and around the radial connectors 370. The seal material S also overlaps a portion of the main body portion in a groove or recess on the radial outer side thereof.

As shown in FIG. 46, the spline segments 366a are able to expand or move radially, as described above, according to the resiliency of the axial and radial connectors 368. 370, as well as the thin walled, bent portion of the seal material S that extends between the seals and the spline segments. Alternatively, the connections are frangible, and the spline segments 366a are mechanically captured by the molded seal material S. In this example, the seal material is not chemically bonded to the annular body. In the earlier described examples, the seal material S is bonded to the plastic material of the annular body. Instead, the seal material S, once injection molded, is mechanically retained on the annular body by the portions surrounding the angled or tapered portion of the body and by the portions surrounding the connector parts, i.e., the axial connectors 368 and the radial connectors 370. Thus, the seal material penetrates radially through portions of the annular body 360 and extends axially over portions of the annular body on both the radial inner and radial outer surfaces of the body. The geometry of the parts creates the mechanical connection between the seal material and the annular body. Further, by having the seal material completely encompass the seal portion 362 of the annular body, i.e., the angled or tapered portion adjacent the seals (radial inward and outward facing seals) formed by the seal portion, leakage can be prevented when only a mechanical connection and not chemical bonding, adhesive bonding, or the like is utilized to join the seal part and annular body.

As will be evident to those having ordinary skill in the art, details of the seal portion and the annular body can vary widely while still providing the geometry necessary or suitable for mechanically joining and retaining the seal part and seal material to the annular body. Further, such a mechanical connection can be utilized on insert devices having a different construction, such as those without an integrated spline part and those that have a spline groove formed as a part of the annular body.

For example, FIGS. 47-51 show other examples of insert devices with an annular body and a seal portion with the seal material mechanically connected to the annular body. In these examples, the insert devices do not include a spline portion or a spline. Instead, these devices form a spline groove within the female or belled end 108 of a pipe 106 and can receive a conventional, separate spline element therein to join the pipes.

Figures 47, 48:
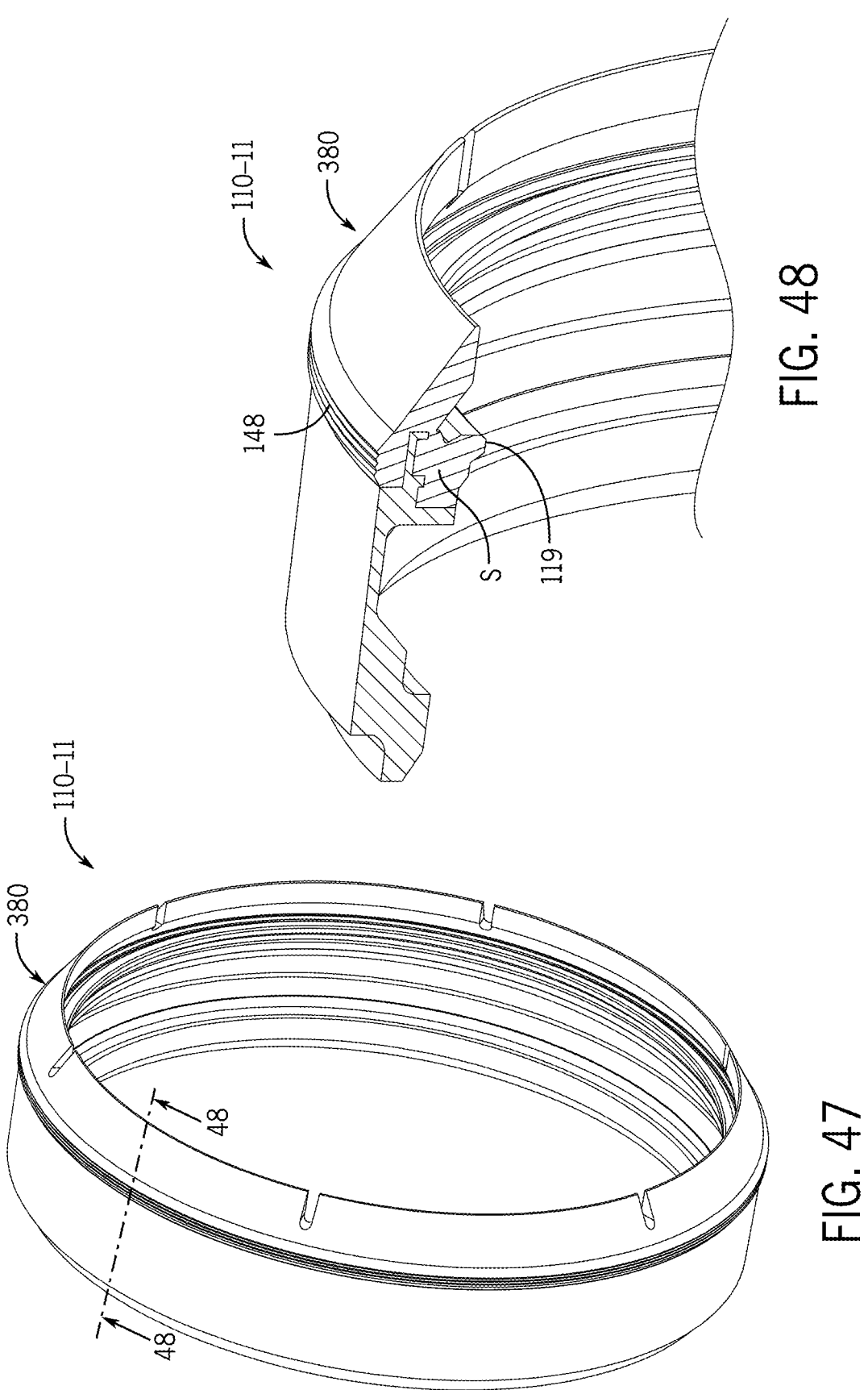
FIG. 47 shows a perspective view of another example of an insert device constructed in accordance with the teachings of the present disclosure.
FIG. 48 shows a cross-section of the insert device of FIG. 47.
Figures 49, 50:
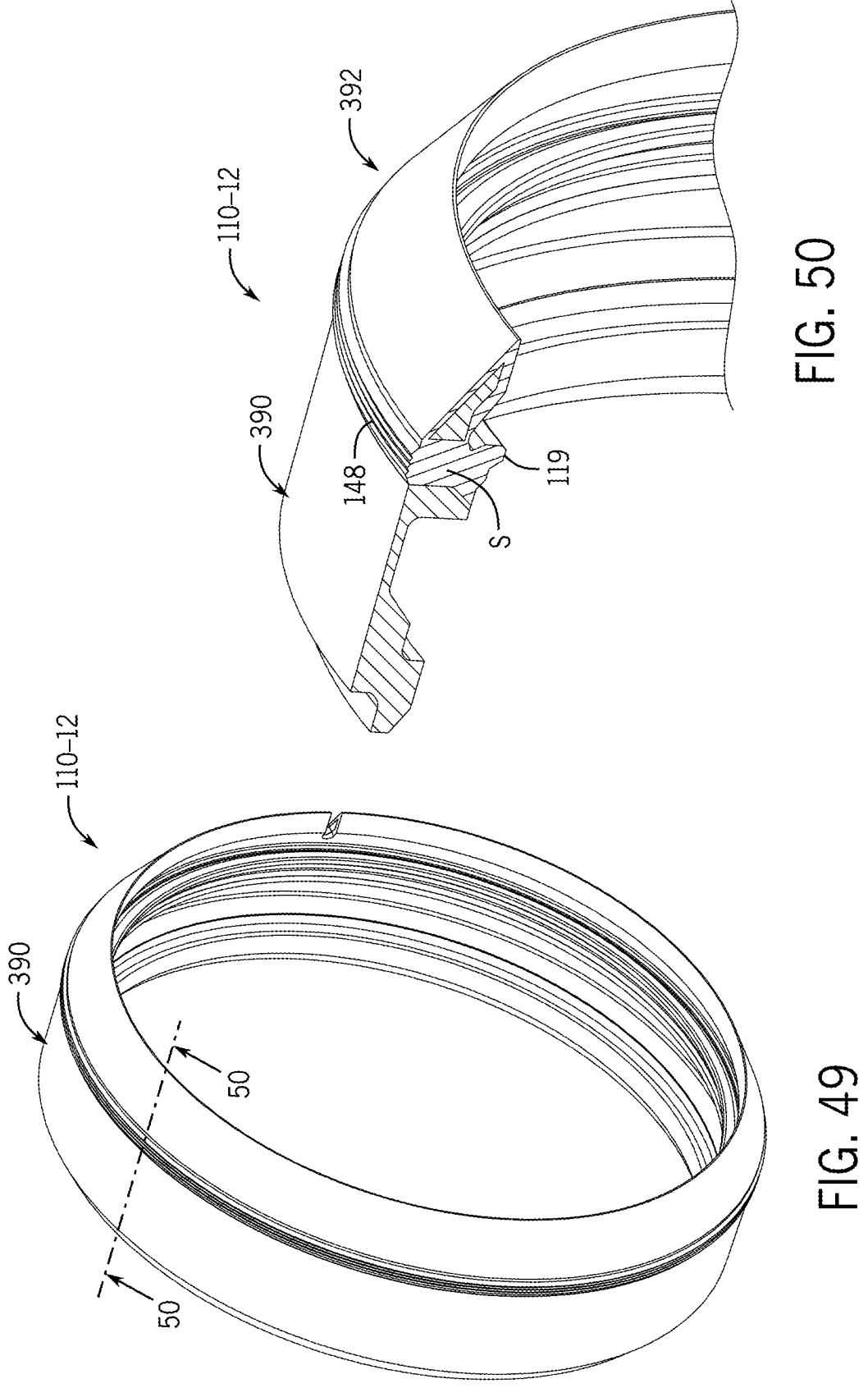
FIG. 49 shows a perspective view of another example of an insert device constructed in accordance with the teachings of the present disclosure.
FIG. 50 shows a cross-sections of the insert device of FIG. 49.
Figure 51:
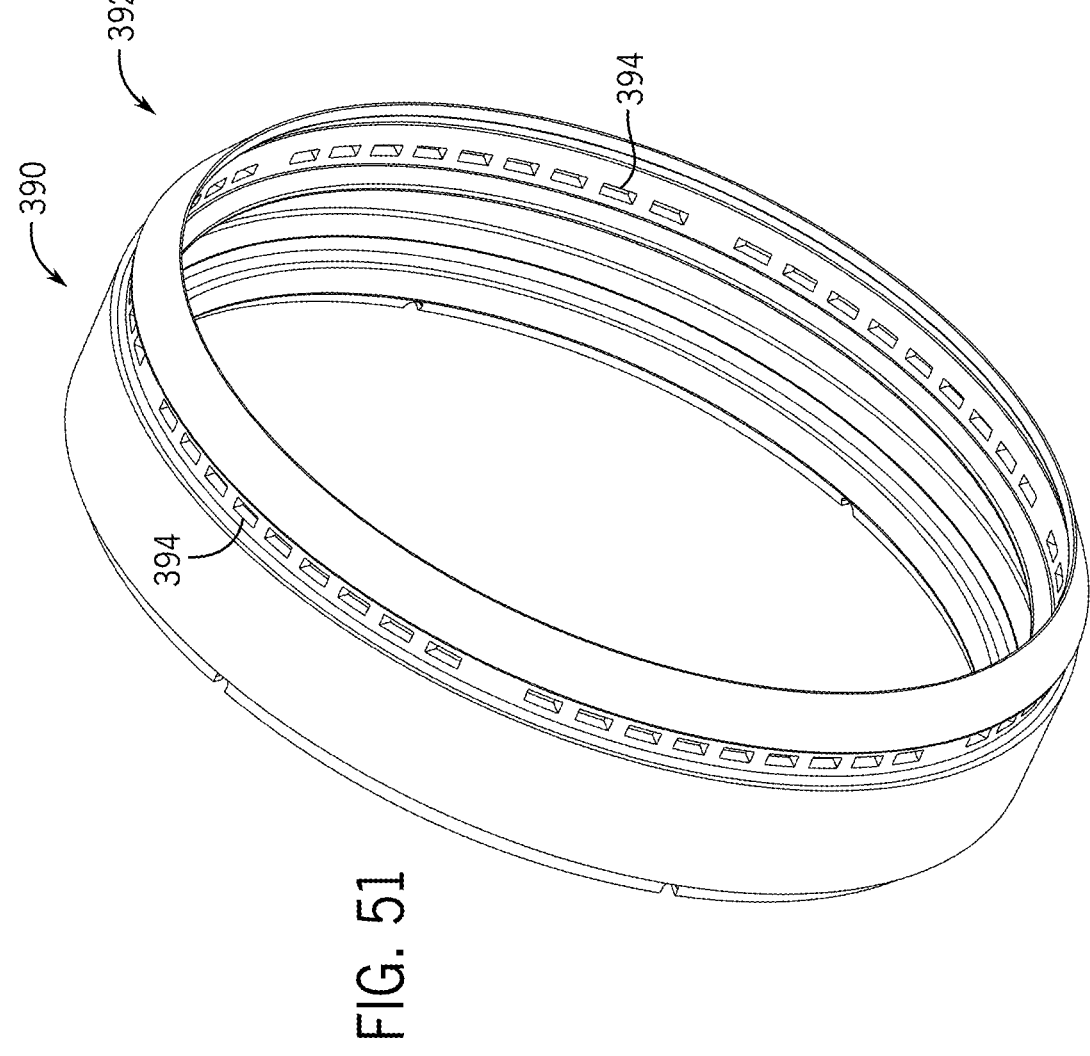
FIG. 51 shows a perspective view of the annular body portion of the insert device of FIG. 49, with the seal material removed.
Figures 52, 53:
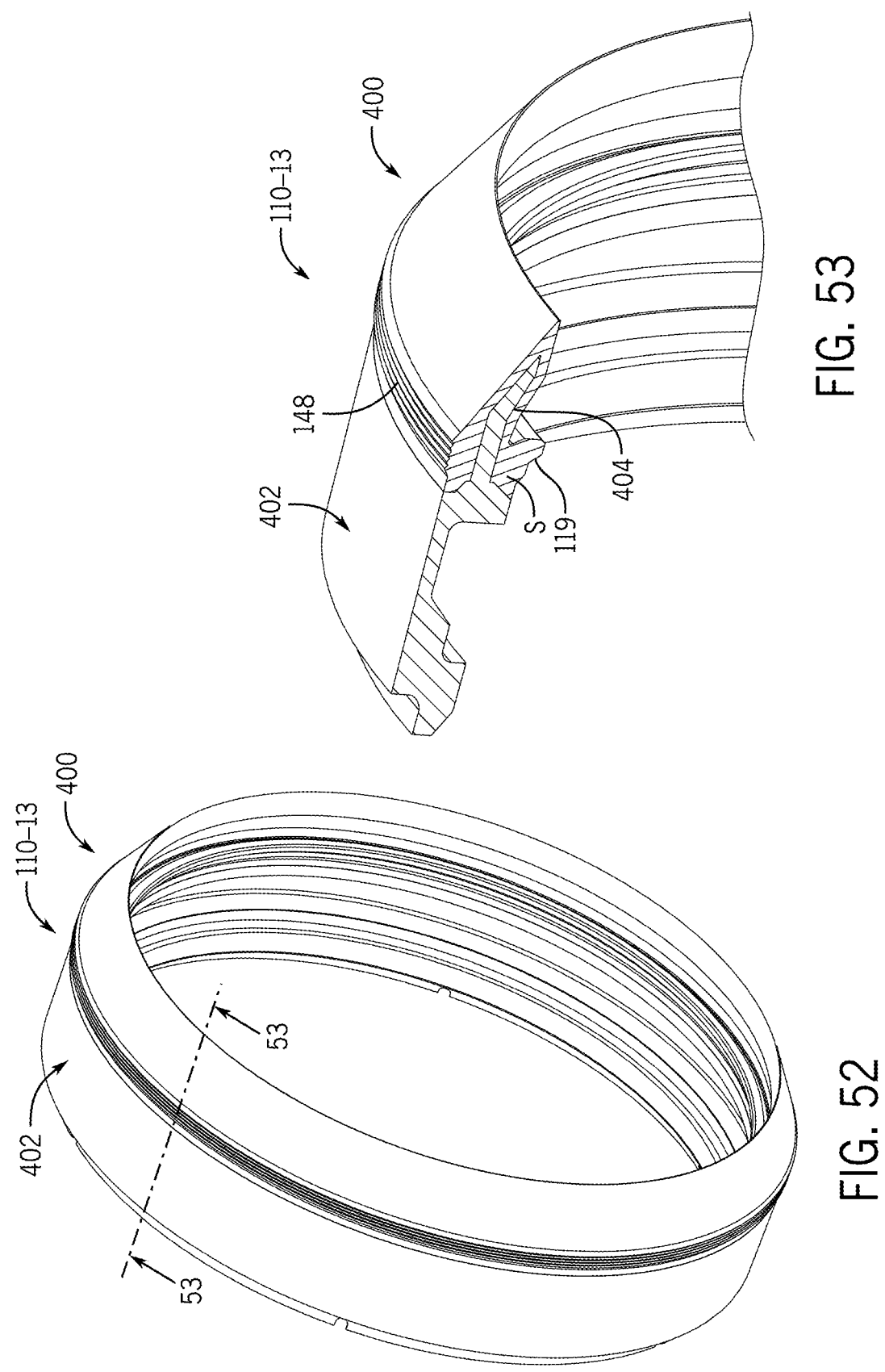
FIG. 52 shows a perspective view of another example of an insert device constructed in accordance with the teachings of the present disclosure.
FIG. 53 shows a cross-sections of the insert device of FIG. 47.
Figure 55:
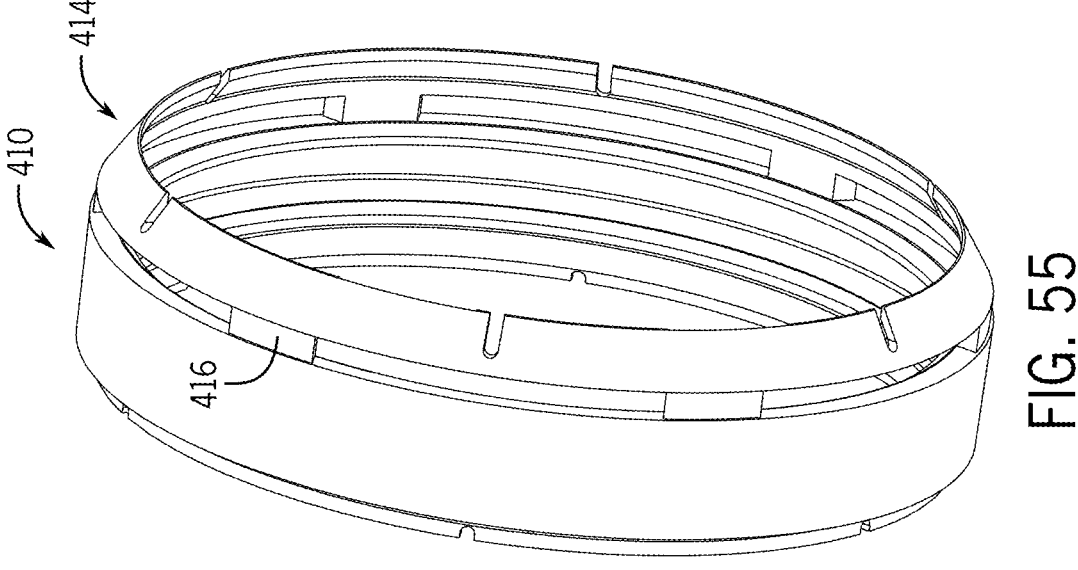
FIG. 55 shows a perspective view of the annular body portion of the insert device of FIG. 54, with the seal part removed.
Figure 54:
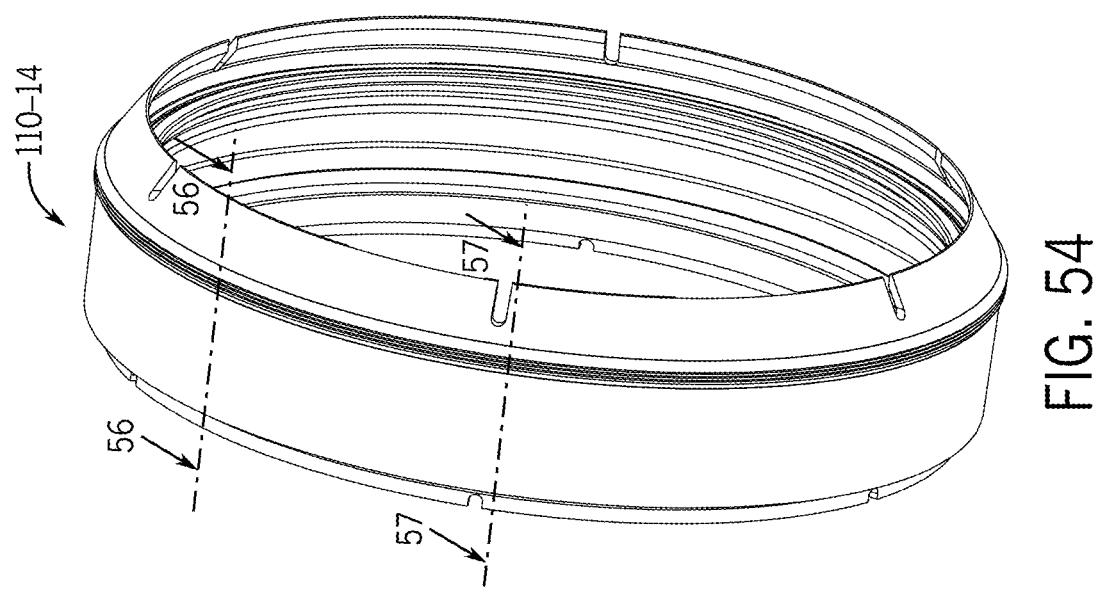
FIG. 54 shows a perspective view of another example of an insert device constructed in accordance with the teachings of the present disclosure.
Figure 64:
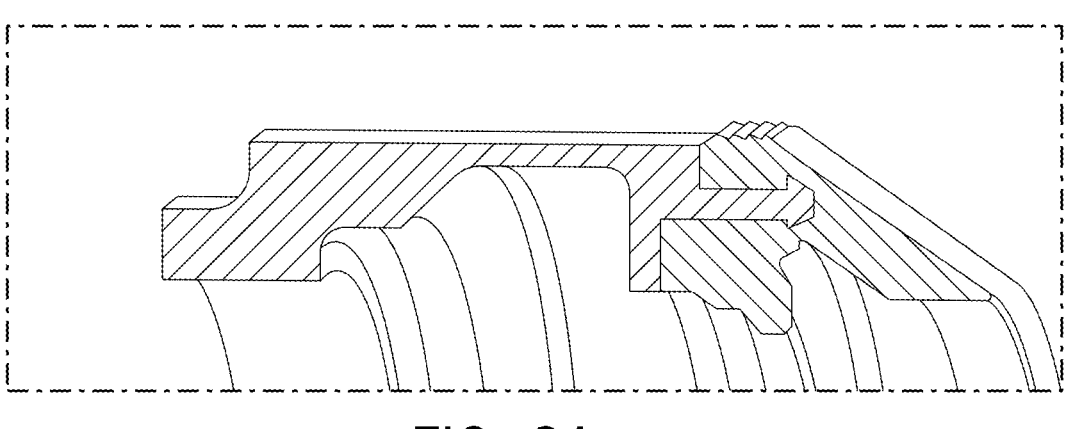
FIG. 64 shows a cross-section of another insert device similar to that of FIGS. 47 and 48.

In FIGS. 47 and 48, it becomes evident that the geometries of the annular body and/or the seal portion, as well as the seal material can vary. In this example, an insert device 110-11 has a seal portion 380 with a complex shaped axial extension partly in the form of a U-shape. The seal portion 380 creates radial and axial interference between the seal material and the annular body, i.e., the seal portion 380. The seal portion 380 and the seal material may be optimized to create a better seal between the annular body and the seal material when using a mechanical connection between the two materials. Further, the geometries may be optimized to create a desired or more robust mechanical connection as well. FIG. 64 shows a different axial projection on the end of the seal portion. In this example, the axial projection has a head 384 on the end of the body of the seal portion 386. The head can create the radial and axial surface interference between the seal material and the annular body. FIGS. 49-51 depict another example of an insert device 110-12 with an annular body 390 and seal material S geometry that is similar to that described above for FIGS. 44-46, but for a different insert device configuration. Also, in this example, the annular body 390 includes a plurality of perforations 392 or apertures formed through the annular body 90 to create at least part of the mechanical connection or structure that connects the seal material to the annular body. In these examples, the angled or tapered portion of the annular body is modified to create different mechanical interlocks between the seal material and the annular body 390, including the seal portion 392 while still having the seal material penetrate radially through the annular body. Also, in these examples, the seal material S forms the majority of the leading end portion of the insert device instead of the annular body material. FIGS. 52 and 53 show another example of an insert device 110-13 with no spline but with a seal portion 400 on an annular body 402. The seal portion defines the tapered leading end of the insert device but in this example, has a bend 404 in the material. This bend can enhance the mechanical connection between the seal material and the annular body by creating contact surfaces between the two materials at different angles.

In some of these examples, the annular body defines a spline groove on the radial inner surface thereof. A separate spline component is used and received in the spline groove to secure a pipe connection. Thus, this insert device may not include an integrated spline. As shown in FIGS. 54-57, an insert device 110-14 includes an annular body 410 with a main body portion with a spline groove 412 and a leading axial end portion, i.e., equivalent to the above-mentioned angled or tapered portion as a seal portion 414. In this example, the seal portion 414 of the annular body 410 is secured to the main body portion by a plurality of axial connectors, such as six (6) integral connectors 416. Gaps or slots are provided radially through the annular body between the axial connectors 416.

Figure 56:
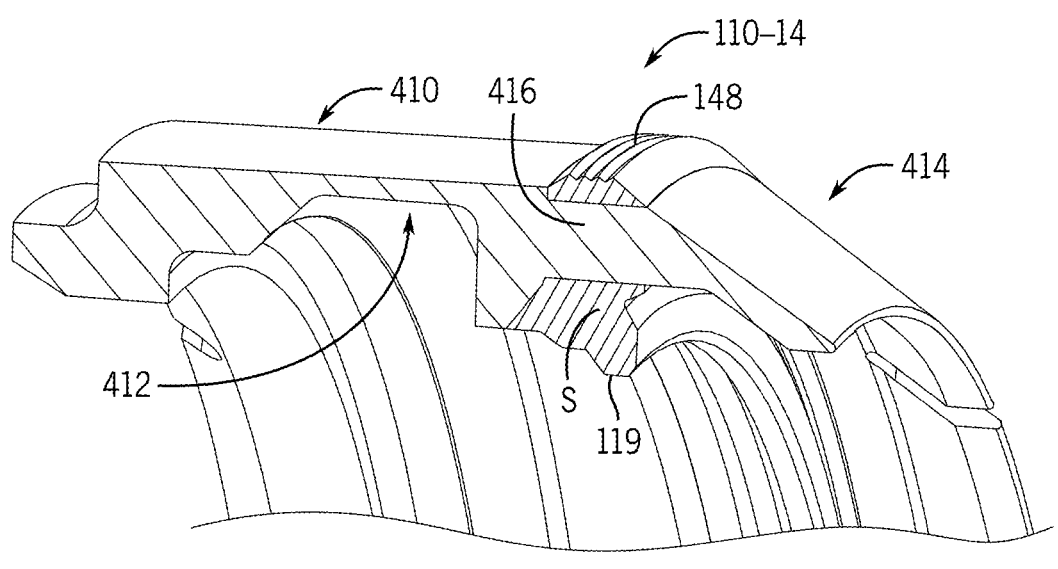
FIGS. 56 and 57 show different cross-sections of the insert device of FIG. 54.
Figure 57:
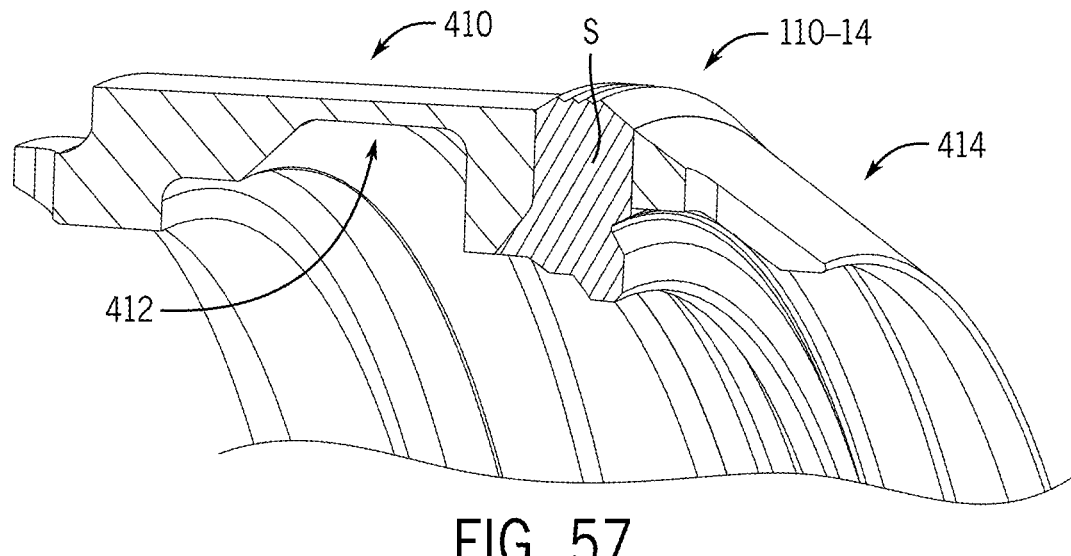

In this example, the seal material S is injection molded to form a radial inner seal 119 and a radial outer seal 148 on the insert device 110-14, as shown in FIGS. 56 and 57. The seal material penetrates radially through the gaps or slots between the axial connectors 416. The seal material S is retained to the annual body by a mechanical connection or structure created by the seal material overlapping the axial connectors on both the radial inner and outer surfaces, as shown in FIG. 56, and by the seal material extending through the annular body via the gaps and slots, as shown in FIG. 57. In this example, the possibility of fluid leaks may occur between the non-bonded seal material and the seal portion 414. More specifically, fluid may be able to pass between the seal material and the annular body material at the axial connectors on the wet side of the pipe connection, as well as the dry side. This is because there is not a chemical bond at these contact points. However, there may be many instances where the pipe joint is such that fluid will not leak because there may be sufficient seal compression, low enough fluid pressure, higher viscosity fluid, a robust insert device geometry, or a combination thereof. However, one may utilize an insert device similar to that shown and described with respect to FIGS. 44-46 to alleviate such leakage potential.

Figures 58, 59, 60:
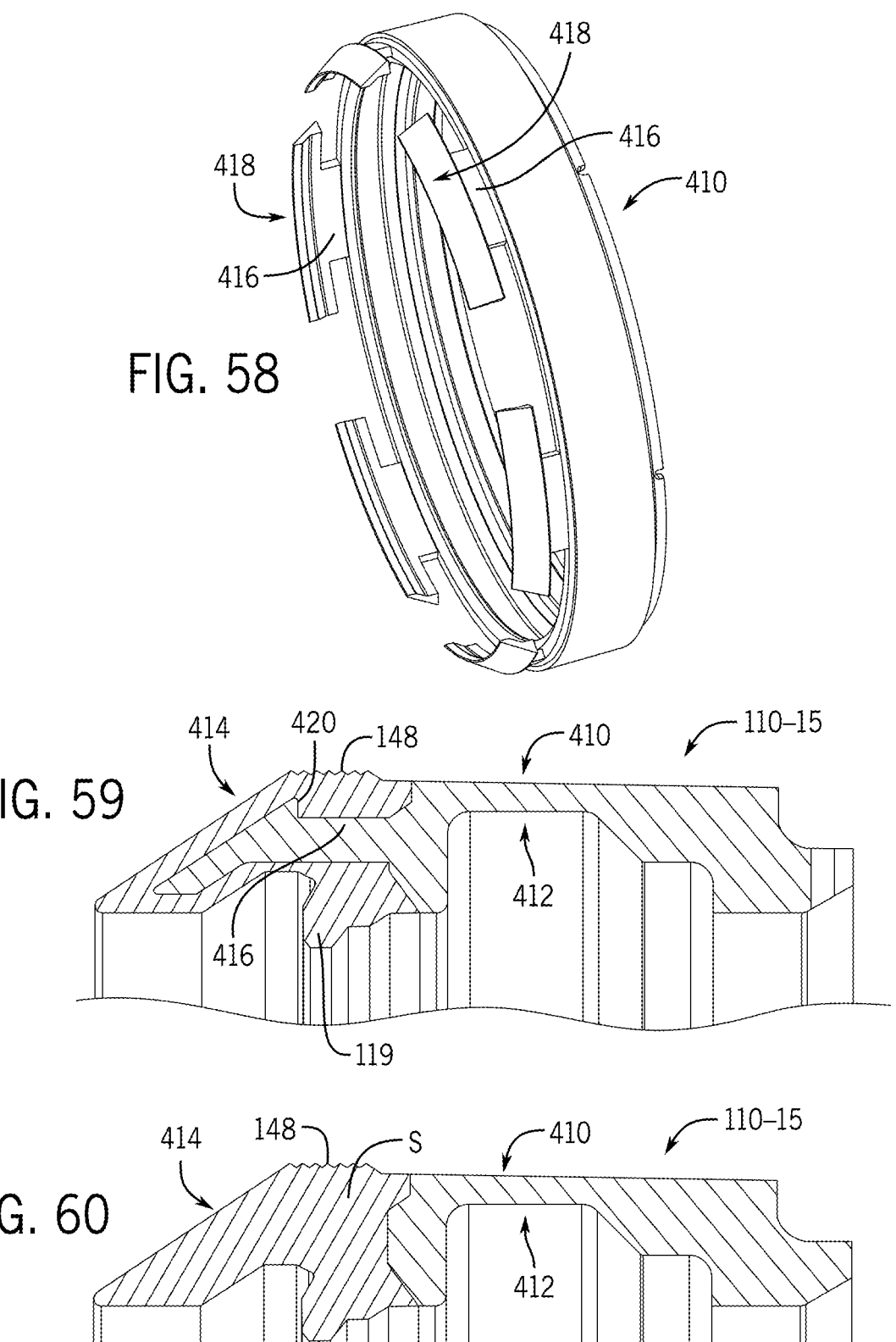
FIG. 58 shows a perspective view of another example of an annular body for an insert device constructed in accordance with the teachings of the present disclosure.
FIGS. 59 and 60 show cross-sections through different portions of an insert device utilizing the annular body of FIG. 58.

FIGS. 58-60 show another example of an insert device 110-15 identical to the insert device 110-14. However, in this example, the seal portion is separated into segments 418 and is completely covered by the seal material, as in some of the earlier examples. This may allow for better radial expansion of the insert device during belling or during assembly of a pipe joint. Further, in this example, the insert device 110-15 includes on the angled or tapered seal portion of the body an additional mechanical interlock in the axial direction. This is formed by a radial protrusion 420 around the portion adjacent the axial connectors 416, as shown in FIG. 59. Radial and axial mechanical interlock is also created by the seal material overlapping radial surfaces of the axial connectors and by penetrating through the annular body within gaps or slots disposed circumferentially between the axial connectors.

Figures 61, 62, 63:
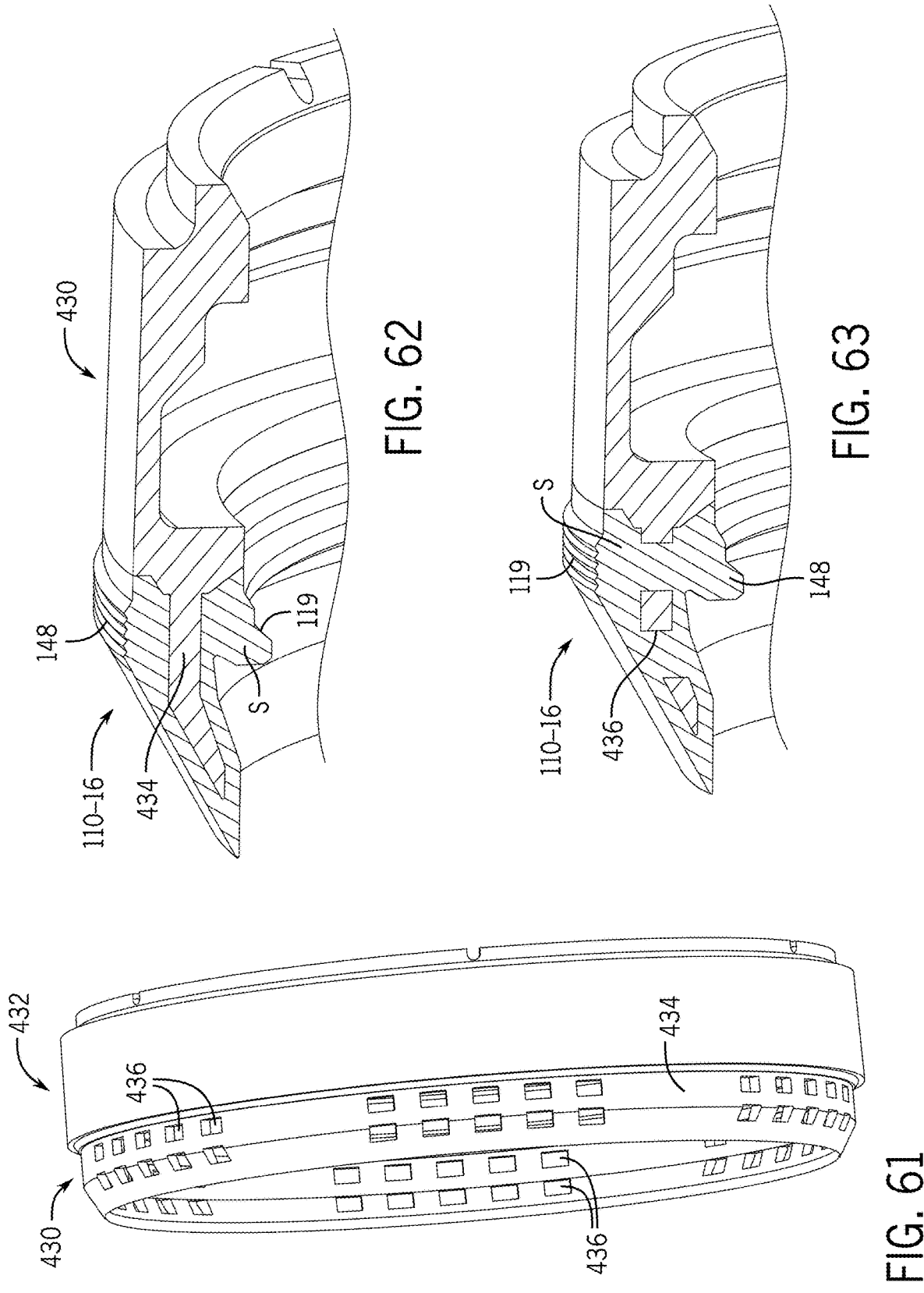
FIG. 61 shows a perspective view of another example of an annular body for an insert device constructed in accordance with the teachings of the present disclosure.
FIGS. 62 and 63 show cross-sections through different portions of an insert device utilizing the annular body of FIG. 61.

FIGS. 61-63 show yet another example of an insert device 110-16 configured to form a mechanical connection between the seal material and the annular body. In this example, a seal portion 430 includes the angled or tapered body portion and is joined axially to the main body portion of the annular body 432 by an axial ring 434. A relatively large number of through holes or patterns of through holes 436 are formed through both the axial ring 434 and through the angled or tapered seal portion 430 of the annular body 432. The seal material overlaps the inner and outer radial surfaces of both the axial ring and the tapered portion of the body. The seal material also penetrates the annular body via all of the through holes. Thus, a significant mechanical interlock is created in this example, while the seal material again formed a radial inner seal and a redial outer seal on the insert device.

The embodiments described above with no spline portion or spline can certainly be modified to incorporate a spine and the mechanical connecting structures disclosed for such embodiments may be used on insert devices that include an integrated spline. Further, in some of the disclosed examples, one of the grooves may have a shallow locking section and a deeper release, bypass, or insertion section. The spline can be forced into the shallow section of one groove in one of the pipes and will thus seat partly in the other spline groove of the other pipe as well, when the joint assembly is pulled in a separation direction. In the shallow section, the spline cannot be expanded or contracted (depending on in which pipe the groove is formed) and lies in part in each of the spline grooves, which axially interlocks the two pipes together. However, when the two pipes are pushed together, i.e., installed, the spline will align with the deeper section of the one spline groove. This permits the spline to expand or contract into the deeper section, which withdraws the spline from the other spline groove.

In another example, the insert devices disclosed and described herein may include a split-ring type annular body. In such an example, the ring may expand and contract according to the size of the split in the ring. The expansion may aid in installing an insert device on a mandrel according to the above described methods. Alternatively, the contraction of the insert device may aid in installing the device within a female end of a pipe or a pre-belled pipe that already includes a groove, race or the like. The annular body can be contracted to fit within the ID of the pipe and then can resiliently expand into the groove or race in the ID surface of the female or belled end pipe. This process can be automated to make insert device insertion rather simple and to make pipe joint assembly relatively simple as well.

In the disclosed examples, and in other examples, mechanical interlock should be created by interference between a portion of the seal material and the annular body in the axial directions, in the radial directions, and the circumferential directions. This, the seal material, when molded onto the annular body, will be inhibited from moving radially, axially, or circumferentially relative to the annular body so that the seal material remains in place and does not become dislodged from the body. Shaped and features of the annular body can be configured to create such interference. In the disclosed examples, the radial penetration of the annular body by the seal material, the axial overlap of the seal material and parts of the annular body, and the portions (connectors) of the annular body create sufficient interference in each direction.

Figure 65:
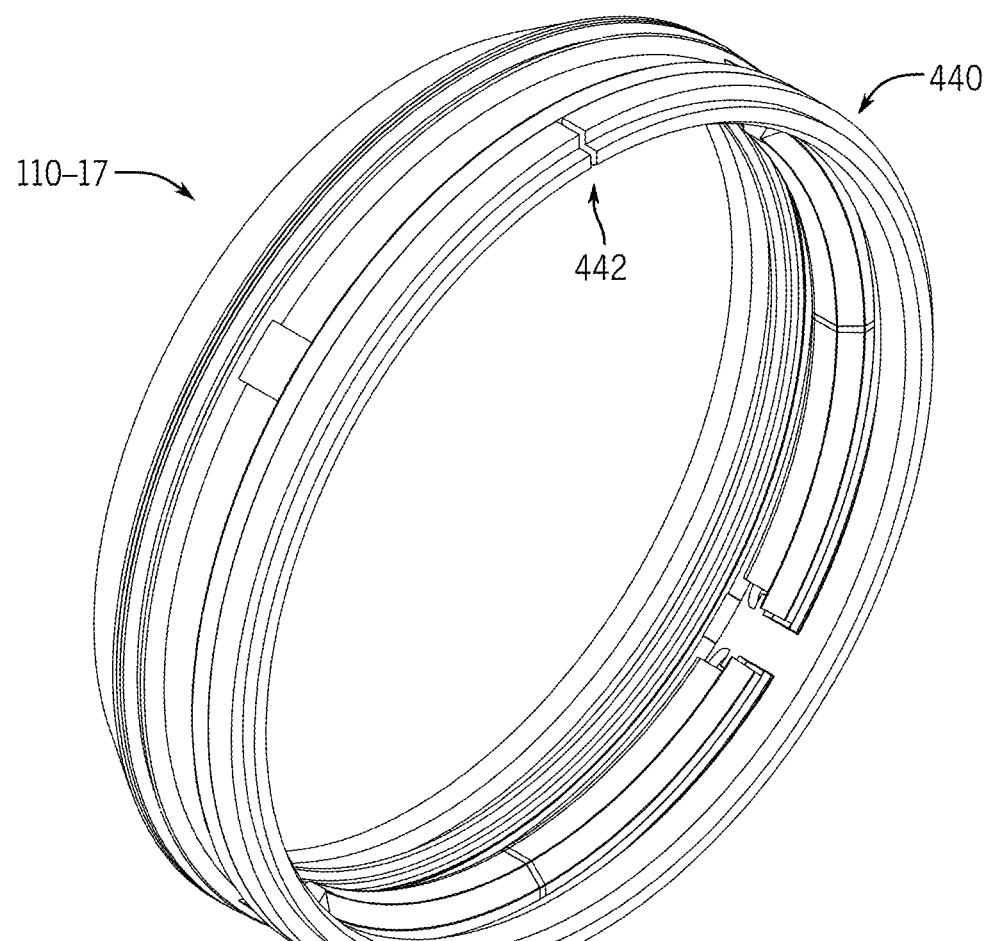
FIG. 65 shows a perspective view of another example of an insert device constructed in accordance with the teachings of the present disclosure.
Figures 66, 67:
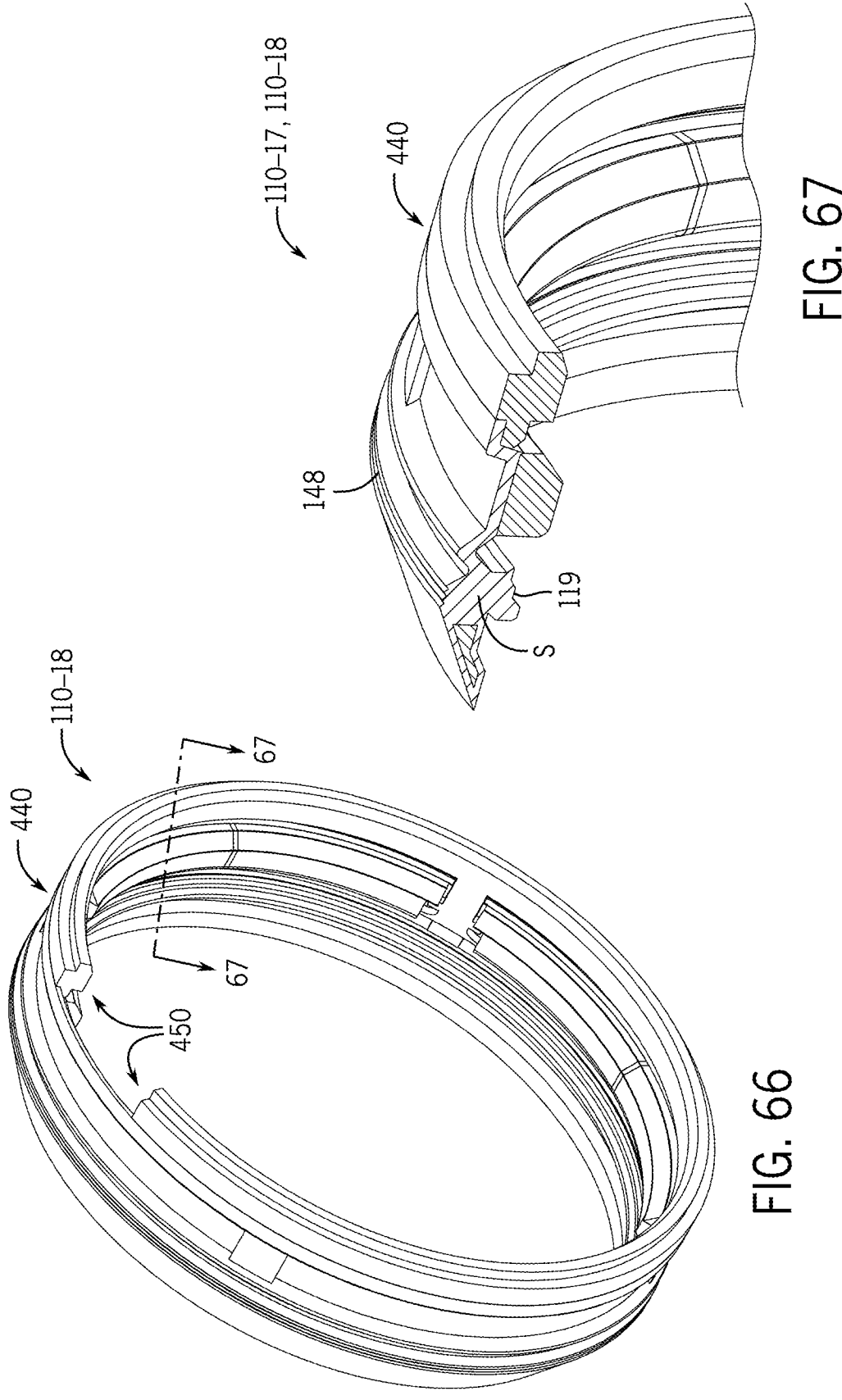
FIG. 66 shows a perspective view of another example of an insert device constructed in accordance with the teachings of the present disclosure.
FIG. 67 shows a cross-section of the insert devices of FIGS. 65 and 66.

FIGS. 65 and 67 show one example of a split ring type insert device 110-17. In this example, the annular body 440 has a split 442 along the entire axis of the body. In this example, the seal material S covers the entire seal portion 444 of the annular body 440 so the split is not visible on the angled or tapered portion. The seal material is not split and extend around the entire circumference of the insert device 110-17. The seal material can be flexible and resilient enough to allow the annular body to expand or contract as needed via the split 442. FIG. 66 show another example of an insert device that is similar to the insert device 110-17. However, in this example, the split 446 is much larger in the circumferential direction than the split 442.

Although certain insert devices, pipe belled ends, pipe joint assemblies, and forming methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A polymer tube comprising:
a first end and a second end, the first end having a first diameter and the second end being a female end or a belled end having a second diameter; and
an insert device received within at least the second end, the insert device having an annular body formed of a body material and having a spline portion formed as a part of the insert device,
wherein the spline portion includes a spline carried by the insert device and resiliently movable in a radial direction relative to an axis of the annular body,
wherein the spline is an integral part of the annular body and formed of the body material, and
wherein the spline is connected to the spline portion of the annular body by one or more frangible connections that, when broken, permit the spline to expand and contract radially relative to the annular body while remaining attached to the annular body.

2. The polymer tube of claim 1, wherein the annular body also has a seal portion that includes a seal material coupled thereto that is less rigid than the body material.

3. The polymer tube of claim 1, wherein the insert device includes a seal material carried by the annular body and defining an inner seal facing in a radially inward direction.

4. The polymer tube of claim 3, wherein the seal material defines an outer seal facing in a radially outward direction and contacting an inside diameter surface of the polymer pipe.

5. The polymer tube of claim 4, wherein the seal material penetrates through the annular body integrally forming both the inner and outer seals.

6. The polymer tube of claim 3, wherein the annular body is a molded element and the seal material is co-molded, insert molded or over-molded with the annular body as a part of the insert device, and wherein the body material of the annular body is substantially rigid and has a first durometer and the seal material has a second durometer lower than that of the substantially rigid material of the annular body.

7. The polymer tube of claim 3, wherein the body material of the annular body is formed of a polymer material, and wherein the seal material is formed of an elastomer material that is less rigid than the polymer material.

8. The polymer tube of claim 7, wherein the elastomer material comprises at least one of isoprene rubber (IR), styrene butadiene rubber (SBR), IR/SBR blend, nitrile, ethylene propylene diene monomer (EPDM) rubber, synthetic rubber, and fluoropolymer elastomer.

9. The polymer tube of claim 1, further comprising one or more insert recesses disposed circumferentially on an inside diameter (ID) surface of the second end, the insert device seated in the one or more insert recesses.

10. The polymer tube of claim 1, wherein the insert device has an ID in a range of about 3 inches to about 48 inches and an axial length of about 0.125 inches to about 3 inches.

11. The polymer tube of claim 1, wherein the polymer tube is a polymer pipe coupling.

12. The polymer pipe coupling of claim 11, wherein the second diameter and the first diameter are the same.

13. The polymer tube of claim 1, wherein the polymer tube is a polymer pipe, and wherein the second end is the belled end with the second diameter being larger than the first diameter.

14. A pipe joint assembly comprising:
a polymer tube having a first end and a second end, the first end having a first diameter and the second end being a female end or a belled end having a second diameter;

an insert device received within the second end, the insert device having an annular body with a spline portion and a spline integrally and resiliently carried by the spline portion, the annular body formed of a body material; and a pipe having a spigot end installed in the second end of the polymer tube, the spigot end having a spline groove on an outside diameter surface, wherein the spline is seated in the spline groove and axially retains the pipe connected to the polymer pipe, wherein the spline is an integral part of the annular body, and wherein the spline is connected to the spline portion of the annular body by one or more frangible connections that, when broken, permit the spline to expand and contract radially relative to the annular body while remaining attached to the annular body.

15. The pipe joint assembly of claim 14, wherein the insert device further comprises:

a seal portion of the annular body; and a seal material carried by the seal portion, the seal material being less rigid than the body material.

16. The pipe joint assembly of claim 15, wherein the seal material forms an inner seal that contacts the outside diameter surface of the spigot end.

17. The pipe joint assembly of claim 15, wherein the spline is configured to be moved radially outward by the spigot end to permit installation of the spigot end into the second end of the polymer tube, and wherein the spline is configured to move radially inward and seat in the spline groove when aligned therewith.

18. The pipe joint assembly of claims 14, wherein the polymer tube, the spigot end, and the insert device are each entirely non-metallic.

19. The pipe joint assembly of claim 14, wherein the polymer tube is a polymer pipe, and wherein the second end is the belled end with the second diameter being larger than the first diameter.

20. The pipe joint assembly of claim 14, wherein the polymer tube is a polymer pipe coupling.

21. A method of assembling a pipe joint, the method comprising:

providing or obtaining a first pipe having a spigot end and a spline groove on an outside diameter surface of the spigot end;

providing or obtaining a second tube having a female end or a belled end, wherein the spigot end of the first pipe is sized to fit within the female end or the belled end of the second tube;

installing an insert device retained within the female end or the belled end, the insert device including an annular body with a spline portion and a spline movable and resiliently carried by the spline portion, the annular body formed of a body material;

inserting the spigot end of the first pipe into the female end or the belled end of the second tube such that the spline of the insert device is axially aligned with the spline groove in the spigot end, wherein the spline resides at least in part within the spline groove to retain the first pipe and the second tube joined to one another, wherein the spline is an integral part of the annular body and formed of the body material, and wherein the spline is connected to the spline portion of the annular body by one or more frangible connections that, when broken, permit the spline to expand and contract radially relative to the annular body while remaining attached to the annular body.

22. The method of claim 21, further comprising:

a seal material carried by a seal portion of the annular body, whereby an inner seal of the seal material contacts the outside diameter surface of the spigot end at a position axially spaced from the spline groove.

23. A pipe system comprising:

a polymer tube having a first end and a second end, the first end having a first diameter and the second end being a female end or a belled end having a second diameter;

one or more insert recesses formed in an inside diameter surface of the female end or the belled end of the polymer tube; and an insert device received within the female end or the belled end, the insert device having an annular body with a seal portion and a spline portion, a seal material coupled to the seal portion, and a spline integrated as a part of the spline portion, wherein the spline is movably and resiliently carried by the annular body and is movable in a radial direction relative to an axis of the insert device, wherein the spline is connected to the spline portion of the annular body by one or more frangible connections that, when broken, permit the spline to expand and contract radially relative to the annular body while remaining attached to the annular body by the seal material.

24. The pipe system of claim 23, further comprising:

a pipe having a spigot end installed in the female end or the belled end of the polymer tube, the spigot end having a spline groove on an outside diameter surface that axially aligns with and receives the spline of the insert device, axially joining the polymer tube and the spigot end.

25. The pipe system of claim 23, wherein the polymer tube is a polymer pipe, and wherein the second end is the belled end with the second diameter being larger than the first diameter.

26. The pipe system of claim 23, wherein the polymer tube is a polymer pipe coupling, and wherein the second diameter and the first diameter are the same.

* * * * *